(12) United States Patent
Perez et al.

(10) Patent No.: US 12,115,663 B2
(45) Date of Patent: Oct. 15, 2024

(54) MARITIME APPLICATIONS FOR A MOBILE ROBOT

(71) Applicant: ROAM ROBOTICS INC., San Francisco, CA (US)

(72) Inventors: Mario Perez, San Francisco, CA (US); Kyle Kaveny, San Francisco, CA (US); Ronald Lam, Berkeley, CA (US); Kris Li, San Francisco, CA (US); Collin Smith, Carlsbad, CA (US); Linus Park, Pacifica, CA (US); Scott Schoeffel, Virginia Beach, VA (US); Kevin Conrad Kemper, San Francisco, CA (US); Timothy Alan Swift, Walnut Creek, CA (US)

(73) Assignee: Roam Robotics Inc., San Francisco, CA (US)

( * ) Notice: Subject to any disclaimer, the term of this patent is extended or adjusted under 35 U.S.C. 154(b) by 147 days.

(21) Appl. No.: 17/889,750

(22) Filed: Aug. 17, 2022

(65) Prior Publication Data
US 2023/0053879 A1 Feb. 23, 2023

Related U.S. Application Data

(60) Provisional application No. 63/234,040, filed on Aug. 17, 2021.

(51) Int. Cl.
*B25J 9/00* (2006.01)
*B25J 13/08* (2006.01)
(Continued)

(52) U.S. Cl.
CPC ............ *B25J 9/0006* (2013.01); *B25J 13/088* (2013.01); *B25J 19/0075* (2013.01); *B25J 19/06* (2013.01)

(58) Field of Classification Search
CPC .... B25J 9/0006; B25J 13/088; B25J 19/0075; B25J 19/06; B25J 9/142
See application file for complete search history.

(56) References Cited

U.S. PATENT DOCUMENTS

| 3,823,711 A | 7/1974 | Hatton |
| 3,868,952 A | 3/1975 | Hatton |

(Continued)

FOREIGN PATENT DOCUMENTS

| CN | 101151071 A | 3/2008 |
| CN | 103412003 A | 11/2013 |

(Continued)

OTHER PUBLICATIONS

Chinese Patent Office Notification to Grant Patent Right for Invention dated Jul. 10, 2023; Application No. 201880024597.X; 2 pages.

(Continued)

*Primary Examiner* — Ian Jen
(74) *Attorney, Agent, or Firm* — Davis Wright Tremaine LLP

(57) ABSTRACT

An exoskeleton system, the exoskeleton system comprising one or more actuator units that include a fluidic actuator, one or more sensors and an exoskeleton device. The exoskeleton device includes a fluidic system, and a processor and memory, the memory storing instructions, that when executed by the processor, are configured to control the exoskeleton system to introduce fluid to the fluidic actuator of the one or more actuator units to cause actuation of the fluidic actuator of the one or more actuator units. The exoskeleton system may be configured to operate in, on or around a body of water and can be water and/or corrosion resistant.

20 Claims, 18 Drawing Sheets

(51) Int. Cl.
  *B25J 19/00* (2006.01)
  *B25J 19/06* (2006.01)

(56) References Cited

U.S. PATENT DOCUMENTS

| | | | |
|---|---|---|---|
| 3,982,531 | A | 9/1976 | Shaffer |
| 3,993,056 | A | 11/1976 | Rabischong et al. |
| 4,274,399 | A | 6/1981 | Mummert |
| 4,523,582 | A | 6/1985 | Barber |
| 4,671,258 | A | 6/1987 | Barthlome |
| 4,944,755 | A | 7/1990 | Hennequin et al. |
| 5,033,457 | A | 7/1991 | Bonutti |
| 5,169,169 | A | 12/1992 | Crawford |
| 5,295,704 | A | 3/1994 | Flock |
| 5,483,838 | A | 1/1996 | Holden |
| 5,780,123 | A | 7/1998 | Kamiyama et al. |
| 5,951,048 | A | 9/1999 | Slaughter |
| 6,117,507 | A | 9/2000 | Smith |
| 6,248,463 | B1 | 6/2001 | Dopp et al. |
| 6,612,340 | B1 | 9/2003 | Lause |
| 6,776,769 | B2 | 8/2004 | Smith |
| 7,086,322 | B2 | 8/2006 | Schulz |
| 7,479,121 | B2 | 1/2009 | Branch |
| 7,628,766 | B1 | 12/2009 | Kazerooni et al. |
| 8,171,570 | B2 | 5/2012 | Adarraga |
| 8,784,350 | B2 | 7/2014 | Cohen |
| 9,205,560 | B1 | 12/2015 | Edsinger et al. |
| 9,709,206 | B2 | 7/2017 | Duttenhoefer et al. |
| 9,821,475 | B1 | 11/2017 | Lynn et al. |
| 9,827,667 | B2 | 11/2017 | Griffith et al. |
| 9,995,321 | B2 | 6/2018 | Lynn et al. |
| 10,012,229 | B2 | 7/2018 | Lynn et al. |
| 10,245,204 | B2 | 4/2019 | Sandler et al. |
| 10,543,110 | B2 | 1/2020 | Piercy et al. |
| 10,548,800 | B1 | 2/2020 | Barnes |
| 10,562,180 | B2 | 2/2020 | Telleria et al. |
| 10,605,365 | B1 | 3/2020 | Griffith et al. |
| 10,611,020 | B2 | 4/2020 | Griffith et al. |
| 10,619,633 | B2 | 4/2020 | Lynn et al. |
| 10,702,742 | B2 | 7/2020 | Sharma et al. |
| 10,780,011 | B2 | 9/2020 | Yang et al. |
| 10,780,012 | B2 | 9/2020 | Lamb et al. |
| 10,966,895 | B2 | 4/2021 | Lamb et al. |
| 11,033,450 | B2 | 6/2021 | Lamb et al. |
| 11,213,417 | B2 | 1/2022 | Piercy et al. |
| 11,259,979 | B2 | 3/2022 | Swift et al. |
| 11,351,083 | B2 | 6/2022 | Swift et al. |
| 11,498,203 | B2 | 11/2022 | Ding et al. |
| 11,801,153 | B2 | 10/2023 | Bulea et al. |
| 2001/0029343 | A1 | 10/2001 | Seto et al. |
| 2002/0026794 | A1 | 3/2002 | Shahinpoor et al. |
| 2004/0010720 | A1 | 1/2004 | Singh et al. |
| 2004/0140295 | A1 | 7/2004 | Herres |
| 2004/0176715 | A1 | 9/2004 | Nelson |
| 2005/0066810 | A1 | 3/2005 | Schulz |
| 2005/0102863 | A1 | 5/2005 | Hannon et al. |
| 2005/0107726 | A1 | 5/2005 | Oyen et al. |
| 2005/0124924 | A1 | 6/2005 | Slautterback et al. |
| 2005/0177082 | A1 | 8/2005 | Bledsoe |
| 2006/0069336 | A1 | 3/2006 | Krebs et al. |
| 2006/0128538 | A1 | 6/2006 | Sato et al. |
| 2006/0161220 | A1 | 7/2006 | Kobayashi et al. |
| 2006/0173552 | A1 | 8/2006 | Roy |
| 2006/0174760 | A1 | 8/2006 | Rentz |
| 2006/0184280 | A1 | 8/2006 | Oddsson et al. |
| 2006/0207726 | A1 | 9/2006 | Driver et al. |
| 2006/0211956 | A1 | 9/2006 | Sankai |
| 2007/0042710 | A1 | 2/2007 | Mahini et al. |
| 2007/0075543 | A1 | 4/2007 | Marx et al. |
| 2007/0239087 | A1 | 10/2007 | Kivisto |
| 2008/0009771 | A1 | 1/2008 | Perry et al. |
| 2008/0161937 | A1 | 7/2008 | Sankai |
| 2008/0195005 | A1 | 8/2008 | Horst et al. |
| 2008/0234608 | A1 | 9/2008 | Sankai |
| 2008/0287850 | A1 | 11/2008 | Adarraga |
| 2009/0024061 | A1 | 1/2009 | Ueda et al. |
| 2009/0118656 | A1 | 5/2009 | Ingimundarson et al. |
| 2009/0276058 | A1 | 11/2009 | Ueda et al. |
| 2010/0040936 | A1 | 2/2010 | Pozin et al. |
| 2010/0094188 | A1 | 4/2010 | Goffer et al. |
| 2010/0114329 | A1 | 5/2010 | Casler et al. |
| 2010/0204627 | A1 | 8/2010 | Kazerooni et al. |
| 2010/0217169 | A1 | 8/2010 | Ingimundarson |
| 2010/0249675 | A1 | 9/2010 | Fujimoto et al. |
| 2010/0270771 | A1 | 10/2010 | Kobayashi et al. |
| 2010/0280424 | A1 | 11/2010 | Kawakami et al. |
| 2011/0059355 | A1 | 3/2011 | Zhang et al. |
| 2011/0066088 | A1 | 3/2011 | Little et al. |
| 2011/0071417 | A1 | 3/2011 | Liu et al. |
| 2011/0099026 | A1 | 4/2011 | Oakley et al. |
| 2011/0105966 | A1 | 5/2011 | Kazerooni et al. |
| 2011/0112447 | A1 | 5/2011 | Hsiao-Wecksler et al. |
| 2011/0118635 | A1 | 5/2011 | Yamamoto |
| 2011/0186208 | A1 | 8/2011 | Cartabbia et al. |
| 2011/0290798 | A1 | 12/2011 | Corbett et al. |
| 2012/0059291 | A1 | 3/2012 | Nguyen |
| 2012/0259429 | A1 | 10/2012 | Han et al. |
| 2012/0259431 | A1 | 10/2012 | Han et al. |
| 2012/0271211 | A1 | 10/2012 | Bledsoe |
| 2012/0289870 | A1 | 11/2012 | Hsiao-Wecksler et al. |
| 2012/0316477 | A1 | 12/2012 | Hamaya et al. |
| 2012/0328824 | A1 | 12/2012 | Cartabbia et al. |
| 2013/0053736 | A1 | 2/2013 | Konishi |
| 2013/0150980 | A1 | 6/2013 | Swift et al. |
| 2013/0158445 | A1 | 6/2013 | Kazerooni et al. |
| 2013/0172797 | A1 | 7/2013 | Merkley et al. |
| 2013/0197408 | A1 | 8/2013 | Goldfarb et al. |
| 2013/0245512 | A1 | 9/2013 | Goffer et al. |
| 2013/0289452 | A1 | 10/2013 | Smith et al. |
| 2013/0296746 | A1 | 11/2013 | Herr et al. |
| 2014/0109560 | A1 | 4/2014 | Ilievski et al. |
| 2014/0124557 | A1 | 5/2014 | Velarde |
| 2014/0148745 | A1 | 5/2014 | Castillo |
| 2014/0171838 | A1 | 6/2014 | Aleksov et al. |
| 2014/0207037 | A1 | 7/2014 | Horst |
| 2014/0212243 | A1 | 7/2014 | Yagi et al. |
| 2014/0276264 | A1 | 9/2014 | Caires et al. |
| 2014/0277739 | A1 | 9/2014 | Kornbluh et al. |
| 2014/0318118 | A1 | 10/2014 | Mazzeo et al. |
| 2014/0358290 | A1 | 12/2014 | Kazerooni et al. |
| 2015/0005685 | A1 | 1/2015 | Chetlapalli et al. |
| 2015/0088043 | A1 | 3/2015 | Goldfield et al. |
| 2015/0108191 | A1 | 4/2015 | Velarde |
| 2015/0126911 | A1 | 5/2015 | Abramowicz et al. |
| 2015/0134080 | A1 | 5/2015 | Roh |
| 2015/0157525 | A1 | 6/2015 | Choi et al. |
| 2015/0173927 | A1 | 6/2015 | Castillo |
| 2015/0173993 | A1 | 6/2015 | Walsh et al. |
| 2015/0209214 | A1 | 7/2015 | Herr et al. |
| 2015/0285238 | A1 | 10/2015 | Lynn et al. |
| 2015/0290794 | A1 | 10/2015 | Griffith et al. |
| 2015/0302162 | A1 | 10/2015 | Hughes et al. |
| 2015/0351991 | A1 | 12/2015 | Amundson et al. |
| 2015/0351995 | A1 | 12/2015 | Zoss et al. |
| 2016/0045386 | A1 | 2/2016 | Sandler et al. |
| 2016/0058647 | A1 | 3/2016 | Maddry |
| 2016/0074272 | A1 | 3/2016 | Ahn et al. |
| 2016/0082319 | A1 | 3/2016 | Macri et al. |
| 2016/0107309 | A1 | 4/2016 | Walsh et al. |
| 2016/0143800 | A1 | 5/2016 | Hyung et al. |
| 2016/0158087 | A1 | 6/2016 | Huang et al. |
| 2016/0213548 | A1 | 7/2016 | John et al. |
| 2016/0242986 | A1 | 8/2016 | Nagata et al. |
| 2016/0242987 | A1 | 8/2016 | Nagata et al. |
| 2016/0252110 | A1 | 9/2016 | Galloway et al. |
| 2016/0261224 | A1 | 9/2016 | Madrone et al. |
| 2016/0278948 | A1 | 9/2016 | Piercy et al. |
| 2016/0297504 | A1 | 10/2016 | Saindon et al. |
| 2016/0300156 | A1 | 10/2016 | Bowers et al. |
| 2016/0302955 | A1 | 10/2016 | Siddiqui et al. |
| 2016/0331557 | A1 | 11/2016 | Tong et al. |
| 2016/0331560 | A1 | 11/2016 | Tong et al. |
| 2016/0331624 | A1 | 11/2016 | Sankai et al. |
| 2016/0346156 | A1 | 12/2016 | Walsh et al. |

(56) References Cited

U.S. PATENT DOCUMENTS

| | | |
|---|---|---|
| 2017/0018761 A1 | 1/2017 | Ogino |
| 2017/0049587 A1 | 2/2017 | Herr et al. |
| 2017/0071812 A1 | 3/2017 | Sandler et al. |
| 2017/0202725 A1 | 7/2017 | Robertson et al. |
| 2017/0246068 A1 | 8/2017 | Schultz et al. |
| 2017/0252255 A1 | 9/2017 | Asano et al. |
| 2017/0279126 A1 | 9/2017 | Dreher |
| 2017/0282360 A1 | 10/2017 | Telleria et al. |
| 2018/0042803 A1 | 2/2018 | Amundson |
| 2018/0056104 A1 | 3/2018 | Cromie et al. |
| 2018/0079071 A1 | 3/2018 | Griffith et al. |
| 2018/0086178 A1 | 3/2018 | Stanek et al. |
| 2018/0090961 A1 | 3/2018 | Namolovan et al. |
| 2018/0092536 A1 | 4/2018 | Sandler et al. |
| 2018/0125152 A1 | 5/2018 | Bruel |
| 2018/0221237 A1 | 8/2018 | Swift et al. |
| 2018/0235830 A1 | 8/2018 | Rokosz et al. |
| 2018/0264642 A1 | 9/2018 | Harding et al. |
| 2018/0283414 A1 | 10/2018 | Lynn et al. |
| 2018/0290009 A1 | 10/2018 | Avila |
| 2018/0296424 A1 | 10/2018 | Parra et al. |
| 2018/0296425 A1 | 10/2018 | Lamb et al. |
| 2018/0330817 A1 | 11/2018 | Avni et al. |
| 2019/0015233 A1 | 1/2019 | Galloway et al. |
| 2019/0029918 A1 | 1/2019 | Inada et al. |
| 2019/0060156 A1 | 2/2019 | Swift et al. |
| 2019/0060157 A1 | 2/2019 | Lamb et al. |
| 2019/0083002 A1 | 3/2019 | Jang et al. |
| 2019/0090744 A1 | 3/2019 | Mahfouz |
| 2019/0099877 A1 | 4/2019 | Goehlich et al. |
| 2019/0105215 A1 | 4/2019 | Dalley et al. |
| 2019/0240103 A1 | 8/2019 | Hepler et al. |
| 2019/0280266 A1 | 9/2019 | Zhang et al. |
| 2019/0283235 A1 | 9/2019 | Nam et al. |
| 2019/0290464 A1 | 9/2019 | Fleming |
| 2019/0293223 A1 | 9/2019 | Free et al. |
| 2019/0307583 A1 | 10/2019 | Herr et al. |
| 2019/0328604 A1 | 10/2019 | Contreras-Vidal et al. |
| 2019/0344433 A1 | 11/2019 | Lerner |
| 2019/0344434 A1 | 11/2019 | Lerner |
| 2019/0350735 A1 | 11/2019 | Ingimundarson et al. |
| 2019/0383313 A1 | 12/2019 | Fowler et al. |
| 2020/0069441 A1 | 3/2020 | Larose et al. |
| 2020/0114588 A1 | 4/2020 | Wang et al. |
| 2020/0206899 A1 | 7/2020 | Storz et al. |
| 2020/0223071 A1 | 7/2020 | Mahoney et al. |
| 2020/0253808 A1 | 8/2020 | Swift et al. |
| 2020/0410892 A1 | 12/2020 | Otsuki et al. |
| 2021/0162262 A1 | 6/2021 | Lee |
| 2021/0177686 A1 | 6/2021 | Lamson et al. |
| 2021/0369539 A1 | 12/2021 | Campbell et al. |
| 2021/0369540 A1 | 12/2021 | Kemper et al. |
| 2021/0369541 A1 | 12/2021 | Stuart et al. |
| 2021/0369542 A1 | 12/2021 | Stuart et al. |
| 2021/0370493 A1 | 12/2021 | Samia et al. |
| 2021/0370494 A1 | 12/2021 | Hurley et al. |
| 2021/0370495 A1 | 12/2021 | Swartz et al. |
| 2021/0370496 A1 | 12/2021 | Stuart et al. |
| 2021/0386611 A1 | 12/2021 | Dalley et al. |
| 2022/0087833 A1 | 3/2022 | Farris |
| 2022/0407129 A1 | 12/2022 | Phares |
| 2023/0055998 A1* | 2/2023 | Park .................. B25J 9/101 |

FOREIGN PATENT DOCUMENTS

| | | |
|---|---|---|
| CN | 104582668 A | 4/2015 |
| CN | 105205436 A | 12/2015 |
| CN | 204814712 U | 12/2015 |
| CN | 105264255 A | 1/2016 |
| CN | 105590409 A | 5/2016 |
| CN | 105816301 A | 8/2016 |
| CN | 105992554 A | 10/2016 |
| CN | 106029039 A | 10/2016 |
| CN | 106137489 A | 11/2016 |
| CN | 106413998 A | 2/2017 |
| CN | 106420279 A | 2/2017 |
| CN | 106650224 A | 5/2017 |
| CN | 111135031 A | 5/2020 |
| CN | 111278398 A | 6/2020 |
| CN | 111571568 A | 8/2020 |
| DE | 102011107580 A1 | 1/2013 |
| EP | 2827809 A1 | 1/2015 |
| EP | 3173191 A2 | 5/2017 |
| EP | 3576707 A4 | 3/2021 |
| FR | 1463850 A | 7/1966 |
| JP | S601405 A | 1/1985 |
| JP | 1987501723 A | 7/1987 |
| JP | S62501723 A | 7/1987 |
| JP | 1988199965 A | 8/1988 |
| JP | S63199965 A | 8/1988 |
| JP | H07163607 A | 6/1995 |
| JP | 2000051289 A | 2/2000 |
| JP | 2005296103 A | 10/2005 |
| JP | 2006000347 A | 1/2006 |
| JP | 2007282991 A | 11/2007 |
| JP | 2011058564 A | 3/2011 |
| JP | 2011173211 A | 9/2011 |
| JP | 2012501739 A | 1/2012 |
| JP | 3179088 U | 10/2012 |
| JP | 2012532001 | 12/2012 |
| JP | 2012532001 | 12/2012 |
| JP | 2014023773 A | 2/2014 |
| JP | 2015008938 A | 1/2015 |
| JP | 2015089386 A | 5/2015 |
| JP | 2016521212 A | 7/2016 |
| JP | 2016137146 | 8/2016 |
| JP | 2017086296 A | 5/2017 |
| JP | 2017154210 A | 9/2017 |
| JP | 2018019899 A | 2/2018 |
| JP | 2018184266 A | 11/2018 |
| JP | 2019500928 A | 1/2019 |
| JP | 2019093464 A | 6/2019 |
| JP | 2020518295 A | 6/2020 |
| JP | 6860743 B2 | 4/2021 |
| KR | 10-2008-0048450 A | 6/2008 |
| KR | 10-2011-0104781 A | 9/2011 |
| KR | 10-2012-0025571 A | 3/2012 |
| KR | 10-2014-0062931 A | 5/2014 |
| KR | 20160020780 A | 2/2016 |
| KR | 101812603 B1 | 12/2017 |
| KR | 10-2020-0052323 A | 5/2020 |
| KR | 10-2020-0144460 A | 12/2020 |
| KR | 10-2021-0033449 A | 3/2021 |
| SU | 251758 | 11/1970 |
| WO | 8603816 A1 | 7/1986 |
| WO | 9722782 A1 | 6/1997 |
| WO | 0004852 A1 | 2/2000 |
| WO | 2009081710 A1 | 7/2009 |
| WO | 2010124172 A2 | 10/2010 |
| WO | 2011043095 A1 | 4/2011 |
| WO | 2012044621 A1 | 4/2012 |
| WO | 2012086202 A1 | 6/2012 |
| WO | 2012124853 A1 | 9/2012 |
| WO | 2013142777 A1 | 9/2013 |
| WO | 2013152929 A1 | 10/2013 |
| WO | 2014109799 A1 | 7/2014 |
| WO | 2014194257 A1 | 12/2014 |
| WO | 2015080596 A1 | 6/2015 |
| WO | 2015104832 A1 | 7/2015 |
| WO | 2016147195 A1 | 9/2016 |
| WO | 2016166442 A1 | 10/2016 |
| WO | 2016166588 A1 | 10/2016 |
| WO | 2016171548 A1 | 10/2016 |
| WO | 2016207855 A1 | 12/2016 |
| WO | 2017110453 A1 | 6/2017 |
| WO | 2017218661 A1 | 12/2017 |
| WO | 2018144937 A1 | 8/2018 |
| WO | 2018191710 A1 | 10/2018 |
| WO | 2018218336 A1 | 12/2018 |
| WO | 2018236225 A1 | 12/2018 |
| WO | 2019046488 A1 | 3/2019 |
| WO | 2019046489 A1 | 3/2019 |
| WO | 2019122364 A1 | 6/2019 |
| WO | 2019131386 A1 | 7/2019 |

(56) References Cited

FOREIGN PATENT DOCUMENTS

| WO | 2019183397 A1 | 9/2019 |
|---|---|---|
| WO | 2019187030 A1 | 10/2019 |
| WO | 2020049886 A1 | 3/2020 |
| WO | 2021096874 A1 | 5/2021 |
| WO | 2021119512 A1 | 6/2021 |
| WO | 2021242742 A1 | 12/2021 |

OTHER PUBLICATIONS

USPTO Non-Final Office Action in U.S. Appl. No. 17/327,121 dated Aug. 29, 2023, 8 pages.
Yoshikawa, "Human Interface Using Hand Movement Recognition Method Based on Myoelectricity," Next Generation Human Interface Development Frontier, Jun. 11, 2013, 14 pages.
Canadian IPO Office Action and Examination Search Report dated Mar. 21, 2023, Patent Application No. 3,051,105, 7 pages.
Chinese Patent Office Fourth Office Action dated Mar. 31, 2023, Application No. 201880023218.5; 7 pages.
Japan First Office Action, Application No. 2022-072995 dated Mar. 8, 2023, 2 pages.
USPTO Office Action in U.S. Appl. No. 16/827,484 dated Mar. 15, 2023, 13 pages.
USPTO Office Action in U.S. Appl. No. 16/838,347 dated Jun. 8, 2023, 5 pages.
USPTO Office Action in U.S. Appl. No. 16/862,400 dated Mar. 22, 2023, 13 pages.
USPTO Office Action in U.S. Appl. No. 17/119,825 dated May 23, 2023, 19 pages.
USPTO Office Action in U.S. Appl. No. 17/119,830 dated Mar. 15, 2023, 23 pages.
USPTO Office Action in U.S. Appl. No. 17/558,481 dated Mar. 23, 2023, 49 pages.
Notification of Grant of Chinese Patent Application No. 201880056709 dated May 18, 2022, 2 pages.
Tamez-Duque et al., "Real-time strap pressure sensor system for powered exoskeletons," Sensors 15(2):4550-4563, Feb. 2015.
Taniguchi, "Flexible Artificial Muscle Actuator Using Coiled Shape 5 Memory Alloy Wires," APCBEE Procedia 7:54-59, Jan. 1, 2013.
Branham, "3 Advantages of Using an Oval Bore Compact Cylinder," W.C. Branham Blog—Solutions in Motion™. Retrieved Feb. 9, 2023, from https://blog.wcbranham.com/oval-bore-compact-cylinder, Jan. 12, 2018, 7 pages.
Chinese Patent Office Decision on Rejection dated Nov. 25, 2022; Application No. 201880024597; 11 pages.
Chinese Patent Office Decision on Rejection dated Oct. 10, 2022; Application No. 201880024597; 11 pages.
Chinese Patent Office Notification to Grant Patent Right for Invention dated Nov. 4, 2022; Application No. 201880056518.3; 2 pages.
Chinese Patent Office Second Office Action and Supplementary Search Report dated Apr. 25, 2022; Application No. 201880023218.5; 15 pages.
Chinese Patent Office Second Office Action and Supplementary Search Report dated Mar. 30, 2022; Application No. 201880024598; 15 pages.
Chinese Patent Office Second Office Action dated Jul. 13, 2022; Application No. 201880056518.3; 6 pages.
Chinese Patent Office Supplemental Search Report dated Jul. 4, 2022, Application No. 201880056518.3, 4 pages.
Chinese Patent Office Third Office Action dated Oct. 20, 2022; Application No. 201880023218.5; 8 pages.
European Patent Office Communication under Rule 71(3) EPC dated Apr. 19, 2022, Application No. 18 850 236.3, 46 pages.
European Patent Office Communication under Rule 71(3) EPC dated Nov. 29, 2022, Application No. 18 783 314.9, 46 pages.
European Patent Office Communication Under Rule 71(3) EPC, Application No. 18 783 814.9 dated Aug. 11, 2022, 44 pages.
European Patent Office Extended Search Report dated Oct. 18, 2022, Patent Application No. 22181044.3-1122, 7 pages.
European Patent Office Notice of Intention to Grant, Application No. 18783814.9, Nov. 29, 2022, 8. pages.
Huang et al., "Interactive learning for sensitivity factors of a human-powered augmentation lower exoskeleton," 2015 IEEE/RSJ International Conference on Intelligent Robots and Systems (IROS), Sep. 28, 2015, 7 pages.
International Search Report and Written Opinion mailed Apr. 26, 2018, International Patent Application No. PCT/US2018/016729, filed Feb. 2, 2018, 7 pages.
International Search Report and Written Opinion mailed Aug. 26, 2021, Patent Application No. PCT/US2021/034444, 7 pages.
International Search Report and Written Opinion mailed Aug. 26, 2021, Patent Application No. PCT/US2021/034447, 7 pages.
International Search Report and Written Opinion mailed Aug. 26, 2021, Patent Application No. PCT/US2021/034593, 10 pages.
International Search Report and Written Opinion mailed Dec. 1, 2022, Patent Application No. PCT/US2022/075098, 12 pages.
International Search Report and Written Opinion mailed Dec. 1, 2022, Patent Application No. PCT/US2022/075099, 12 pages.
International Search Report and Written Opinion mailed Dec. 5, 2022, Patent Application No. PCT/US2022/075097, 11 pages.
International Search Report and Written Opinion mailed Dec. 6, 2018, International Patent Application No. PCT/US2018/048638, filed Aug. 29, 2018, 8 pages.
International Search Report and Written Opinion mailed Dec. 6, 2018, Patent Application No. PCT/US2018/048639, 7 pages.
International Search Report and Written Opinion mailed Dec. 6, 2022, Patent Application No. PCT/US2022/075095, 10 pages.
International Search Report and Written Opinion mailed Jul. 18, 2016, International Patent Application No. PCT/US2016/024366, filed Mar. 25, 2016, 7 pages.
International Search Report and Written Opinion mailed Jul. 19, 2018, International Patent Application No. PCT/US2018/027643, filed Apr. 13, 2018, 7 pages.
International Search Report and Written Opinion mailed Jun. 3, 2021, Patent Application No. PCT/US2021/019711, 12 pages.
International Search Report and Written Opinion mailed Mar. 30, 2021, Patent Application No. PCT/US2020/064647, 10 pages.
International Search Report and Written Opinion mailed Nov. 29, 2022, International Patent Application No. PCT/US2022/075094, filed Aug. 17, 2022, 11 pages.
International Search Report and Written Opinion mailed Nov. 29, 2022, International Patent Application No. PCT/US2022/075096, filed Aug. 17, 2022, 11 pages.
International Search Report and Written Opinion mailed Sep. 2, 2021, Patent Application No. PCT/US2021/034030, 9 pages.
International Search Report and Written Opinion mailed Sep. 2, 2021, Patent Application No. PCT/US2021/034450, 9 pages.
International Search Report and Written Opinion mailed Sep. 9, 2021, Patent Application No. PCT/US2021/034443, 8 pages.
International Search Report and Written Opinion mailed Sep. 9, 2021, Patent Application No. PCT/US2021/034579, 8 pages.
International Search Report and Writtent Opinion mailed Aug. 26, 2021, Patent Application No. PCT/US2021/034468, 8 pages.
Israel Notice of Acceptance for Patent Application No. 268306 dated Feb. 1, 2023, 3 pages.
Israel Notice of Acceptance for Patent Application No. 272621 dated Dec. 22, 2022, 4 pages.
Israel Notice of Deficiencies for Patent Application 269860 dated Jul. 25, 2022, 5 pages.
Israel Notice of Deficiencies for Patent Application No. 269860 dated Jul. 25, 2022, 5 pages.
Israel Notice of Deficiencies for Patent Application No. 272623 dated Dec. 7, 2022, 4 pages.
Israel Notice of Deficiencies for Patent Application No. 282165 dated Dec. 18, 2022, 4 pages.
Japan Decision to Grant Application No. 2020-512042 dated Jan. 13, 2023, 2 pages.
Japan Final Office Action and Decision to Reject Amendment of Application No. 2019-554877 dated Nov. 7, 2022, 4 pages.
Japan Final Rejection of Application No. 2019-563328 dated Jul. 6, 2022, 2 pages.

(56) References Cited

OTHER PUBLICATIONS

Japan Patent Office, "Final Rejection" in Applicaiton No. 2019-563328, Sep. 9, 2022, 4 pages.
Japanese IPO Final Rejection of Application No. 2019-563328, Aug. 9, 2022, 2 pages.
Japanese IPO Notification of Reason for Rejection of Application No. 2020-512042, Jun. 27, 2022, 2 pages.
Lamb, WO 2018191710 A1 Oct. 18, 2018 (full text). [online] [retrieved on Feb. 9, 2023]. Retrieved from Clarivate Analytics, 2018, 15 pages.
National Intellectual Property Administration, P. R. China, "2nd Office Action" in Application No. 201880023218.5, Apr. 25, 2022, 15 pages.
U.S. Appl. No. 17/329,632, filed May 25, 2021.
U.S. Appl. No. 17/332,818, filed May 27, 2021.
U.S. Appl. No. 17/331,956, filed May 27, 2021.
U.S. Appl. No. 17/331,961, filed May 27, 2021.
U.S. Appl. No. 17/332,203, filed May 27, 2021.
U.S. Appl. No. 17/332,172, filed May 27, 2021.
U.S. Appl. No. 17/332,507, filed May 27, 2021.
U.S. Appl. No. 17/332,860, filed May 27, 2021.
U.S. Appl. No. 17/889,570, filed Aug. 17, 2022.
U.S. Appl. No. 17/889,575, filed Aug. 17, 2022.
U.S. Appl. No. 17/889,589, filed Aug. 17, 2022.
U.S. Appl. No. 17/889,603, filed Aug. 17, 2022.
U.S. Appl. No. 17/890,070, filed Aug. 17, 2022.
European Patent Office Extended Search Report dated Jan. 29, 2024, Application No. 23196713.4, 7 pages.
European Patent Office Extended Search Report, Application No. 21812810.6 dated Jan. 18, 2024, 8 pages.
European Patent Office Extended Search Report, Application No. 21813358.5 dated Jan. 24, 2024, 9 pages.
European Patent Office Supplementary Search Report dated Jan. 30, 2024, Application No. 21814414.5, 12 pages.
Israel Notice of Deficiencies for Patent Application 269860 dated Jan. 10, 2024, 4 pages.
Israel Notice of Deficiencies for Patent Application 269860 dated Nov. 14, 2023, 4 pages.
Japan IPO Office Action dated Feb. 13, 2024, Application No. 2022-573515, 5 pages.
Japan IPO Trial Decision Allowing Application No. 2019-554877 dated Apr. 1, 2024, 2 pages.
Japan Office Action, Application No. 2022-573514 dated Dec. 27, 2023, 3 pages.
Japan Office Action, Application No. 2022-573520 dated Jan. 4, 2024, 4 pages.
Japan Office Action, Application No. 2023-034202 dated Jan. 9, 2024, 4 pages.
Japan PTO Rejection of Application No. 2022-573509 dated Dec. 4, 2023, 5 pages.
Japan PTO Rejection of Application No. 2022-573517 dated Jan. 9, 2024, 2 pages.
Japan PTO Rejection of Application No. 2022-573519 dated Jan. 9, 2024, 2 pages.
Japanese IPO Notification of Reason for Rejection of Application No. 2022-573516, Jan. 15, 2024, 3 pages.
USPTO Office Action dated Apr. 4, 2024, U.S. Appl. No. 16/838,347, 7 pages.
USPTO Office Action in U.S. Appl. No. 16/827,484 dated Dec. 4, 2023, 18 pages.
USPTO Office Action in U.S. Appl. No. 16/838,347 dated Jan. 24, 2023, 7 pages.
USPTO Office Action in U.S. Appl. No. 17/327,121 dated Aug. 29, 2023, 8 pages.
Canadian IPO Notice of Allowance dated Mar. 19, 2024, Patent Application No. 3,051, 105, 1 page.
Chu, "Human-Expsystem Adaptation," MIT School of Engineering, Oct. 2018 [retrieved Apr. 25, 2024 from https://engineering.mit.edu/engage/engineering-in-action/human-exosystem-adaptation/,] 9 pages.
Dephy, "Build Faster A Safe Robotics Platform that Actually Works?" Retrieved Apr. 25, 2024 from https://web.archive.org/web/20221226232116/https://dephy.com/faster/, 11 pages.
Dephy, "Getting Started," retrieved May 28, 2024 from https://dephy.com/start/, 23 pages.
European Patent Office Extended Search Report dated Jun. 12, 2024, Application No. 21812817.1, 12 pages.
Japan First Office Action, Application No. 2022-573518 dated Apr. 22, 2024, 2 pages.
MIT School of Engineering, "Human-exosystem Adaptation," https://www.youtube.com/watch?v=GXGHi_n1uR0, Oct. 4, 2018, 2 pages.
University of Michigan, "Understanding Exoskeletons Use Motivation," 2020 [retrieved Apr. 25, 2024 from https://neurobionics.robotics.umich.edu/research/biomechanical-science/dephy-ankle-exoskeletons/,] 4 pages.
Canadian IPO Office Action dated Jun. 27, 2024 in Application No. 3,055,435, 5 pages.
Chinese Patent Office Notification to Grant Patent Right for Invention dated Jul. 4, 2024; Application No. 2022-573514; 1 page.
European Patent Office Extended Search Report dated Jun. 17, 2024, Application No. 21814117.4, 7 pages.
European Patent Office Extended Search Report dated Jun. 21, 2024, Patent Application No. 21812103.6, 12 pages.
European Patent Office Extended Search Report dated May 28, 2024, Application No. 21814414.5, 11 pages.
European Patent Office Extended Search Report, Application No. 21812695.1 dated Jun. 18, 2024, 10 pages.
European Patent Office Extended Search Report, Application No. 21812992.2 dated Jun. 21, 2024, 11 pages.
Japan Notice of Patent Grant, Application No. 2022-573519 dated Aug. 8, 2024, 1 page.
Khalili, et al., "Studies on Practical Applications of Safe-Fall Control Strategies for Lower Limb Exoskeletons*," 2019 IEEE 16th INternational Conference on Rehabilitation Robotics, Jan. 24-28, 2019, 6 pages.

* cited by examiner

MARITIME APPLICATIONS FOR A MOBILE ROBOT

CROSS-REFERENCE TO RELATED APPLICATIONS

This application is a non-provisional of and claims the benefit of U.S. Provisional Application No. 63/234,040, filed Aug. 17, 2021, entitled "MARITIME APPLICATIONS FOR A MOBILE ROBOT,". This application is hereby incorporated herein by reference in its entirety and for all purposes.

This application is also related to U.S. patent application Ser. No. 17/329,632, filed May 25, 2021, entitled "DIRECT DRIVE PNEUMATIC TRANSMISSION FOR A MOBILE ROBOT,"; and is related to U.S. patent application Ser. No. 17/332,818, filed May 27, 2021, entitled "POWERED MEDICAL DEVICE AND METHODS FOR IMPROVED USER MOBILITY AND TREATMENT,"; and is related to U.S. patent application Ser. No. 17/331,956, filed May 27, 2021, entitled "FIT AND SUSPENSION SYSTEMS AND METHODS FOR A MOBILE ROBOT,"; and is related to U.S. patent application Ser. No. 17/331,961, filed May 27, 2021, entitled "BATTERY SYSTEMS AND METHODS FOR A MOBILE ROBOT,"; and is related to U.S. patent application Ser. No. 17/332,203, filed May 27, 2021, entitled "CONTROL SYSTEM AND METHOD FOR A MOBILE ROBOT,"; and is related to U.S. patent application Ser. No. 17/332,172, filed May 27, 2021, entitled "USER INTERFACE AND FEEDBACK SYSTEMS AND METHODS FOR A MOBILE ROBOT,"; and is related to U.S. patent application Ser. No. 17/332,507, filed May 27, 2021, entitled "DATA LOGGING AND THIRD-PARTY ADMINISTRATION OF A MOBILE ROBOT,"; and is related to U.S. patent application Ser. No. 17/332,860, filed May 27, 2021, entitled "MODULAR EXOSKELETON SYSTEMS AND METHODS,"; these applications are hereby incorporated herein by reference in their entirety for all purposes.

This application is also related to U.S. Non-Provisional Application Ser. No. 17/889,570, filed contemporaneously herewith, entitled "ACTUATOR FEATURES TO IMPROVE FUNCTION OF A MOBILE ROBOT,"; is related to U.S. Non-Provisional Application Ser. No. 17/889,575, filed contemporaneously herewith, entitled "CABLE MANAGEMENT SYSTEMS AND METHODS FOR A WEARABLE MOBILE ROBOT,"; is related to U.S. Non-Provisional Application Ser. No. 17/890,070, filed contemporaneously herewith, entitled "MOBILE POWER SOURCE FOR A MOBILE ROBOT,"; is related to U.S. Non-Provisional Application Ser. No. 17/889,589, filed contemporaneously herewith, entitled "UNIFIED PNEUMATIC AND ELECTRICAL CONNECTOR SYSTEM AND METHOD,"; and is related to U.S. Non-Provisional Application Ser. No. 17/889,603, filed contemporaneously herewith, entitled "DATA INFERENCES FROM A WEARABLE ROBOT,". These applications are hereby incorporated herein by reference in their entirety and for all purposes.

BRIEF DESCRIPTION OF THE DRAWINGS

FIG. 17b illustrates a side view of the pneumatic actuator of FIG. 17a in an expanded configuration showing the cross section of FIG. 17a.

Figure 1:
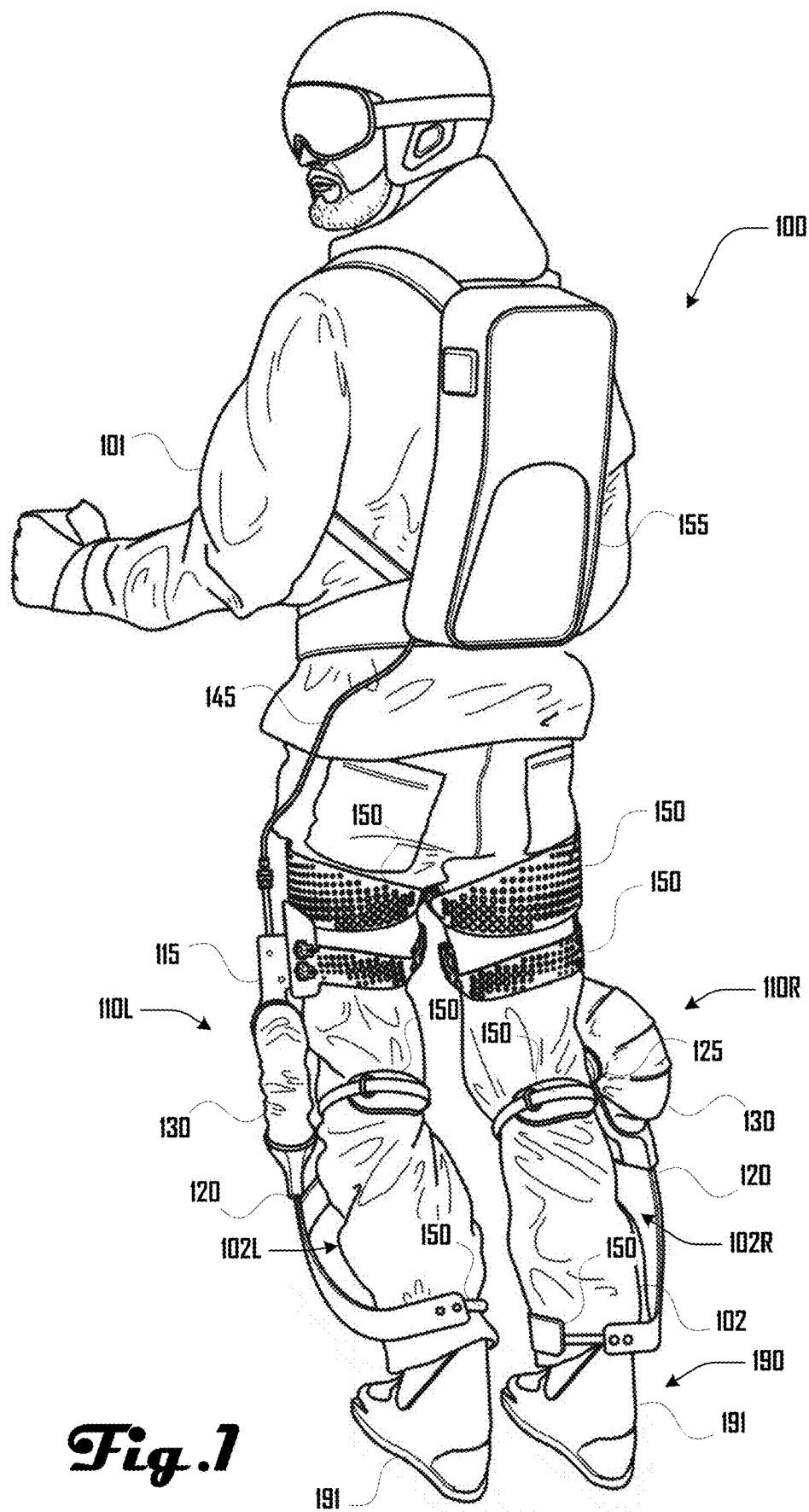
FIG. 1 is an example illustration of an embodiment of an exoskeleton system being worn by a user.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

The following disclosure also includes example embodiments of the design of novel exoskeleton devices or mobile robot systems. Various preferred embodiments include: a leg brace with integrated actuation, a mobile power source and a control unit that determines the output behavior of the device in real time. In various embodiments, a brace uses a fluidic actuator to help the user move. In order to function, in some examples the brace needs a power and fluid supply and the ability to communicate to receive and send data. In one embodiment, the system can comprise, consist essentially of or consist of a power pack strapped onto the torso of the user and one or more braces worn around the knee(s) of the user. These two components can be connected together in various embodiments so that the brace may communicate with the power pack and/or receive power and fluid from the power pack. This is done in some examples through the use of power and fluidic cables on both components.

There are many different scenarios and environments that an exoskeleton or mobile robot system may be used in. For example, the robot may be used in cold or hot weather, rain or snow, or in freshwater or saltwater. In order to be used in these scenarios, the robot can be made of material to survive these environments and have features that allow it to be usable in multiple scenarios.

In various embodiments, it can be desirable for the exoskeleton or mobile robot system to be capable of being used in many different scenarios in which damage is likely. These scenarios can include inclement weather, wet locations, such as in a pool or in the sea, unsanitary locations, or high-impact drops. In a preferred embodiment, the exoskeleton or mobile robot system can be made corrosion resistant and waterproof. In such an embodiment, corrosion resistant materials used to construct the brace and actuator parts can be sealed tightly, and can use sealing features to keep water out of the system. Such corrosion resistance and/or waterproofing can allow the exoskeleton system to operate while submerged in a body of water such as an ocean, pond, river, or the like. In various embodiments, such corrosion resistance and/or waterproofing can allow for the exoskeleton system to operate submerged in the body of water for at least 5 minutes, 10 minutes, 15 minutes, 30 minutes, 60 minutes, 2 hours, 4 hours, 6 hours, 12 hours, 24 hours, or the like. Various materials may be used including, but not limited to, stainless steel, aluminum, or plastics. The waterproof features in various examples can allow the system to be easily cleaned with water and allow dirt, salt, and sand or other particles that may damage the system to be removed. Regular cleaning may also prevent rusting or corrosion of the materials.

Some embodiments include maritime applications for soldiers or sailors on high-speed boats. Such personnel are often injured due to the impacts that their bodies take on the boat as the boat is skipping over waves or being buffeted in rough seas. This often manifests as damage to their knees, back, spine, neck, and brain (e.g., traumatic brain injury or TBI). Various embodiments herein can help by acting as a shock absorber at the knees or other body parts. A controller of some embodiments can work in two phases. For example, when the user is fairly upright, it may be desirable to not lock out their knees, as it can prevent them from being able to crouch and bend their knees. Accordingly, a first phase of support can be a progressively increasing pressure in the actuator until a certain threshold is reached and the user is crouched enough. Once a knee joint value (threshold) is passed, a constant pressure can be maintained in the actuator to provide support/cushioning to help the user absorb the impact.

In various embodiments, the controls for actuation can be dependent on the knee angle of a joint. For example, when the leg is fairly straight (e.g., high joint angle value), it may not be desirable for there to be too much pressure, as this can cause the leg to "lock out" making it hard for the user to bend his legs appropriately to mitigate a shock. As the legs begin to collapse (flexion), it can be desirable to increase the pressure until a threshold value, at which point pressure can be held constant, variable, or some combination thereof, to support the user. A first configuration can include the leg straight and no pressure, increasing in pressure dependent on the joint angle, and a second configuration can be once the knee is flexed a certain amount, to keep pressure constant, variable, or some combination thereof. This can help the user protect his knees and back in various examples.

In various embodiments, a portions of an exoskeleton system or mobile robot can be integrated with a boat. For example, in some embodiments, a powerpack or exoskeleton device can be worn on the user or be temporarily mounted to the boat (e.g., hung on the back of a chair, taped down at their feet to the deck of the boat, etc.). In some embodiments, a powerpack or exoskeleton device can have a more permanent integration with a boat, such as with larger compressor/batteries integrated in the boat.

A component of an exoskeleton system that is present in various embodiments is a body-worn, lower-extremity brace that incorporates the ability to introduce torque to the user. One preferred embodiment of this component is a leg brace that is configured to support the knee of the user and includes actuation across the knee joint to provide assistance torques in the extension direction. This embodiment can connect to the user through a series of attachments including one on the boot, below the knee, and along the user's thigh. This preferred embodiment can include this type of leg brace on both legs of the user.

The present disclosure teaches example embodiments of a fluidic exoskeleton system that includes one or more adjustable fluidic actuators. Some preferred embodiments include a fluidic actuator that can be operated at various pressure levels with a large stroke length in a configuration that can be oriented with a joint on a human body.

Figure 2:
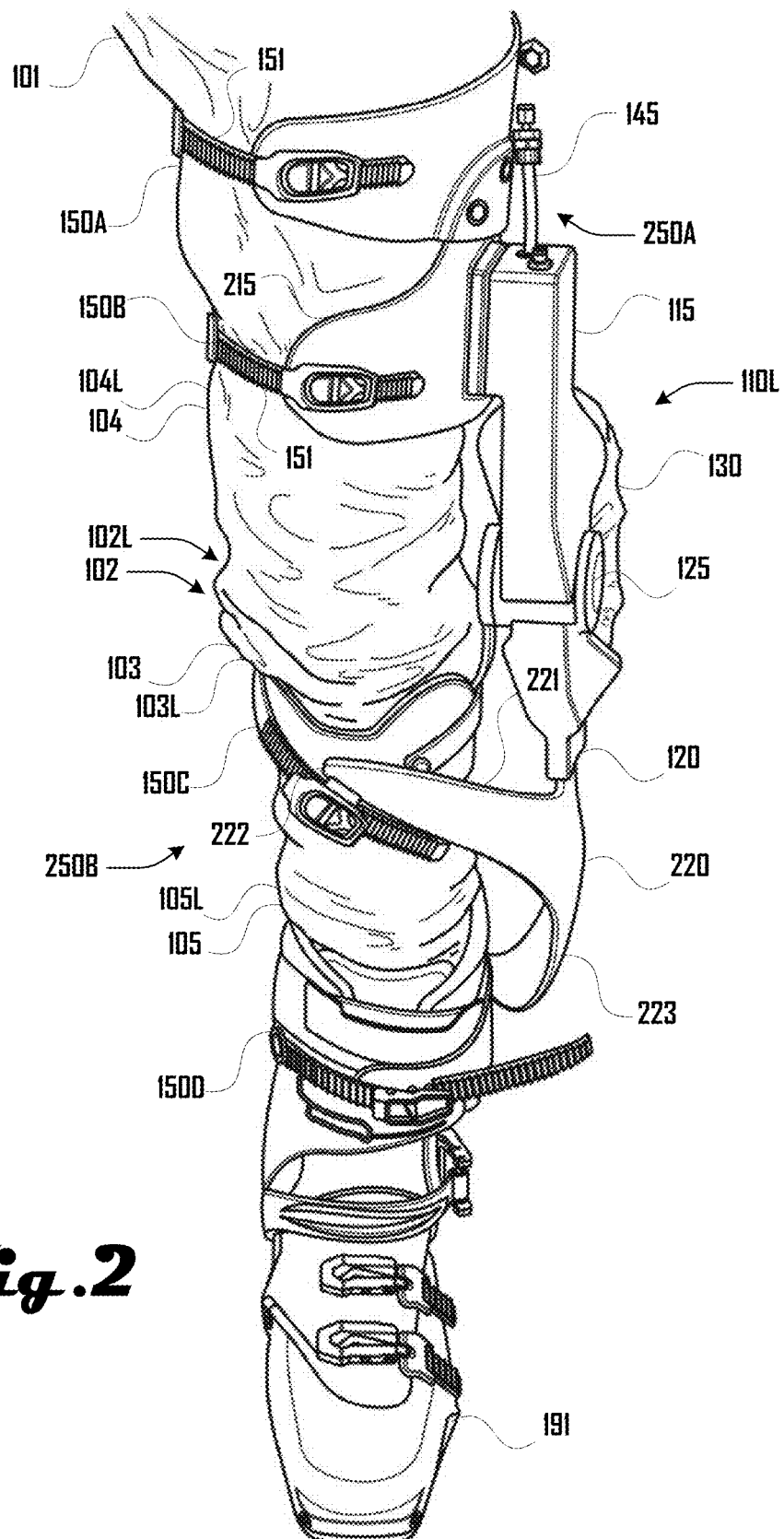
FIG. 2 is a front view of an embodiment of a leg actuation unit coupled to one leg of a user.
Figure 3:
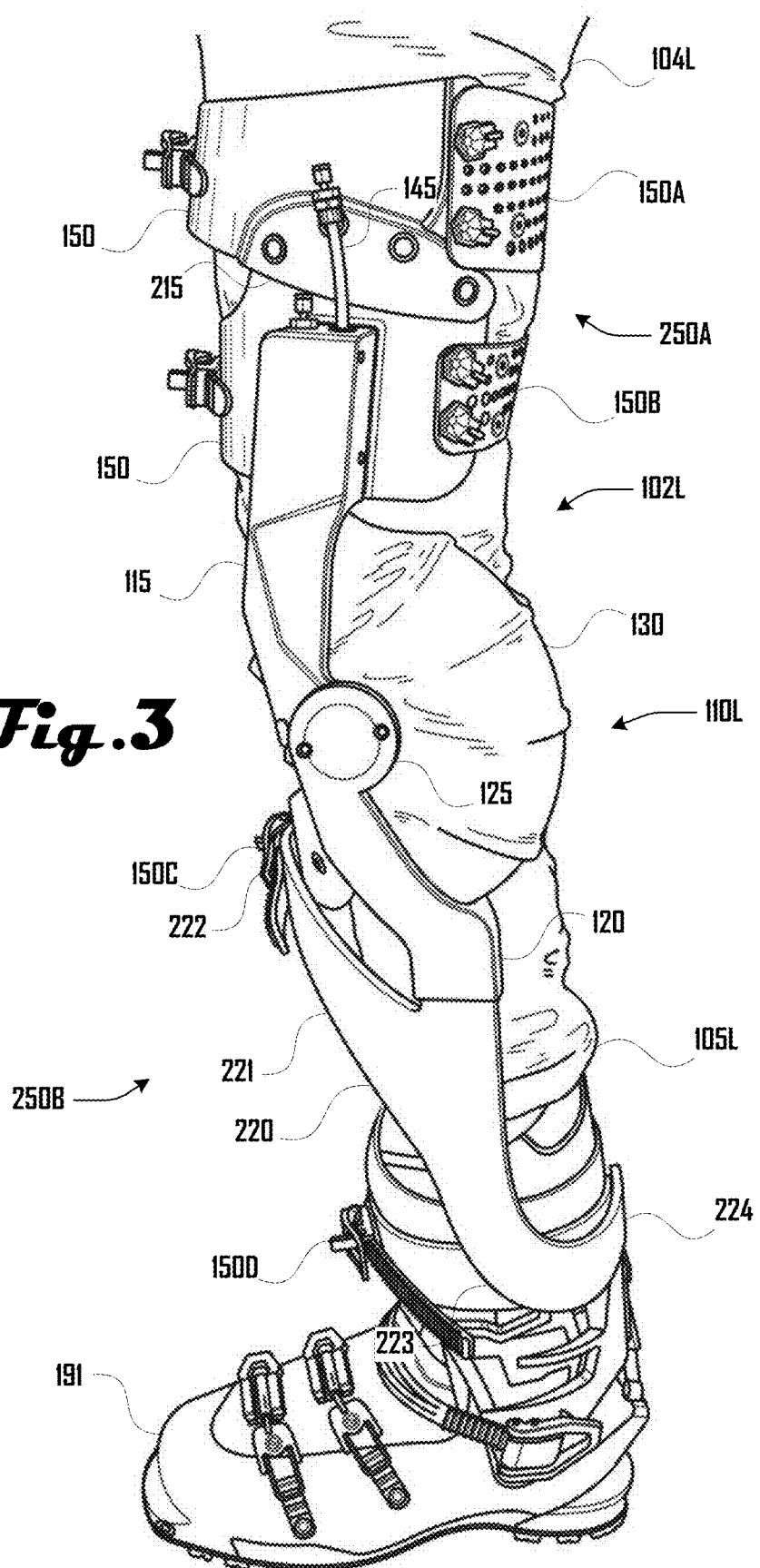
FIG. 3 is a side view of the leg actuation unit of FIG. 3 coupled to the leg of the user.
Figure 4:
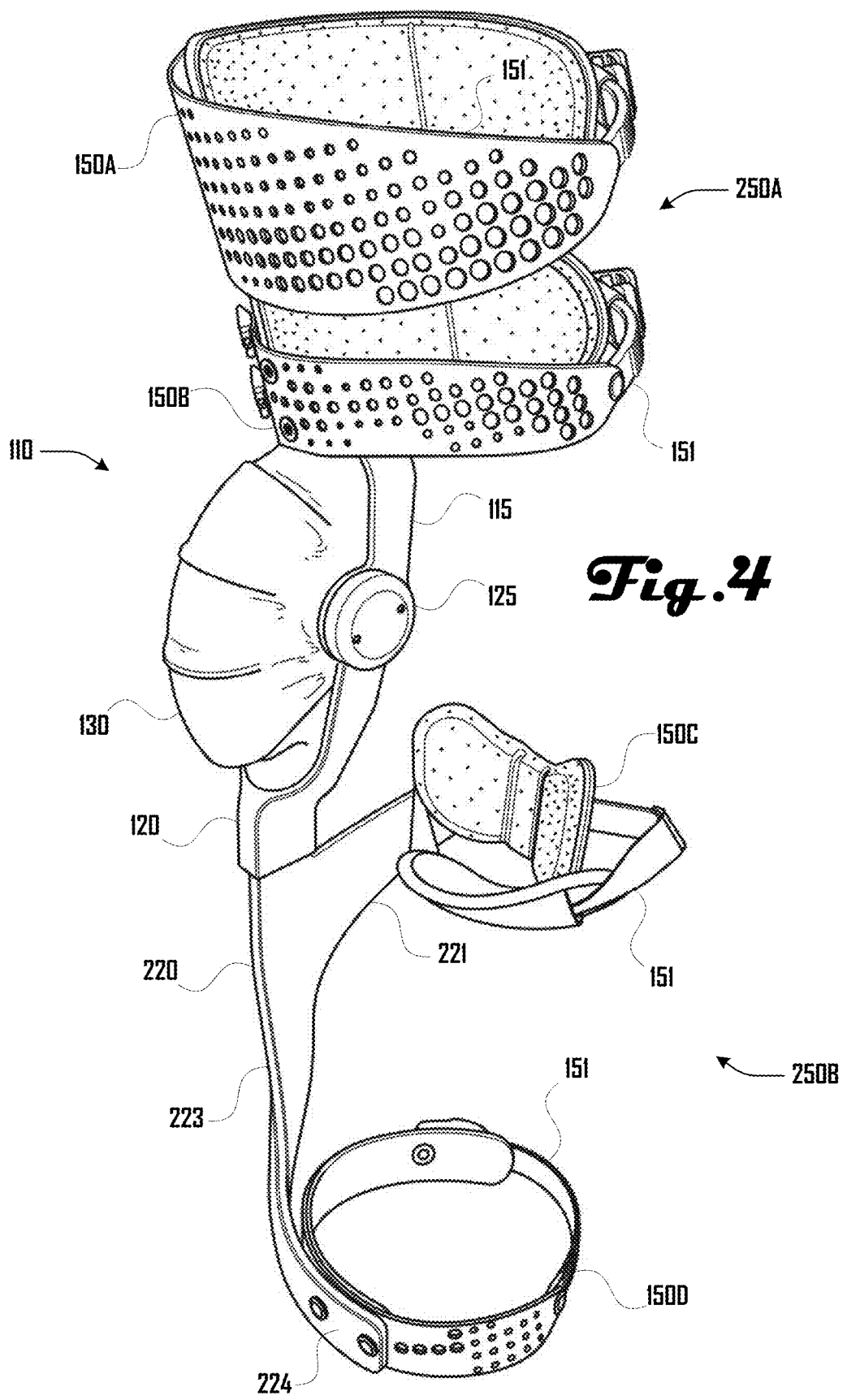
FIG. 4 is a perspective view of the leg actuation unit of FIGS. 3 and 4.

As discussed herein, an exoskeleton system 100 can be configured for various suitable uses. For example, FIGS. 1-3 illustrate an exoskeleton system 100 being used by a user. As shown in FIG. 1 the user 101 can wear the exoskeleton system 100 on both legs 102. FIGS. 2 and 3 illustrate a front and side view of an actuator unit 110 coupled to a leg 102 of a user 101 and FIG. 4 illustrates a side view of an actuator unit 110 not being worn by a user 101.

As shown in the example of FIG. 1, the exoskeleton system 100 can comprise a left and right leg actuator unit 110L, 110R that are respectively coupled to a left and right leg 102L, 102R of the user. In various embodiments, the left and right leg actuator units 110L, 110R can be substantially mirror images of each other.

As shown in FIGS. 1-4, leg actuator units 110 can include an upper arm 115 and a lower arm 120 that are rotatably coupled via a joint 125. A bellows actuator 130 extends between the upper arm 115 and lower arm 120. One or more sets of cables 145 can be coupled to the bellows actuator 130 to introduce and/or remove fluid from the bellows actuator 130 to cause the bellows actuator 130 to expand and contract and to stiffen and soften, as discussed herein. As discussed herein, in various embodiments, such cables 145 can transmit power, communication signals, and the like to and/or from one or more bellows actuators 130. A backpack 155 can be worn by the user 101 and can hold various components of the exoskeleton system 100 such as a fluid source, control system, a power source, pneumatic system, and the like (see e.g., FIG. 5).

As shown in FIGS. 1-3, the leg actuator units 110L, 110R can be respectively coupled about the legs 102L, 102R of the user 101 with the joints 125 positioned at the knees 103L, 103R of the user 101 with the upper arms 115 of the leg actuator units 110L, 110R being coupled about the upper leg portions 104L, 104R of the user 101 via one or more couplers 150 (e.g., straps that surround the legs 102). The lower arms 120 of the leg actuator units 110L, 110R can be coupled about the lower leg portions 105L, 105R of the user 101 via one or more couplers 150.

The upper and lower arms 115, 120 of a leg actuator unit 110 can be coupled about the leg 102 of a user 101 in various suitable ways. For example, FIGS. 1-3 illustrate an example where the upper and lower arms 115, 120 and joint 125 of the leg actuator unit 110 are coupled along lateral faces (sides) of the top and bottom portions 104, 105 of the leg 102. As shown in the example of FIGS. 1-3, the upper arm 115 can be coupled to the upper leg portion 104 of a leg 102 above the knee 103 via two couplers 150 and the lower arm 120 can be coupled to the lower leg portion 105 of a leg 102 below the knee 103 via two couplers 150.

Specifically, the upper arm 115 can be coupled to the upper leg portion 104 of the leg 102 above the knee 103 via a first set of couplers 250A that includes a first and second coupler 150A, 150B. The first and second couplers 150A, 150B can be joined by a rigid plate assembly 215 disposed on a lateral side of the upper leg portion 104 of the leg 102, with straps 151 of the first and second couplers 150A, 150B extending around the upper leg portion 104 of the leg 102. The upper arm 115 can be coupled to the plate assembly 215 on a lateral side of the upper leg portion 104 of the leg 102, which can transfer force generated by the upper arm 115 to the upper leg portion 104 of the leg 102.

The lower arm 120 can be coupled to the lower leg portion 105 of a leg 102 below the knee 103 via a second set of couplers 250B that includes a third and fourth coupler 150C, 150D. A coupling branch unit 220 can extend from a distal end of, or be defined by a distal end of the lower arm 120. The coupling branch unit 220 can comprise a first branch 221 that extends from a lateral position on the lower leg portion 105 of the leg 102, curving upward and toward the anterior (front) of the lower leg portion 105 to a first attachment 222 on the anterior of the lower leg portion 105 below the knee 103, with the first attachment 222 joining the third coupler 150C and the first branch 221 of the coupling branch unit 220. The coupling branch unit 220 can comprise a second branch 223 that extends from a lateral position on the lower leg portion 105 of the leg 102, curving downward and toward the posterior (back) of the lower leg portion 105 to a second attachment 224 on the posterior of the lower leg portion 105 below the knee 103, with the second attachment 224 joining the fourth coupler 150D and the second branch 223 of the coupling branch unit 220.

As shown in the example of FIGS. 1-3, the fourth coupler 150D can be configured to surround and engage the boot 191 of a user. For example, the strap 151 of the fourth coupler 150D can be of a size that allows the fourth coupler 150D to surround the larger diameter of a boot 191 compared to the lower portion 105 of the leg 102 alone. Also, the length of the lower arm 120 and/or coupling branch unit 220 can be of a length sufficient for the fourth coupler 150D to be positioned over a boot 191 instead of being of a shorter length such that the fourth coupler 150D would surround a section of the lower portion 105 of the leg 102 above the boot 191 when the leg actuator unit 110 is worn by a user.

Attaching to the boot 191 can vary across various embodiments. In one embodiment, this attachment can be accomplished through a flexible strap that wraps around the circumference of boot 191 to affix the leg actuator unit 110 to the boot 191 with the desired amount of relative motion between the leg actuator unit 110 and the strap. Other embodiments can work to restrict various degrees of freedom while allowing the desired amount of relative motion between the leg actuator unit 110 and the boot 191 in other degrees of freedom. One such embodiment can include the use of a mechanical clip that connects to the back of the boot 191 that can provide a specific mechanical connection between the device and the boot 191. Various embodiments can include but are not limited to the designs listed previously, a mechanical bolted connection, a rigid strap, a magnetic connection, an electro-magnetic connection, an electromechanical connection, an insert into the user's boot, a rigid or flexible cable, or a connection directly to a boot.

Another aspect of the exoskeleton system 100 can be fit components used to secure the exoskeleton system 100 to the user 101. Since the function of the exoskeleton system 100 in various embodiments can rely heavily on the fit of the exoskeleton system 100 efficiently transmitting forces between the user 101 and the exoskeleton system 100 without the exoskeleton system 100 significantly drifting on the body 101 or creating discomfort, improving the fit of the exoskeleton system 100 and monitoring the fit of the exoskeleton system 100 to the user over time can be desirable for the overall function of the exoskeleton system 100 in some embodiments.

In various examples, different couplers 150 can be configured for different purposes, with some couplers 150 being primarily for the transmission of forces, with others being configured for secure attachment of the exoskeleton system 100 to the body 101. In one preferred embodiment for a single knee system, a coupler 150 that sits on the lower leg 105 of the user 101 (e.g., one or both of couplers 150C, 150D) can be intended to target body fit, and as a result, can remain flexible and compliant to conform to the body of the user 101. Alternatively, in this embodiment a coupler 150 that affixes to the front of the user's thigh on an upper portion 104 of the leg 102 (e.g., one or both of couplers 150A, 150B) can be intended to target power transmission needs and can have a stiffer attachment to the body than other couplers 150 (e.g., one or both of couplers 150C, 150D). Various embodiments can employ a variety of strapping or coupling configurations, and these embodiments can extend to include any variety of suitable straps, couplings, or the like, where two parallel sets of coupling configurations are meant to fill these different needs.

In some cases, the design of the joint 125 can improve the fit of the exoskeleton system 100 on the user. In one embodiment, the joint 125 of a single knee leg actuator unit 110 can be designed to use a single pivot joint that has some deviations with the physiology of the knee joint. Another embodiment uses a polycentric knee joint to better fit the motion of the human knee joint, which in some examples can be desirably paired with a very well fit leg actuator unit 110. Various embodiments of a joint 125 can include but are not limited to the example elements listed above, a ball and socket joint, a four-bar linkage, and the like.

Some embodiments can include fit adjustments for anatomical variations in varus or valgus angles in the lower leg 105. One preferred embodiment includes an adjustment incorporated into a leg actuator unit 110 in the form of a cross strap that spans the joint of the knee 103 of the user 101, which can be tightened to provide a moment across the knee joint in the frontal plane which varies the nominal resting angle. Various embodiments can include but are not limited to the following: a strap that spans the joint 125 to vary the operating angle of the joint 125; a mechanical assembly including a screw that can be adjusted to vary the angle of the joint 125; mechanical inserts that can be added to the leg actuator unit 110 to discreetly change the default angle of the joint 125 for the user 101, and the like.

In various embodiments, the leg actuator unit 110 can be configured to remain suspended vertically on the leg 102 and remain appropriately positioned with the joint of the knee 103. In one embodiment, a coupler 150 associated with a boot 191 (e.g., coupler 150D) can provide a vertical retention force for a leg actuator unit 110. Another embodiment uses a coupler 150 positioned on the lower leg 105 of the user 101 (e.g., one or both of couplers 150C, 150D) that exerts a vertical force on the leg actuator unit 110 by reacting on the calf of the user 101. Various embodiments can include but are not limited to the following: suspension forces transmitted through a coupler 150 on the boot (e.g., coupler 150D) or another embodiment of the boot attachment discussed previously; suspension forces transmitted through an electronic and/or fluidic cable assembly; suspension forces transmitted through a connection to a waist belt; suspension forces transmitted through a mechanical connection to a backpack 155 or other housing for the exoskeleton device 510 and/or pneumatic system 520 (see FIG. 5); suspension forces transmitted through straps or a harness to the shoulders of the user 101, and the like.

In various embodiments, a leg actuator unit 110 can be spaced apart from the leg 102 of the user with a limited number of attachments to the leg 102. For example, in some embodiments, the leg actuator unit 110 can consist or consist essentially of three attachments to the leg 102 of the user 101, namely via the first and second attachments 222, 224 and 215. In various embodiments, the couplings of the leg actuator unit 110 to the lower leg portion 105 can consist or consist essentially of a first and second attachment on the anterior and posterior of the lower leg portion 105. In various embodiments, the coupling of the leg actuator unit 110 to the upper leg portion 104 can consist or consist essentially of a single lateral coupling, which can be associated with one or more couplers 150 (e.g., two couplers 150A, 150B as shown in FIGS. 1-4). In various embodiments, such a configuration can be desirable based on the specific force-transfer for use during a subject activity. Accordingly, the number and positions of attachments or coupling to the leg 102 of the user 101 in various embodiments is not a simple design choice and can be specifically selected for one or more selected target user activities.

While specific embodiments of couplers 150 are illustrated herein, in further embodiments, such components discussed herein can be operably replaced by an alternative structure to produce the same functionality. For example, while straps, buckles, padding and the like are shown in various examples, further embodiments can include couplers 150 of various suitable types and with various suitable elements. For example, some embodiments can include Velcro hook-and-loop straps, or the like.

FIGS. 1-3 illustrate an example of an exoskeleton system 100 where the joint 125 is disposed laterally and adjacent to the knee 103 with a rotational axis of the joint 125 being disposed parallel to a rotational axis of the knee 103. In some embodiments, the rotational axis of the joint 125 can be coincident with the rotational axis of the knee 103. In some embodiments, a joint can be disposed on the anterior of the knee 103, posterior of the knee 103, inside of the knee 103, or the like.

In various embodiments, the joint structure 125 can constrain the bellows actuator 130 such that force created by actuator fluid pressure within the bellows actuator 130 can be directed about an instantaneous center (which may or may not be fixed in space). In some cases of a revolute or rotary joint, or a body sliding on a curved surface, this instantaneous center can coincide with the instantaneous center of rotation of the joint 125 or a curved surface. Forces created by a leg actuator unit 110 about a rotary joint 125 can be used to apply a moment about an instantaneous center as well as still be used to apply a directed force. In some cases of a prismatic or linear joint (e.g., a slide on a rail, or the like), the instantaneous center can be kinematically considered to be located at infinity, in which case the force directed about this infinite instantaneous center can be considered as a force directed along the axis of motion of the prismatic joint. In various embodiments, it can be sufficient for a rotary joint 125 to be constructed from a mechanical pivot mechanism. In such an embodiment, the joint 125 can have a fixed center of rotation that can be easy to define, and the bellows actuator 130 can move relative to the joint 125. In a further embodiment, it can be beneficial for the joint 125 to comprise a complex linkage that does not have a single fixed center of rotation. In yet another embodiment, the joint 125 can comprise a flexure design that does not have a fixed joint pivot. In still further embodiments, the joint 125 can comprise a structure, such as a human joint, robotic joint, or the like.

In various embodiments, leg actuator unit 110 (e.g., comprising bellows actuator 130, joint structure 125, and the like) can be integrated into a system to use the generated directed force of the leg actuator unit 110 to accomplish various tasks. In some examples, a leg actuator unit 110 can have one or more unique benefits when the leg actuator unit 110 is configured to assist the human body or is included into a powered exoskeleton system 100. In an example embodiment, the leg actuator unit 110 can be configured to assist the motion of a human user about the user's knee joint 103. To do so, in some examples, the instantaneous center of the leg actuator unit 110 can be designed to coincide or nearly coincide with the instantaneous center of rotation of the knee 103 of a user 101. In one example configuration, the leg actuator unit 110 can be positioned lateral to the knee joint 103 as shown in FIGS. 1-3. In various examples, the human knee joint 103 can function as (e.g., in addition to or in place of) the joint 125 of the leg actuator unit 110.

For clarity, example embodiments discussed herein should not be viewed as a limitation of the potential applications of the leg actuator unit 110 described within this disclosure. The leg actuator unit 110 can be used on other joints of the body including but not limited to one or more elbow, one or more hip, one or more finger, one or more ankle, spine, or neck. In some embodiments, the leg actuator unit 110 can be used in applications that are not on the human body such as in robotics, for general purpose actuation, animal exoskeletons, or the like.

Also, embodiments can be used for or adapted for various suitable applications such as tactical, medical, or labor applications, and the like. Examples of such applications can be found in U.S. patent application Ser. No. 15/823,523, filed Nov. 27, 2017, entitled "PNEUMATIC EXOMUSCLE SYSTEM AND METHOD," and U.S. patent application Ser. No. 15/953,296, filed Apr. 13, 2018, entitled "LEG EXOSKELETON SYSTEM AND METHOD,", which are incorporated herein by reference.

Some embodiments can apply a configuration of a leg actuator unit 110 as described herein for linear actuation applications. In an example embodiment, the bellows actuator 130 can comprise a two-layer impermeable/inextensible construction, and one end of one or more constraining ribs can be fixed to the bellows actuator 130 at predetermined positions. The joint structure 125 in various embodiments can be configured as a series of slides on a pair of linear guide rails, where the remaining end of one or more constraining ribs is connected to a slide. The motion and force of the fluidic actuator can therefore be constrained and directed along the linear rail.

Figure 5:
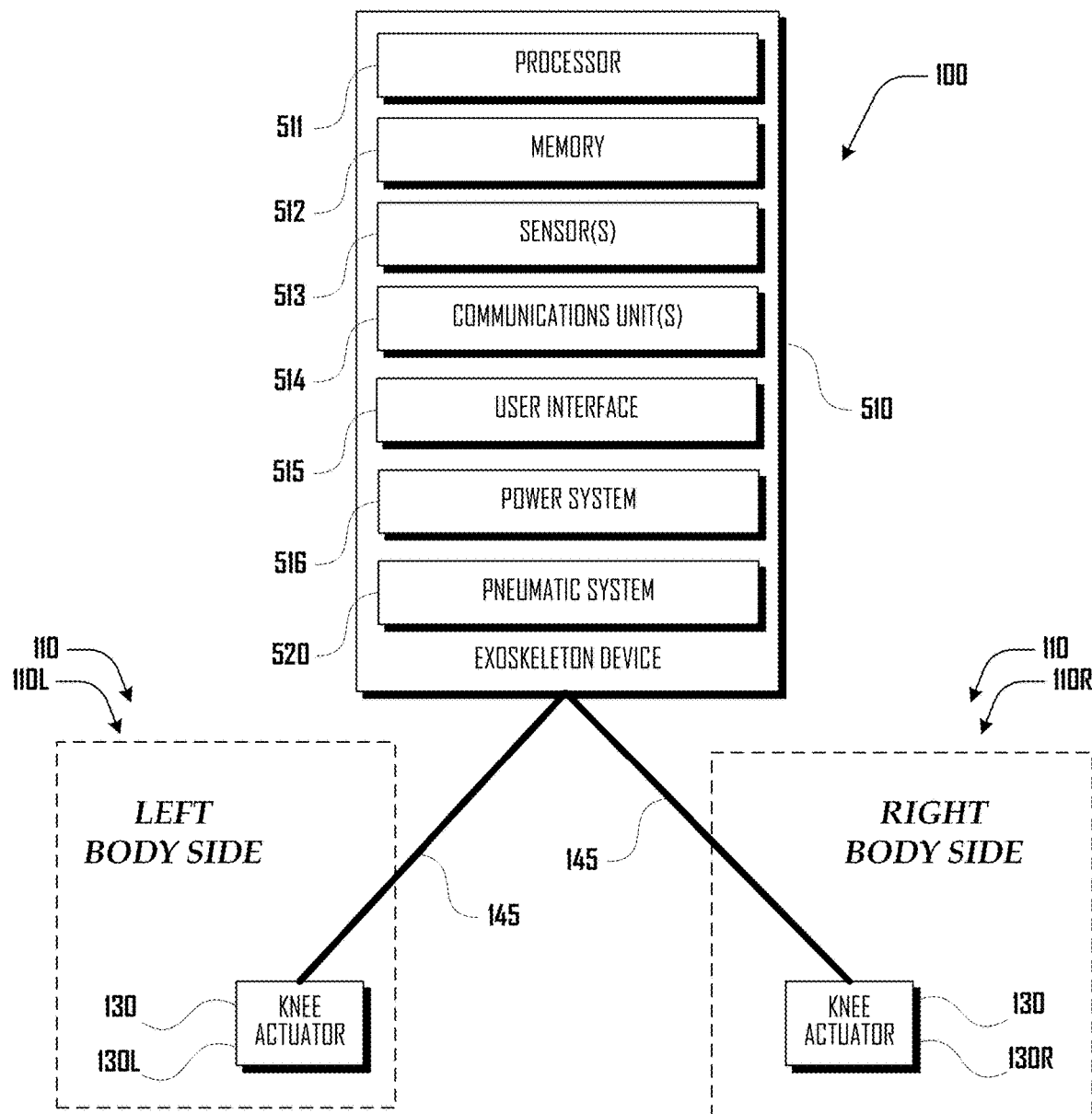
FIG. 5 is a block diagram illustrating an example embodiment of an exoskeleton system.

FIG. 5 is a block diagram of an example embodiment of an exoskeleton system 100 that includes an exoskeleton device 510. While a pneumatic system 520 is used in the example of FIG. 5, further embodiments can include any suitable fluidic system or a pneumatic system 520 can be absent in some embodiments, such as where an exoskeleton system 100 is actuated by electric motors, or the like.

The exoskeleton device 510 in this example comprises a processor 511, a memory 512, one or more sensors 513 a communication unit 514, a user interface 515, a power source 516 and a pneumatic system 520. In various embodiments, fluid (e.g., air), electrical power, communication signals, and the like can be communicated to and/or from the actuator units 110 via respective cables 145. For example, the cables 145 can be configured to convey air from a fluid source (e.g., of the pneumatic system 520) to the actuators 130, which can cause actuation of the actuators 130 as discussed herein. In various embodiments, the cables 145 can be configured to provide air to the actuators 130 separately such that the actuators 130 can be selectively controlled separately.

Additionally, in various embodiments, the lines can be configured to transmit electrical power from the power system 516 (e.g., from a battery) to the actuator units 110, which can be used at the actuator units 110 to power elements of the actuator units 110 such as pneumatic valves, sensors, an embedded system, an interface, a computing system, and the like. In various embodiments, the actuator units 110 and exoskeleton device 510 can be configured to communicate via the cables 145. For example, in various embodiments, the exoskeleton device 510 can communicate control signals (e.g., via the communication unit(s) 514) to the actuator units 110, which can be configured to control actuation of the actuator units 110, output of an interface, or the like. In further embodiments, any suitable communications or data can be sent to the actuator units 110 and/or actuators 130 via the cables 145, which can be via any suitable communication protocol. Also, in various embodiments, communications or data can be sent to the exoskeleton device 510 from the actuator units 110 and/or actuators 130 via the cables 145. For example, sensor data, status data, configuration data, pneumatic data, or the like, can be sent to the exoskeleton device 510 from the actuator units 110 and/or actuators 130 via the cables 145.

In accordance with some embodiments, communication to or from or between the exoskeleton device 510 and the actuator units 110 and/or actuators 130 can comprise wireless communication in addition to or alternative to communication via the cables 145. However, in some embodiments, communications to or from or between the exoskeleton device 510 and the actuator units 110 and/or actuators 130 can be exclusively via the cables 145, with the system being incapable of wireless communications to or from or between the exoskeleton device 510 and the actuator units 110 and/or actuators 130.

Also, as discussed in more detail herein, in various embodiments, the cables 145 can be configured as a unitary structure capable of transmitting electrical power, fluid (e.g., air), and/or communications to, from or between the exoskeleton device 510 and the actuator units 110 and/or actuators 130. In other words, various embodiments, can have, consist of or consist essentially of only a single unitary cable 145 for transmitting electrical power, fluid (e.g., air), and/or communications to, from or between the exoskeleton device 510 and respective actuator units 110 and/or respective actuators 130 via one or more electrical power lines (e.g., wires), one or more fluid lines (e.g., tubes), one or more communication lines (e.g., wires, fiberoptic, etc.), and the like.

It can be desirable in some examples for the cable(s) 145 to be strong to hold up against unintentional strain. In a preferred embodiment one or more electrical power lines, one or more fluid lines, and/or one or more communication lines are unified into one cable 145. In such an embodiment the one or more electrical power lines, one or more fluid lines, and/or one or more communication lines can run in parallel and can be encased in a sheath individually and/or collectively (e.g., with a medical grade material). For example, encasing such lines to define a cable 145 can include various insulation, inner/outer sheaths, and the like. Encasing the one or more electrical power lines, one or more fluid lines, and/or one or more communication lines together with a strong material in some embodiments can help protect them from environmental factors, such as water, snow, or sand. In another embodiment, the one or more electrical power lines, one or more fluid lines, and/or one or more communication lines may run in parallel together and are attached together in various suitable ways (e.g., by zip ties, tape or adhesives). Whether the one or more electrical power lines, one or more fluid lines, and/or one or more communication lines are one component or more, by attaching them together in various embodiments, weaker electronic wires may no longer need to hold the high strain that stronger fluidic tubes can withstand.

It can also be desirable to reduce the length of cables 145 hanging outside of the pack, which can snag onto other objects. One preferred set of embodiments includes retractable cables 145. In at least some of such embodiments, it can be preferable for the retractable cables 145 to be accomplished inside a backpack 155, with the cables 145 configured to have a small mechanical retention force to maintain cables 145 that are pulled tight against the user with reduced slack remaining in the cable(s) 145. This can be done in some embodiments with a linear spring attached to the cables or a rotating spool with a rotational spring, both of which may pull the cable back into the power pack (e.g., backpack 155) in various examples. Further embodiments can be used to organize or route the cables 145 so that they do not snag, such as integrating them into the user's clothing, or clipping onto other sections of the power pack with hooks, straps, buttons or magnets.

Another aspect of the cable(s) 145 can be mounting to the backpack 155, actuator unit 110 and/or actuator 130. In a preferred embodiment, pigtail type connections are used. In various pigtail type connections, the cable 145 extends through a rigid housing of a given device and a portion of the cable connector 600 is at the end of the cable 145. Specifically, these connections in some examples can utilize inline connections as opposed to panel-mount connections. This can reduce the shear stress on the internal electronics and mechanical connection, if, for example a cable 145 is accidentally snagged by an object. Various other types of line mounts can be used including, but not limited to, panel-mounted connections.

The plurality of actuators 130 include a pair of knee-actuators 130L and 130R that are positioned on the right and left side of a body 100. For example, as discussed above, the example exoskeleton system 100 shown in FIG. 5 can comprise a left and right leg actuator unit 110L, 110R on respective sides of the body 101 as shown in FIGS. 1 and 2 with one or both of the exoskeleton device 510 and pneumatic system 520, or one or more components thereof, stored within or about a backpack 155 (see FIG. 1) or otherwise mounted, worn or held by a user 101.

Accordingly, in various embodiments, the exoskeleton system 100 can be a completely mobile and self-contained system that is configured to be powered and operated for an extended period of time without an external power source during various user activities. The size, weight and configuration of the actuator unit(s) 110, exoskeleton device 510 and pneumatic system 520 can therefore be configured in various embodiments for such mobile and self-contained operation.

In various embodiments, the example system 100 can be configured to move and/or enhance movement of the user 101 wearing the exoskeleton system 100. For example, the exoskeleton device 510 can provide instructions to the pneumatic system 520, actuator units 110 and/or actuators 130, which can selectively inflate and/or deflate the bellows actuators 130 via the cables 145. For example, fluid can be sent to the actuator units 110 and/or actuators 130 via the cables 145 with control of such fluid being via fluid valves or other suitable elements at the exoskeleton device 510, actuator units 110 and/or actuators 130. Such selective inflation and/or deflation of the bellows actuators 130 can move and/or support one or both legs 102 to generate and/or augment body motions such as walking, running, jumping, climbing, lifting, throwing, squatting, skiing or the like.

In some cases, the exoskeleton system 100 can be designed to support multiple configurations in a modular configuration. For example, one embodiment is a modular configuration that is designed to operate in either a single knee configuration or in a double knee configuration as a function of how many of the actuator units 110 are donned by the user 101. For example, the exoskeleton device 510 can determine how many actuator units 110 are coupled to the pneumatic system 520 and/or exoskeleton device 510 (e.g., one or two actuator units 110) and the exoskeleton device 510 can change operating capabilities based on the number of actuator units 110 detected.

In further embodiments, the pneumatic system 520 can be manually controlled, configured to apply a constant pressure, or operated in any other suitable manner. In some embodiments, such movements can be controlled and/or programmed by the user 101 that is wearing the exoskeleton system 100 or by another person. In some embodiments, the exoskeleton system 100 can be controlled by movement of the user 101. For example, the exoskeleton device 510 can sense that the user is walking and carrying a load and can provide a powered assist to the user via the actuators 130 to reduce the exertion associated with the load and walking. Similarly, where a user 101 wears the exoskeleton system 100, the exoskeleton system 100 can sense movements of the user 101 and can provide a powered assist to the user via the actuators 130 to enhance or provide an assist to the user while skiing.

Accordingly, in various embodiments, the exoskeleton system 130 can react automatically without direct user interaction. In further embodiments, movements can be controlled in real-time by user interface 515 such as a controller, joystick, voice control or thought control. Additionally, some movements can be pre-preprogrammed and selectively triggered (e.g., walk forward, sit, crouch) instead of being completely controlled. In some embodiments, movements can be controlled by generalized instructions (e.g., walk from point A to point B, pick up box from shelf A and move to shelf B).

The user interface 515 can allow the user 101 to control various aspects of the exoskeleton system 100 including powering the exoskeleton system 100 on and off; controlling movements of the exoskeleton system 100; configuring settings of the exoskeleton system 100, and the like. The user interface 515 can include various suitable input elements such as a touch screen, one or more buttons, audio input, and the like. The user interface 515 can be located in various suitable locations about the exoskeleton system 100. For example, in one embodiment, the user interface 515 can be disposed on a strap of a backpack 155, or the like. In some embodiments, the user interface can be defined by a user device such as smartphone, smartwatch, wearable device, or the like.

In various embodiments, the power source 516 can be a mobile power source that provides the operational power for the exoskeleton system 100. In one preferred embodiment, the power pack unit contains some or all of the pneumatic system 520 (e.g., a compressor) and/or power source (e.g., batteries) required for the continued operation of pneumatic actuation of the leg actuator units 110. The contents of such a power pack unit can be correlated to the specific actuation approach configured to be used in the specific embodiment. In some embodiments, the power pack unit will only contain batteries which can be the case in an electromechanically actuated system or a system where the pneumatic system 520 and power source 516 are separate. Various embodiments of a power pack unit can include but are not limited to a combination of one or more of the following items: pneumatic compressor, batteries, stored high-pressure pneumatic chamber, hydraulic pump, pneumatic safety components, electric motor, electric motor drivers, microprocessor, and the like. Accordingly, various embodiments of a power pack unit can include one or more of elements of the exoskeleton device 510 and/or pneumatic system 520.

Such components can be configured on the body of a user 101 in a variety of suitable ways. One preferred embodiment is the inclusion of a power pack unit in a torso-worn pack that is not operably coupled to the leg actuator units 110 in any manner that transmits substantial mechanical forces to the leg actuator units 110. Another embodiment includes the integration of the power pack unit, or components thereof, into the leg actuator units 110 themselves. Various embodiments can include, but are not limited to the following configurations: torso-mounted in a backpack, torso-mounted in a messenger bag, hip-mounted bag, mounted to the leg, integrated into the brace component, and the like. Further embodiments can separate the components of the power pack unit and disperse them into various configurations on the user 101. Such an embodiment may configure a pneumatic compressor on the torso of the user 101 and then integrate the batteries into the leg actuator units 110 of the exoskeleton system 100.

One aspect of the power supply 516 in various embodiments is that it must be connected to the brace component in such a manner as to pass the operable system power to the brace for operation. One preferred embodiment is the use of electrical cables (e.g., as part of unified cable 145) to connect the power supply 516 and the leg actuator units 110. Other embodiments can use electrical cables separate from cables 145, wireless power transmission, and/or local batteries to deliver electrical power. Various embodiments can include but are not limited to any configuration of the following connections, which may or may not be part of a unified cable 145: pneumatic hosing, hydraulic hosing, electrical cables, wireless communication, wireless power transfer, and the like.

In some embodiments, it can be desirable to include secondary features that extend the capabilities of a cable connection (e.g., cables 145) between the leg actuator units 110 and elements of the exoskeleton device 510 such as the power supply 516 and/or pneumatic system 520. One preferred embodiment includes retractable cables that are configured to have a small mechanical retention force to maintain cables 145 that are pulled tight against the user with reduced slack remaining in the cables 145. Various embodiments can include, but are not limited to a combination of the following secondary features: retractable cables, a single cable 145 including both fluidic and electrical power, magnetically connected electrical cables, mechanical quick releases, breakaway connections designed to release at a specified pull force, integration into mechanical retention features on the user's clothing, a unified singular cable 145 for power, air and/or communications, and the like. Yet another embodiment can include routing the cables 145 in such a way as to minimize geometric differences between the user 101 and lengths of the cables 145. One such embodiment in a dual knee configuration with a torso power supply can be routing the cables 145 along the user's lower torso to connect the right side of a power supply bag with the left knee of the user. Such a routing can allow the geometric differences in length throughout the user's normal range of motion.

One specific additional feature that can be a concern in some embodiments is the need for proper heat management of the exoskeleton system 100. As a result, there are a variety of features that can be integrated specifically for the benefit of controlling heat. One preferred embodiment integrates exposed heat sinks to the environment that allow elements of the exoskeleton device 510 and/or pneumatic system 520 to dispel heat directly to the environment through unforced cooling using ambient airflow. Another embodiment directs the ambient air through internal air channels in a backpack 155 or other housing to allow for internal cooling. Yet another embodiment can extend upon this capability by introducing scoops on a backpack 155 or other housing in an effort to allow air flow through the internal channels. Various embodiments can include but are not limited to the following: exposed heat sinks that are directly connected to a high heat component; a water-cooled or fluid-cooled heat management system; forced air cooling through the introduction of a powered fan or blower; external shielded heat sinks to protect them from direct contact by a user, and the like.

In some cases, it may be beneficial to integrate additional features into the structure of the backpack 155 or other housing to provide additional features to the exoskeleton system 100. One preferred embodiment is the integration of mechanical attachments to support storage of the leg actuator units 110 along with the exoskeleton device 510 and/or pneumatic system 520 in a small package. Such an embodiment can include a deployable pouch that can secure the leg actuator units 110 against the backpack 155 along with mechanical clasps that hold the upper or lower arms 115, 120 of the actuator units 110 to the backpack 155. Another embodiment is the inclusion of storage capacity into the backpack 155 so the user 101 can hold additional items such as a water bottle, food, personal electronics, and other personal items. Various embodiments can include but are not limited to other additional features such as the following: a warming pocket which is heated by hot airflow from the exoskeleton device 510 and/or pneumatic system 520; air scoops to encourage additional airflow internal to the backpack 155; strapping to provide a closer fit of the backpack 155 on the user, waterproof storage, temperature-regulated storage, and the like.

In a modular configuration, it may be required in some embodiments that the exoskeleton device 510 and/or pneumatic system 520 can be configured to support the electrical power, fluidic power, sensing and control requirements and capabilities of various potential configurations of the exoskeleton system. One preferred embodiment can include an exoskeleton device 510 and/or pneumatic system 520 that can be tasked with powering a dual knee configuration or a single knee configuration (i.e., with one or two leg actuator units 110 on the user 101). Such an exoskeleton system 100 can support the requirements of both configurations and then appropriately configure electrical power, fluidic power, sensing and control based on a determination or indication of a desired operating configuration. Various embodiments exist to support an array of potential modular system configurations, such as multiple batteries, and the like.

In various embodiments, the exoskeleton system 100 can be operable to perform methods or portions of methods described in more detail below or in related applications incorporated herein by reference. For example, the memory 512 can include non-transitory computer readable instructions (e.g., software), which if executed by the processor 511, can cause the exoskeleton system 100 to perform methods or portions of methods described herein or in related applications incorporated herein by reference.

This software can embody various methods that interpret signals from the sensors 513 or other sources to determine how to best operate the exoskeleton system 100 to provide the desired benefit to the user. The specific embodiments described below should not be used to imply a limit on the sensors 513 that can be applied to such an exoskeleton system 100 or the source of sensor data. While some example embodiments can require specific information to guide decisions, it does not create an explicit set of sensors 513 that an exoskeleton system 100 will require, and further embodiments can include various suitable sets of sensors 513. Additionally, sensors 513 can be located at various suitable locations on an exoskeleton system 100 including as part of an exoskeleton device 510, pneumatic system 520, one or more fluidic actuator 130, or the like. Accordingly, the example illustration of FIG. 5 should not be construed to imply that sensors 513 are exclusively disposed at or part of an exoskeleton device 510, and such an illustration is merely provided for purposes of simplicity and clarity.

One aspect of control software can be the operational control of leg actuator units 110, exoskeleton device 510 and pneumatic system 520 to provide the desired response. There can be various suitable responsibilities of the operational control software. For example, as discussed in more detail below, one can be low-level control which can be responsible for developing baseline feedback for operation of the leg actuator units 110, exoskeleton device 510 and pneumatic system 520. Another can be intent recognition which can be responsible for identifying the intended maneuvers of the user 101 based on data from the sensors 513 and causing the exoskeleton system 100 to operate based on one or more identified intended maneuvers. A further example can include reference generation, which can include selecting the desired torques the exoskeleton system 100 should generate to best assist the user 101. It should be noted that this example architecture for delineating the responsibilities of the operational control software is merely for descriptive purposes and in no way limits the wide variety of software approaches that can be deployed on further embodiments of an exoskeleton system 100.

One method implemented by control software can be for the low-level control and communication of the exoskeleton system 100. This can be accomplished via a variety of methods as required by the specific joint and need of the user. In a preferred embodiment, the operational control is configured to provide a desired torque by the leg actuator unit 110 at the user's joint. In such a case, the exoskeleton system 100 can create low-level feedback to achieve a desired joint torque by the leg actuator units 110 as a function of feedback from the sensors 513 of the exoskeleton system 100. For example, such a method can include obtaining sensor data from one or more sensors 513, determining whether a change in torque by the leg actuator unit 110 is necessary, and if so, causing the pneumatic system 520 to change the fluid state of the leg actuator unit 110 to achieve a target joint torque by the leg actuator unit 110. Various embodiments can include, but are not limited to, the following: current feedback; recorded behavior playback; position-based feedback; velocity-based feedback; feedforward responses; volume feedback which controls a fluidic system 520 to inject a desired volume of fluid into an actuator 130, and the like.

Another method implemented by operational control software can be for intent recognition of the user's intended behaviors. This portion of the operational control software, in some embodiments, can indicate any array of allowable behaviors that the system 100 is configured to account for. In one preferred embodiment, the operational control software is configured to identify two specific states: Walking, and Not Walking. In such an embodiment, to complete intent recognition, the exoskeleton system 100 can use user input and/or sensor readings to identify when it is safe, desirable or appropriate to provide assistive actions for walking. For example, in some embodiments, intent recognition can be based on input received via the user interface 515, which can include an input for Walking, and Not Walking. Accordingly, in some examples, the use interface can be configured for a binary input consisting of Walking, and Not Walking.

In some embodiments, a method of intent recognition can include the exoskeleton device 510 obtaining data from the sensors 513 and determining, based at least in part of the obtained data, whether the data corresponds to a user state of Walking, and Not Walking. Where a change in state has been identified, the exoskeleton system 100 can be re-configured to operate in the current state. For example, the exoskeleton device 510 can determine that the user 101 is in a Not Walking state such as sitting and can configure the exoskeleton system 100 to operate in a Not Walking configuration. For example, such a Not Walking configuration can, compared to a Walking configuration, provide for a wider range of motion; provide no torque or minimal torque to the leg actuation units 110; save power and fluid by minimizing processing and fluidic operations; cause the system to be alert for supporting a wider variety of non-skiing motion, and the like.

The exoskeleton device 510 can monitor the activity of the user 101 and can determine that the user is walking or is about to walk (e.g., based on sensor data and/or user input), and can then configure the exoskeleton system 100 to operate in a Walking configuration. For example, such a Walking configuration, compared to a Not Walking configuration, can allow for a more limited range of motion that would be present during skiing (as opposed to motions during non-walking); provide for high or maximum performance by increasing the processing and fluidic response of the exoskeleton system 100 to support skiing; and the like. When the user 101 finishes a walking session, is identified as resting, or the like, the exoskeleton system 100 can determine that the user is no longer walking (e.g., based on sensor data and/or user input) and can then configure the exoskeleton system 100 to operate in the Not Walking configuration.

In some embodiments, there can be a plurality of Walking states, or Walking sub-states that can be determined by the exoskeleton system 100, including hard walking, moderate walking, light walking, downhill, uphill, jumping, recreational, sport, running, and the like (e.g., based on sensor data and/or user input). Such states can be based on the difficulty of the walking, ability of the user, terrain, weather conditions, elevation, angle of the walking surface, desired performance level, power-saving, and the like. Accordingly, in various embodiments, the exoskeleton system 100 can adapt for various specific types of walking or movement based on a wide variety of factors.

Another method implemented by operational control software can be the development of desired referenced behaviors for the specific joints providing assistance. This portion of the control software can tie together identified maneuvers with the level control. For example, when the exoskeleton system 100 identifies an intended user maneuver, the software can generate reference behaviors that define the torques, or positions desired by the actuators 130 in the leg actuation units 110. In one embodiment, the operational control software generates references to make the leg actuation units 110 simulate a mechanical spring at the knee 103 via the configuration actuator 130. The operational control software can generate torque references at the knee joints that are a linear function of the knee joint angle. In another embodiment, the operational control software generates a volume reference to provide a constant standard volume of air into a pneumatic actuator 130. This can allow the pneumatic actuator 130 to operate like a mechanical spring by maintaining the constant volume of air in the actuator 130 regardless of the knee angle, which can be identified through feedback from one or more sensors 513.

In another embodiment, a method implemented by the operational control software can include evaluating the balance of the user 101 while walking, moving, standing, or running and directing torque in such a way to encourage the user 101 to remain balanced by directing knee assistance to the leg 102 that is on the outside of the user's current balance profile. Accordingly, a method of operating an exoskeleton system 100 can include the exoskeleton device 510 obtaining sensor data from the sensors 510 indicating a balance profile of a user 101 based on the configuration of left and right leg actuation units 110L, 110R and/or environmental sensors such as position sensors, accelerometers, and the like. The method can further include determining a balance profile based on the obtained data, including an outside and inside leg, and then increasing torque to the actuation unit 110 associated with the leg 102 identified as the outside leg.

Various embodiments can use but are not limited to kinematic estimates of posture, joint kinetic profile estimates, as well as observed estimates of body pose. Various other embodiments exist for methods of coordinating two legs 102 to generate torques including but not limited to guiding torque to the most bent leg; guiding torque based on the mean amount of knee angle across both legs; scaling the torque as a function of speed or acceleration; and the like. Yet another embodiment can include a combination of various individual reference generation methods in a variety of matters which include but are not limited to a linear combination, a maneuver specific combination, or a non-linear combination.

In another embodiment, an operational control method can blend two primary reference generation techniques: one reference focused on static assistance and one reference focused on leading the user 101 into their upcoming behavior. In some examples, the user 101 can select how much predictive assistance is desired while using the exoskeleton system 100. For example, by a user 101 indicating a large amount of predictive assistance, the exoskeleton system 100 can be configured to be very responsive and may be well configured for a skilled operator on a challenging terrain. The user 101 could also indicate a desire for a very low amount of predictive assistance, which can result in slower system performance, which may be better tailored towards a learning user or less challenging terrain.

Various embodiments can incorporate user intent in a variety of manners and the example embodiments presented above should not be interpreted as limiting in any way. For example, method of determining and operating an exoskeleton system 100 can include systems and method of U.S. patent application Ser. No. 15/887,866, filed Feb. 2, 2018, entitled "SYSTEM AND METHOD FOR USER INTENT RECOGNITION,", which is incorporated herein by reference. Also, various embodiments can use user intent in a variety of manners including as a continuous unit, or as a discrete setting with only a few indicated values.

At times it can be beneficial for operational control software to manipulate its control to account for a secondary or additional objective in order to maximize device performance or user experience. In one embodiment, the exoskeleton system 100 can provide an elevation-aware control over a central compressor or other components of a pneumatic system 520 to account for the changing density of air at different elevations. For example, operational control software can identify that the system is operating at a higher elevation based on data from sensors 513, or the like, and provide more current to the compressor in order to maintain electrical power consumed by the compressor. Accordingly, a method of operating a pneumatic exoskeleton system 100 can include obtaining data indicating air density where the pneumatic exoskeleton system 100 is operating (e.g., elevation data), determining optimal operating parameters of the pneumatic system 520 based on the obtained data, and configuring operation based on the determined optimal operating parameters. In further embodiments, operation of a pneumatic exoskeleton system 100 such as operating volumes can be tuned based on environmental temperature, which may affect air volumes.

In another embodiment, the exoskeleton system 100 can monitor the ambient audible noise levels and vary the control behavior of the exoskeleton system 100 to reduce the noise profile of the system. For example, when a user 101 is in a quiet public place or quietly enjoying a location alone or with others, noise associated with actuation of the leg actuation units 110 can be undesirable (e.g., noise of running a compressor or inflating or deflating actuators 130). Accordingly, in some embodiments, the sensors 513 can include a microphone that detects ambient noise levels and can configure the exoskeleton system 100 to operate in a quiet mode when ambient noise volume is below a certain threshold. Such a quiet mode can configure elements of a pneumatic system 520 or actuators 130 to operate more quietly, or can delay or reduce frequency of noise made by such elements.

In the case of a modular system, it can be desirable in various embodiments for operational control software to operate differently based on the number of leg actuation units 110 operational within the exoskeleton system 100. For example, in some embodiments, a modular dual-knee exoskeleton system 100 (see e.g., FIGS. 1 and 2) can also operate in a single-knee configuration where only one of two leg actuation units 110 are being worn by a user 101 (see e.g., FIGS. 3 and 4) and the exoskeleton system 100 can generate references differently when in a two-leg configuration compared to a single-leg configuration. Such an embodiment can use a coordinated control approach to generate references where the exoskeleton system 100 is using inputs from both leg actuation units 110 to determine the desired operation. However, in a single-leg configuration, the available sensor information may have changed, so in various embodiments the exoskeleton system 100 can implement a different control method. In various embodiments this can be done to maximize the performance of the exoskeleton system 100 for the given configuration or account for differences in available sensor information based on there being one or two leg actuation units 110 operating in the exoskeleton system 100.

Accordingly, a method of operating an exoskeleton system 100 can include a startup sequence where a determination is made by the exoskeleton device 510 whether one or two leg actuation units 110 are operating in the exoskeleton system 100; determining a control method based on the number of actuation units 110 that are operating in the exoskeleton system 100; and implementing and operating the exoskeleton system 100 with the selected control method. A further method operating an exoskeleton system 100 can include monitoring by the exoskeleton device 510 of actuation units 110 that are operating in the exoskeleton system 100, determining a change in the number of actuation units 110 operating in the exoskeleton system 100, and then determining and changing the control method based on the new number of actuation units 110 that are operating in the exoskeleton system 100.

For example, the exoskeleton system 100 can be operating with two actuation units 110 and with a first control method. The user 101 can disengage one of the actuation units 110, and the exoskeleton device 510 can identify the loss of one of the actuation units 110, and the exoskeleton device 510 can determine and implement a new second control method to accommodate loss of one of the actuation units 110. In some examples, adapting to the number of active actuation units 110 can be beneficial where one of the actuation units 110 is damaged or disconnected during use and the exoskeleton system 100 is able to adapt automatically so the user 101 can still continue working or moving uninterrupted despite the exoskeleton system 100 only having a single active actuation unit 110.

In various embodiments, operational control software can adapt a control method where user needs are different between individual actuation units 110 or legs 102. In such an embodiment, it can be beneficial for the exoskeleton system 100 to change the torque references generated in each actuation unit 110 to tailor the experience for the user 101. One example is of a dual knee exoskeleton system 100 (see e.g., FIG. 1) where a user 101 has significant weakness issues in a single leg 102, but only minor weakness issues in the other leg 102. In this example, the exoskeleton system 100 can be configured to scale down the output torques on the less-affected limb compared to the more-affected limb to best meet the needs of the user 101.

Such a configuration based on differential limb strength can be done automatically by the exoskeleton system 100 and/or can be configured via a user interface 516, or the like. For example, in some embodiments, the user 101 can perform a calibration test while using the exoskeleton system 100, which can test relative strength or weakness in the legs 102 of the user 101 and configure the exoskeleton system 100 based on identified strength or weakness in the legs 102. Such a test can identify general strength or weakness of legs 102 or can identify strength or weakness of specific muscles or muscle groups such as the quadriceps, calves, hamstrings, gluteus, gastrocnemius; femoris, sartorius, soleus, and the like.

Another aspect of a method for operating an exoskeleton system 100 can include control software that monitors the exoskeleton system 100. A monitoring aspect of such software can, in some examples, focus on monitoring the state of the exoskeleton system 100 and the user 101 throughout normal operation in an effort to provide the exoskeleton system 100 with situational awareness and understanding of sensor information in order to drive user understanding and device performance. One aspect of such monitoring software can be to monitor the state of the exoskeleton system 100 in order to provide device understanding to achieve a desired performance capability. A portion of this can be the development of a system body pose estimate. In one embodiment, the exoskeleton device 510 uses the onboard sensors 513 to develop a real-time understanding of the user's pose. In other words, data from sensors 513 can be used to determine the configuration of the actuation units 110, which along with other sensor data can in turn be used to infer a user pose or body configuration estimate of the user 101 wearing the actuation units 110.

At times, and in some embodiments, it can be unrealistic or impossible for the exoskeleton system 100 to directly sense all important aspects of the system pose due to the sensing modalities not existing or their inability to be practically integrated into the hardware. As a result, the exoskeleton system 100 in some examples can rely on a fused understanding of the sensor information around an underlying model of the user's body and the exoskeleton system 100 the user is wearing. In one embodiment of a dual leg knee assistance exoskeleton system 100, the exoskeleton device 510 can use an underlying model of the user's lower extremity and torso body segments to enforce a relational constraint between the otherwise disconnected sensors 513. Such a model can allow the exoskeleton system 100 to understand the constrained motion of the two legs 102 in that they are mechanically connected through the user's kinematic chain created by the body. This approach can be used to ensure that the estimates for knee orientation are properly constrained and biomechanically valid. In various embodiments, the exoskeleton system 100 can include sensors 513 embedded in the exoskeleton device 510 and/or pneumatic system 520 to provide a fuller picture of the system posture. In yet another embodiment, the exoskeleton system 100 can include logical constraints that are unique to the application in an effort to provide additional constraints on the operation of the pose estimation. This can be desirable, in some embodiments, in conditions where ground truth information is unavailable such as highly dynamic actions, where the exoskeleton system 100 is denied an external GPS signal, or the earth's magnetic field is distorted.

In some embodiments, changes in configuration of the exoskeleton system 100 based on location and/or location attributes can be performed automatically and/or with input from the user 101. For example, in some embodiments, the exoskeleton system 100 can provide one or more suggestions for a change in configuration based on location and/or location attributes and the user 101 can choose to accept such suggestions. In further embodiments, some or all configurations of the exoskeleton system 100 based on location and/or location attributes can occur automatically without user interaction.

Various embodiments can include the collection and storage of data from the exoskeleton system 100 throughout operation. In one embodiment, this can include the live streaming of the data collected on the exoskeleton device 510 to a cloud storage location via the communication unit(s) 514 through an available wireless communication protocol or storage of such data on the memory 512 of the exoskeleton device 510, which may then be uploaded to another location via the communication unit(s) 514. For example, when the exoskeleton system 100 obtains a network connection, recorded data can be uploaded to the cloud at a communication rate that is supported by the available data connection. Various embodiments can include variations of this, but the use of monitoring software to collect and store data about the exoskeleton system 100 locally and/or remotely for retrieval at a later time for an exoskeleton system 100 such as this can be included in various embodiments.

In some embodiments, once such data has been recorded, it can be desirable to use the data for a variety of different applications. One such application can be the use of the data to develop further oversight functions on the exoskeleton system 100 in an effort to identify device system issues that are of note. One embodiment can be the use of the data to identify a specific exoskeleton system 100 or leg actuator unit 110 among a plurality, whose performance has varied significantly over a variety of uses. Another use of the data can be to provide it back to the user 101 to gain a better understanding of how they ski. One embodiment of this can be providing the data back to the user 101 through a mobile application that can allow the user 101 to review their use on a mobile device. Yet another use of such device data can be to synchronize playback of data with an external data stream to provide additional context. One embodiment is a system that incorporates the GPS data from a companion smartphone with the data stored natively on the device. Another embodiment can include the time synchronization of recorded video with the data stored that was obtained from the device 100. Various embodiments can use these methods for immediate use of data by the user to evaluate their own performance, for later retrieval by the user to understand behavior from the past, for users to compare with other users in-person or through an online profile, by developers to further the development of the system, and the like.

Another aspect of a method of operating an exoskeleton system 100 can include monitoring software configured for identifying user-specific traits. For example, the exoskeleton system 100 can provide an awareness of how a specific skier 101 operates in the exoskeleton system 100 and over time can develop a profile of the user's specific traits in an effort to maximize device performance for that user. One embodiment can include the exoskeleton system 100 identifying a user-specific use type in an effort to identify the use style or skill level of the specific user. Through an evaluation of the user form and stability during various actions (e.g., via analysis of data obtained from the sensors 513 or the like), the exoskeleton device 510 in some examples can identify if the user is highly skilled, novice, or beginner. This understanding of skill level or style can allow the exoskeleton system 100 to better tailor control references to the specific user.

In further embodiments, the exoskeleton system 100 can also use individualized information about a given user to build a profile of the user's biomechanic response to the exoskeleton system 100. One embodiment can include the exoskeleton system 100 collecting data regarding the user to develop an estimate of the individual user's knee strain in an effort to assist the user with understanding the burden the user has placed on his legs 102 throughout use. This can allow the exoskeleton system 100 to alert a user if the user has reached a historically significant amount of knee strain to alert the user that he may want to stop to spare himself potential pain or discomfort.

Another embodiment of individualized biomechanic response can be the system collecting data regarding the user to develop an individualized system model for the specific user. In such an embodiment the individualized model can be developed through a system ID (identification) method that evaluates the system performance with an underlying system model and can identify the best model parameters to fit the specific user. The system ID in such an embodiment can operate to estimate segment lengths and masses (e.g., of legs 102 or portions of the legs 102) to better define a dynamic user model. In another embodiment, these individualized model parameters can be used to deliver user specific control responses as a function of the user's specific masses and segment lengths. In some examples of a dynamic model, this can help significantly with the device's ability to account for dynamic forces during highly challenging activities.

In various embodiments, the exoskeleton system 100 can provide for various types of user interaction. For example, such interaction can include input from the user 101 as needed into the exoskeleton system 100 and the exoskeleton system 100 providing feedback to the user 101 to indicate changes in operation of the exoskeleton system 100, status of the exoskeleton system 100, and the like. As discussed herein, user input and/or output to the user can be provided via one or more user interface 515 of the exoskeleton device 510 or can include various other interfaces or devices such as a smartphone user device. Such one or more user interfaces 515 or devices can be located in various suitable locations such as on a backpack 155 (see e.g., FIG. 1), the pneumatic system 520, leg actuation units 110, or the like.

The exoskeleton system 100 can be configured to obtain intent from the user 101. For example, this can be accomplished through a variety of input devices that are either integrated directly with the other components of the exoskeleton system 100 (e.g., one or more user interface 515), or external and operably connected with the exoskeleton system 100 (e.g., a smartphone, wearable device, remote server, or the like). In one embodiment, a user interface 515 can comprise a button that is integrated directly into one or both of the leg actuation units 110 of the exoskeleton system 100. This single button can allow the user 101 to indicate a variety of inputs. In another embodiment, a user interface 515 can be configured to be provided through a torso-mounted lapel input device that is integrated with the exoskeleton device 510 and/or pneumatic system 520 of the exoskeleton system 100. In one example, such a user interface 515 can comprise a button that has a dedicated enable and disable functionality; a selection indicator dedicated to the user's desired power level (e.g., an amount or range of force applied by the leg actuator units 110); and a selector switch that can be dedicated to the amount of predictive intent to integrate into the control of the exoskeleton system 100. Such an embodiment of a user interface 515 can use a series of functionally locked buttons to provide the user 101 with a set of understood indicators that may be required for normal operation in some examples. Yet another embodiment can include a mobile device that is connected to the exoskeleton system 100 via a Bluetooth connection or other suitable wired or wireless connection. Use of a mobile device or smartphone as a user interface 515 can allow the user a far greater amount of input to the device due to the flexibility of the input method. Various embodiments can use the options listed above or combinations and variants thereof, but are in no way limited to the explicitly stated combinations of input methods and items.

The one or more user interface 515 can provide information to the user 101 to allow the user to appropriately use and operate the exoskeleton system 100. Such feedback can be in a variety of visual, haptic and/or audio methods including, but not limited to, feedback mechanisms integrated directly on one or both of the actuation units 110; feedback through operation of the actuation units 110; feedback through external items not integrated with the exoskeleton system 100 (e.g., a mobile device); and the like. Some embodiments can include integration of feedback lights in the actuation units 110 of the exoskeleton system 100. In one such embodiment, five multi-color lights are integrated into the knee joint 125 or other suitable location such that the user 101 can see the lights. These lights can be used to provide feedback of system errors, device power, successful operation of the device, and the like. In another embodiment, the exoskeleton system 100 can provide controlled feedback to the user to indicate specific pieces of information. In such embodiments, the exoskeleton system 100 can pulse the joint torque on one or both of the leg actuation units 110 to the maximum allowed torque when the user changes the maximum allowable user-desired torque, which can provide a haptic indicator of the torque settings. Another embodiment can use an external device such as a mobile device where the exoskeleton system 100 can provide alert notifications for device information such as operational errors, setting status, power status, and the like. Types of feedback can include, but are not limited to, lights, sounds, vibrations, notifications, and operational forces integrated in a variety of locations that the user 101 may be expected to interact with including the actuation units 110, pneumatic system 520, backpack 155, mobile devices, or other suitable methods of interactions such as a web interface, SMS text or email.

The communication unit 514 can include hardware and/or software that allows the exoskeleton system 100 to communicate with other devices, including a user device, a classification server, other exoskeleton systems 100, or the like, directly or via a network. For example, the exoskeleton system 100 can be configured to connect with a user device, which can be used to control the exoskeleton system 100, receive performance data from the exoskeleton system 100, facilitate updates to the exoskeleton system, and the like. Such communication can be wired and/or wireless communication.

In some embodiments, the sensors 513 can include any suitable type of sensor, and the sensors 513 can be located at a central location or can be distributed about the exoskeleton system 100. For example, in some embodiments, the exoskeleton system 100 can comprise a plurality of accelerometers, force sensors, position sensors, and the like, at various suitable positions, including at the arms 115, 120, joint 125, actuators 130 or any other location. Accordingly, in some examples, sensor data can correspond to a physical state of one or more actuators 130, a physical state of a portion of the exoskeleton system 100, a physical state of the exoskeleton system 100 generally, and the like. In some embodiments, the exoskeleton system 100 can include a global positioning system (GPS), camera, range sensing system, environmental sensors, elevation sensor, microphone, thermometer, or the like. In some embodiments, the exoskeleton system 100 can obtain sensor data from a user device such as a smartphone, or the like.

In some cases, it can be beneficial for the exoskeleton system 100 to generate or augment an understanding of a user 101 wearing the exoskeleton system 100 of the environment and/or operation of the exoskeleton system 100 through integrating various suitable sensors 515 into the exoskeleton system 100. One embodiment can include sensors 515 to measure and track indicators to observe various suitable aspects of user 101. These indicators can include biological indicators such as body temperature, heart rate, respiratory rate, blood pressure, blood oxygenation saturation, expired $CO_2$, blood glucose level, sweat rate, muscle activation, EMG, EKG, muscle fatigue, joint rotational speeds and accelerations, and the like, and performance indicators such as balance, agility, gait speed, time to complete a physical task, time to complete a cognitive task and the like.

In some embodiments, the exoskeleton system 100 can take advantage of the relatively close and reliable connectivity of such sensors 515 to the body of the user 101 to record system vitals and store them in an accessible format (e.g., at the exoskeleton device, a remote device, a remote server, or the like). Another embodiment can include environmental sensors 515 that can continuously or periodically measure the environment around the exoskeleton system 100 for various environmental conditions such as temperature, humidity, light level, barometric pressure, radioactivity, sound level, toxins, contaminants, or the like. In some examples, various sensors 515 may not be required for operation of the exoskeleton system 100 or directly used by operational control software, but can be stored for reporting to the user 101 (e.g., via an interface 515) or sending to a remote device, a remote server, or the like.

The pneumatic system 520 can comprise any suitable device or system that is operable to inflate and/or deflate the actuators 130 individually or as a group. For example, in one embodiment, the pneumatic system can comprise a diaphragm compressor as disclosed in related patent application Ser. No. 14/577,817 filed Dec. 19, 2014, or a pneumatic power transmission as discussed herein.

Figure 6:
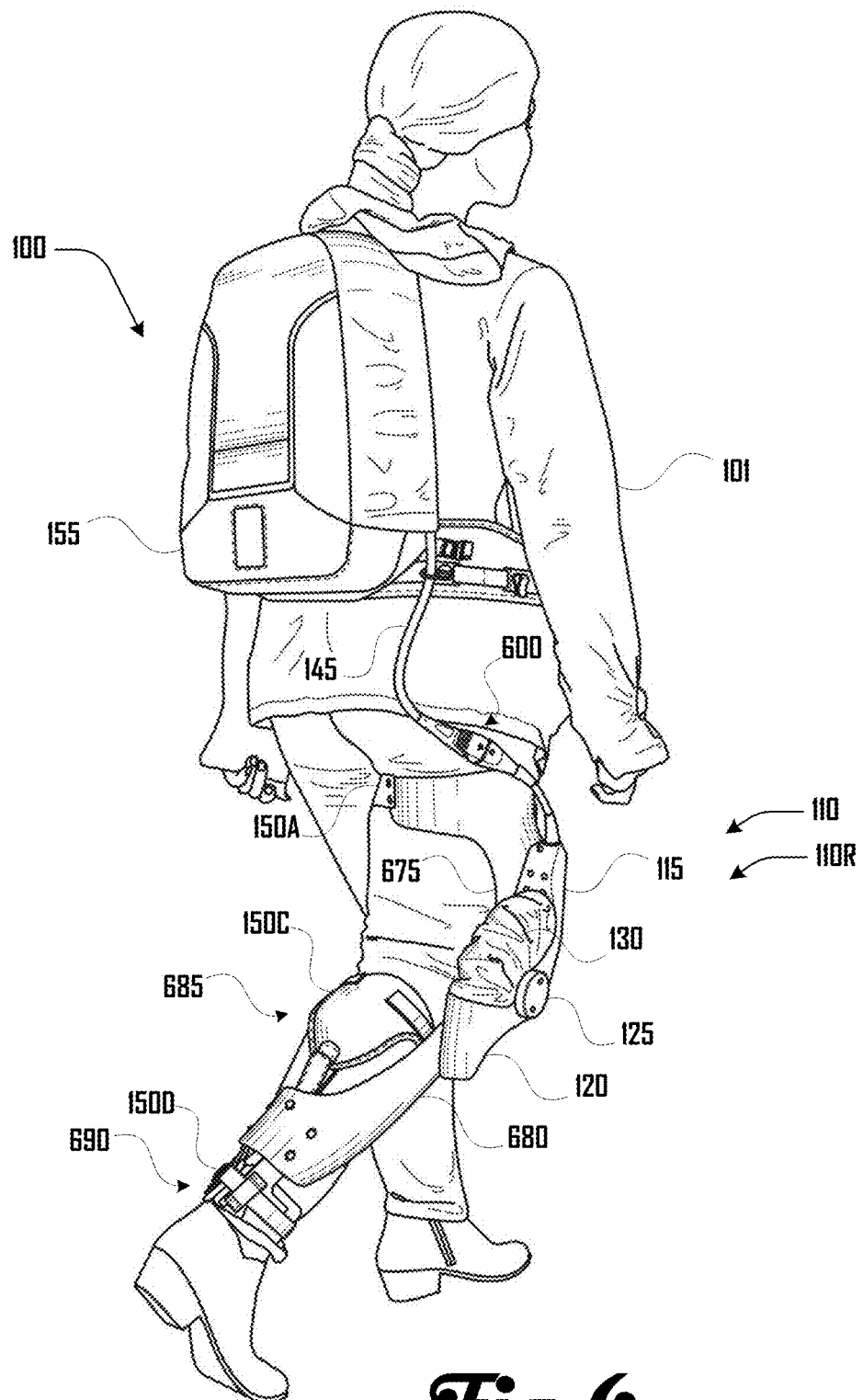
FIG. 6 is a rear view of another embodiment of an exoskeleton system including a leg actuator unit coupled to the right leg of a user.
Figure 7:
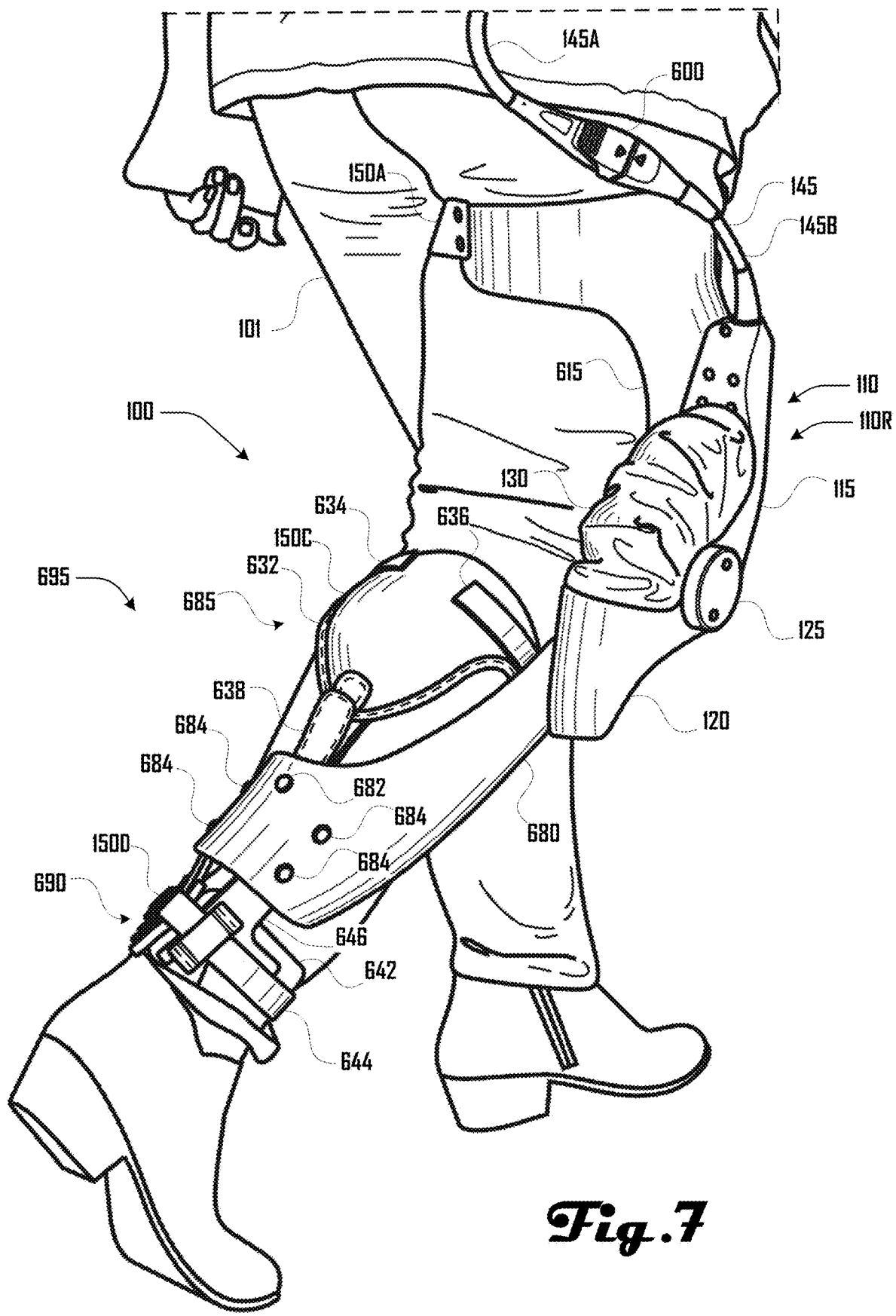
FIG. 7 is a close-up view of a portion of the illustration of FIG. 6.

Turning to FIGS. 6 and 7, another embodiment of an exoskeleton system 100 is illustrated. In this example embodiment, the exoskeleton system 100 includes a single right leg actuator unit 110; however, it should be clear that this example embodiment can be extended to an exoskeleton system 100 having both a left and right actuator unit 110L, 110R or only a left actuator unit 110L. Accordingly the example of FIGS. 6 and 7 should not be construed as limiting, and in further embodiments, any suitable elements can be present in a suitable plurality, absent, or interchanged with elements of other embodiments (e.g., FIGS. 1-4), or the like.

As shown in FIGS. 6 and 7, the leg actuator unit 110 can include an upper arm 115 and a lower arm 120 that are rotatably coupled via a joint 125. A bellows actuator 130 extends between the upper arm 115 and lower arm 120. A cable 145 can be coupled to the bellows actuator 130 to provide power, communication and/or introduce and/or remove fluid from the bellows actuator 130 to cause the bellows actuator 130 to expand and contract and to stiffen and soften, as discussed herein. As shown in the example of FIGS. 6 and 7, the cable 145 can comprise a cable connector 600 that can define a releasable coupling along a portion of the cable 145 with first and second cable portions 145A, 145B on opposing sides of the cable connector 600. As discussed in more detail herein, in various embodiments, the cable connector 600 can provide for a releasable coupling of a unified unitary cable 145 that comprises elements for fluid transfer, electrical power transfer and/or communications to, from or between the exoskeleton device 510 (e.g., disposed in the backpack 155) and an exoskeleton unit 110 and/or actuator 130 as discussed herein. In some embodiments, the cable connector 600 can couple directly with the exoskeleton device 510 (e.g., disposed in the backpack 155) or exoskeleton unit 110 and/or actuator 130 such that only a single cable portion 145A or 145B extends from the cable connector 600.

A backpack 155 can be worn by the user 101 (see FIG. 6) and can hold various components of the exoskeleton system 100 such as a fluid source, control system, a power source, exoskeleton device, pneumatic system, and the like as discussed herein. For example, in some embodiments, the backpack 155 can comprise or store one or more of the components of an exoskeleton device 510 (see e.g., FIG. 5).

As shown in FIGS. 6 and 7, the leg actuator unit 110 can be coupled about the right leg of the user 101 with the joint 125 positioned at the right knee 103R of the user 101 (see FIGS. 1-3 for labeling of body parts of the user 101), with the upper arm 115 of the leg actuator unit 110R being coupled about the right upper-leg portion 104R of the user 101 via one or more couplers 150 (e.g., straps that surround the legs 102). The lower arm 120 of the leg actuator unit 110 can be coupled about the right lower-leg portion 105R of the user 101 via one or more couplers 150.

The upper and lower arms 115, 120 of a leg actuator unit 110 can be coupled about the leg 102 of a user 101 in various suitable ways. For example, FIGS. 6 and 7 illustrate an example where the upper and lower arms 115, 120 and joint 125 of the leg actuator unit 110 are coupled along lateral faces (sides) of the top and bottom portions 104, 105 of the leg 102. As shown in the example of FIGS. 6-9, the upper arm 115 can be coupled to the upper-leg portion 104 of a leg 102 above the knee 103 via one coupler 150 and the lower arm 120 can be coupled to the lower-leg portion 105 of a leg 102 below the knee 103 via two couplers 150.

Specifically, the upper arm 115 can be coupled to the upper-leg portion 104 of the leg 102 above the knee 103 via a first upper-leg coupler 150A. The first upper-leg coupler 150A can be associated with a rigid upper-leg brace 675 disposed on and engaging a lateral side of the upper-leg portion 104 of the leg 102, with a strap of the first upper-leg coupler 150A extending around the upper-leg portion 104 of the leg 102. The upper arm 115 can be coupled to the rigid upper-leg brace 675 on a lateral side of the upper-leg portion 104 of the leg 102, which can transfer force generated by the actuator 130 through the upper arm 115 to the upper-leg portion 104 of the leg 102.

The lower arm 120 can be coupled to the lower-leg portion 105 of a leg 102 below the knee 103 via a second set of couplers 695 that includes first and second lower-leg couplers 150C, 150D. The first and second lower-leg couplers 150C, 150D can be associated with a rigid lower-leg brace 680 disposed on and engaging a lateral side of the lower-leg portion 105 of the leg 102. The lower arm 120 can be coupled to the rigid lower-leg brace 680 on a lateral side of the lower-leg portion 105 of the leg 102, which can transfer force generated by the actuator 130 through the lower arm 120 to the lower-leg portion 105 of the leg 102. The rigid lower-leg brace 680 can extend downward from a coupling with the lower arm 120 at a lateral position on the lower-leg portion 105 of the leg 102, with a portion of the rigid lower-leg brace 680 curving toward the posterior (back) of the lower-leg portion 105 to attachments 682, 684 that couple one or more portions of the first and second lower-leg couplers 150C, 150D to the rigid lower-leg brace 680.

The first lower-leg coupler 150C can include a calf-coupling assembly 685 that includes a calf brace 632 that is coupled to the rigid lower-leg brace 680 via a first, second and third calf strap 634, 636, 638. For example, as shown in the example of FIGS. 6 and 7, the first and second calf straps 634, 636 can extend horizontally from opposing lateral sides of an upper portion of the rigid lower-leg brace 680 from an internal face of the rigid lower-leg brace 680. The third calf strap 638 can extend vertically from a lower posterior portion of the rigid lower-leg brace 680 from an internal face of the rigid lower-leg brace 680 where the third calf strap 638 is coupled to the rigid lower-leg brace 680 via a first set of one or more attachments 682. In various embodiments, the calf brace 632 can be a rigid or flexible element and can comprise materials such as a fabric, plastic, carbon-fiber, or the like. These examples in no way limit the possible configurations of the calf strap, including the number of straps, which may vary from 1, 2, 3, 5, 6, 10 and the like; their extension direction from the upper portion and/or lower portion of the rigid lower-leg brace 680; and whether they extend from an internal or external face or edge of the rigid lower-leg brace 680.

The calf straps 634, 636, 638 can be configured in various suitable ways and can include various suitable mechanisms that allow the calf straps 634, 636, 638 to be tightened, loosened, extended, shortened, removed, or the like. For example, in some embodiments, the first and second calf straps 634, 636 comprise hook and loop tape (e.g., Velcro) that allows the second calf straps 634, 636 to be tightened, loosened, extended, shortened, or the like. In some embodiments, the third calf strap 638 can comprise a strap cinch, or the like, that allows the third calf strap 638 to be tightened, loosened, extended, shortened, or the like.

The second lower-leg coupler 150D can comprise an ankle-coupling assembly 690 that includes a cuff 642 that extends around and surrounds the lower-leg portion 105 in proximity to the ankle of the user 101, including on, above or below the ankle within 0 mm, 6 mm, 1 cm, 5 cm, 10 cm, and held via an ankle strap 644. The cuff 642 can be coupled to the rigid lower-leg brace 680 via one or more coupling tabs 646 that extend vertically from the cuff 642, with the one or more coupling tabs 646 coupled to the rigid lower-leg brace 680 via a second set of one or more attachments 64 on an internal face of the rigid lower-leg brace 680. In some embodiments, the coupling tab 646 is fixed relative to the rigid lower-leg brace 680, which in turn fixes the position of the ankle-coupling assembly 690 relative to the rigid lower-leg brace 680. In other embodiments, the coupling tab is semi-rigidly fixed to the rigid lower-leg brace 680, allowing for adjustment of the ankle-coupling assembly 690 position relative to the rigid lower-leg brace 680. In some embodiments of this, the adjustment is done manually, such as by loosening and tightening an adjustment screw, by the user, someone trained in the fitting of the device to the user, or another person and the like, or the adjustment is controlled by the exoskeleton system through such means as a rack and pinion gear driven by a motor and the like. In other embodiments, the coupling tab remains free to move relative to the rigid lower-leg brace 680, allowing for dynamic adjustment of the ankle-coupling assembly 690 position relative to the rigid lower-leg brace 680 which can accommodate the movements of the user. The ankle strap 644 can include various suitable elements that allow the ankle strap to be tightened, loosened, extended, shortened, removed or the like (e.g., hook and loop tape, strap cinch, or the like).

In various embodiments, the rigid upper-leg and lower-leg braces 675, 680 can be made of various suitable materials such as a plastic, carbon-fiber, metal, wood, or the like. As discussed herein, in some embodiments the upper-leg and/or lower-leg braces 675, 680 can be formed to match the contours of the legs 102 of the user 101, which can be desirable for increasing comfort for the user 101 maximizing surface area of the upper-leg and/or lower-leg braces 675, 680 engaging the legs 102 of the user 101, and the like. In some examples, the upper-leg and/or lower-leg braces 675, 680 can be formed specifically for a given user 101, which can include molding to user body parts, scanning the user's body and generating upper-leg and/or lower-leg braces 675, 680 from such scan data, and the like. In some examples, the upper-leg and/or lower-leg braces 675, 680 can be formed specifically for a given set of users 101, such as those with similar body morphologies such that they can be used to fit segments of the user population.

In some embodiments, alignment and suspension of one or more actuation units 110 on the leg 102 (or other body parts) of a user 101 can be achieved in some examples via a strap connected at the lower-leg 105 just above the ankle of the user 101. For example, such a strap can be firmly placed in a supra-malleolar location that is located above the malleolus (protruding bones at the ankle) and below the bulk of the calf muscle. Such a strap can be connected in a firm connection such that it lies in a narrowing diameter portion of the user's leg 102. For example, coupler 150D of FIGS. 1-4, 6 and 7 and/or ankle coupling assembly 690 of FIGS. 6 and 7 can be configured in such a way. Such a connection method can be beneficial in some examples by having no portion of the actuator unit 110 (or at least no substantive portion used for coupling) extending below the ankle of the user 101 to interface with the user's foot, user's footwear, the ground, or area below the malleolus. In some examples, where the user's footwear extends to a supra-malleolar location, it can be advantageous to interact with the footwear, the advantages including but not limited to improving comfort, reducing irritation, increasing friction and suspension of the actuation unit 110, reducing the accuracy needed in the location of the ankle coupling assembly 690 on the lower-leg 105, and the like.

While various embodiments discussed and illustrated herein can relate to exoskeleton systems 100 configured for users 101 having all conventional body parts, further embodiments can include exoskeleton systems configured to be worn by users 101 that are amputees or persons who otherwise do not have all conventional body parts (e.g., a person who is missing one or more toe, foot, lower leg, leg, knee joint, finger, hand, distal portion of an arm, elbow joint, arm, or the like).

As mentioned above, it can be desirable for the exoskeleton system 100 to be capable of being used in many different scenarios in which damage is likely. These scenarios can include inclement weather, wet locations, such as in a pool or in the sea, unsanitary locations, or high-impact drops. One example scenario is a maritime environment, which includes the exoskeleton system 100 operating near or on a body of water, such as a beach, dock, port, naval base, swamp, river, lake, sea, ocean, and the like, where the water may be freshwater, saltwater, or some combination thereof. The maritime environment also includes the possibility of the air surrounding the exoskeleton system 100 to contain additional components such as salt, water, or other particulates, some of which may be corrosive. In a preferred embodiment, the exoskeleton system 100 can be made corrosion resistant and waterproof. In such an embodiment, corrosion resistant materials can be used to construct the actuation unit(s) 110 and/or parts of the actuator(s) 130, which in various examples can be sealed tightly, and can use sealing features to keep water out of the system. Various materials may be used including, but not limited to, stainless steel, aluminum, or plastics. The waterproof features in various examples can allow the exoskeleton system 100 to be easily cleaned with water and allow dirt, salt, and sand or other particles that may damage the system to be removed. Regular cleaning may also prevent rusting or corrosion of the materials.

The actuation unit(s) 110 can be in constant motion during some types of use and can experience intentional impact from the user walking or jumping. The exoskeleton system 100 may also experience unintentional impact when a person falls or trips, or impact from debris that may come from the wind blowing particles or objects, objects falling down a hill, and objects swimming in motion in water due to currents, waves, or other disturbances. In order to be prepared for these scenarios, the actuation unit(s) 110 in some embodiments can use features to make the actuation unit(s) 110 stronger and impact resistant. In one embodiment, an outer shell or housing of the actuation unit(s) 110 can be made with impact-resistant materials, and the material used may also be lightweight, such as plastics or lightweight metals. The light weight can make the equipment easier to carry when not in use or damaged and the impact resistance can reduce the potential of damage.

It can be desirable for the exoskeleton system 100 to be usable in these situations and also easily repairable should damage occur. In one embodiment, the exoskeleton system 100 uses a modular system, with parts that are quickly replaceable. In such an embodiment, parts such as the actuator(s) 130, cable(s) 145 or buttons are easily removable and new parts are available to replace them. The ease of removal and replacement of such parts may allow the exoskeleton system 100 to be field serviceable. The removable components can allow the user to perform maintenance on the system or simply to ensure no issues exist with any components wherever they are. For example, while in the wilderness, on a plane or boat, or anywhere in which they may not have access to a full set of equipment or tools, in various examples the user can still thoroughly examine and maintain the exoskeleton system 100 including the actuator unit(s) 100.

In various embodiments, the actuator(s) 130 of the actuator units 100 may be removable and replaceable. In order to prolong the life of an actuator 130, it can be desirable in some embodiments to know the age and amount of use information of the actuator 130. In one embodiment, the exoskeleton system 100 has a life indicator of one or more actuators 130 of the exoskeleton system 100. This indicator may include, but is not limited to, a series of LED lights as a counter, phone app receiving information (see e.g., FIG. 8), a monitor on the actuation unit 110 and/or exoskeleton device 510 with life information and the like. Based on the information from such indicator, the user may examine the actuator for issues, perform maintenance on the actuator, remove and replace the actuator, and the like. In one embodiment, the life indicator counts the number of cycles of the actuator, and when it reaches a preset number, a series of LED lights are (completely) lit up and the user can follow premade instructions to remove the actuator 130 and perform maintenance. Information given by the indicator can include, but is not limited to, force or pressure on the actuator 130, range of motion, active use time of the actuator 130 and the like.

The exoskeleton system 100 in various embodiments may include many different sensors that can help with the operation of the exoskeleton system 100. Example sensors can include inertial sensors (e.g., accelerometer, gyroscope, magnetometer, inclinometer), goniometer, encoder, current sensor, light sensor (e.g., photocell), water contact, pressure, GPS, barometer, anemometers, weather sensors (e.g., to detect oncoming storm/white squall), and the like. Such sensors can include sensors 513 of the exoskeleton device 510, sensors associated with the actuation unit(s) 110 and/or actuator(s) 130, sensors associated with an external device or system such as a user device, building or vehicle (see e.g., ship 850 of FIG. 8), or the like. Various embodiments can include any suitable sensors in such locations with other embodiments having such sensors specifically absent in such locations. Additionally, in various embodiments, the same type of sensor can be located in multiple of such locations or can be located in only one such location. Accordingly, any specific examples should not be limiting on the wide variety of sensor configurations that are within the scope and spirit of the present disclosure.

In one embodiment, the exoskeleton system 100 includes inertial sensors. Inertial sensors can include, but are not limited to, accelerometers, gyroscopes, magnetometers, inclinometers, and the like. In some embodiments, the information from such sensors can help determine the amount of wear on portions of the exoskeleton system 100 such as the actuation unit(s) 110, actuator(s) 130, elements of the exoskeleton device 510, and the amount of time remaining for use before maintenance is needed.

For example, a method of determining whether maintenance is needed or a time until maintenance is needed can comprise obtaining data regarding portions of the exoskeleton system 100. Such data can comprise use history (e.g., number of steps taken, number of actuator contractions, total force absorbed by actuator units 110 over a period of time, time in active use, time since installation, and the like) or a current state of various components of exoskeleton system 100 (e.g., whether a part is broken or operable, range of motion, results of a health test, ability of an actuator to hold fluid, and the like). Such components of an exoskeleton system 100 can include any suitable portions of an exoskeleton device 510, leg actuator unit(s) 110, actuator(s) 130, and the like. The method can further include determining a health status of one or more portions of the exoskeleton system 100 and comparing the determined health status of the one or more portions of the exoskeleton system 100 to a threshold minimum health status for the respective portion of the exoskeleton system 100. If a health status of a given portion of the exoskeleton system 100 is below a minimum threshold health status for the given portion of the exoskeleton system 100, then a determination can be made that the given portion should be replaced and/or serviced. A determination to replace a given portion of the exoskeleton system 100 can be made based on a determination or profile of the given portion indicating that the given portion is unable to be serviced, should not be service, or that parts for the given portion are unavailable.

In some embodiments, if a health status of a given portion of the exoskeleton system 100 is not below a minimum threshold health status for the given portion of the exoskeleton system 100, then a determination can be made of when the given portion should be replaced and/or serviced. Such a time can include a total time, a time of active use, a further number of steps taken, a further number of actuator contractions, a further total force absorbed by actuator units 110, and the like. In some embodiments, such time or conditions can be tracked, and an alert can be provided to the user 101 (e.g., via an external device 810, interface 515, or the like) when such an amount of time or active time is reached, or such conditions have been met. In some embodiments, a timer or countdown of such time or conditions can be presented to a user (e.g., via an external device 810, interface 515, or the like). In various embodiments, a determination that a part needs to be serviced or replaced or a determination of when a part needs to be serviced or replaced can be sent to and/or tracked by an exoskeleton server 830, admin device 840, or the like.

In another embodiment, the exoskeleton system 100 includes a goniometer. Such a sensor in various embodiments can measure the range of motion of an actuation unit 110 and/or actuator 130 and suggest possible service required if an issue with its range of motion is detected. For example, a method of determining range of motion is an issue can comprise obtaining data regarding range of motion of one or more portions of the exoskeleton system 100. Such data can comprise range of motion history or a current range of motion of various components of exoskeleton system 100 (e.g., one or more actuator 130, one or more actuation unit 110, and the like). The method can further include determining a health status of the range of motion of the one or more portions of the exoskeleton system 100 and comparing the determined range of motion health status of the one or more portions of the exoskeleton system 100 to a threshold minimum range of motion health status for the respective portion of the exoskeleton system 100. If a range of motion health status of a given portion of the exoskeleton system 100 is below a minimum range of motion threshold health status for the given portion of the exoskeleton system 100, then a determination can be made that the given portion should be replaced and/or serviced. A determination to replace a given portion of the exoskeleton system 100 can be made based on a determination or profile of the given portion indicating that the given portion is unable to be serviced, should not be service, or that parts for the given portion are unavailable.

In some embodiments, if a range of motion health status of a given portion of the exoskeleton system 100 is not below a minimum threshold range of motion health status for the given portion of the exoskeleton system 100, then a determination can be made of when the given portion should be replaced and/or serviced. Such a time can include a total time, a time of active use, a further number of steps taken, a further number of actuator contractions, a further total force absorbed by actuator units 110, and the like. In some embodiments, such time or conditions can be tracked, and an alert can be provided to the user 101 (e.g., via an external device 810, interface 515, or the like) when such an amount of time or active time is reached, or such conditions have been met. In some embodiments, a timer or countdown of such time or conditions can be presented to a user (e.g., via an external device 810, interface 515, or the like). In various embodiments, a determination that a part needs to be serviced or replaced or a determination of when a part needs to be serviced or replaced can be sent to and/or tracked by an exoskeleton server 830, admin device 840, or the like.

In another embodiment, the exoskeleton system 100 may have water sensors to detect the amount of water around the exoskeleton system 100 such as around the actuation unit(s) 110 and/or actuator(s) 130. As mentioned above, some or all of the exoskeleton system 100 may be waterproof or water resistant in some examples so it can operate in pools of water for short or long periods of time. Since it can be more difficult to move in pools of water or other liquid, in some embodiments the exoskeleton system 100 can be configured to increase the output strength of the actuator(s) 130 when a determination is made that a user wearing the exoskeleton system 100 is in a pool of water. In some embodiments, the exoskeleton system 100 may also use a pressure sensor, which may detect the pressure caused by the water and determine the amount of water and depth, to adjust and determine operation of the exoskeleton system 100 based at least in part on the determined presence of water and/or of the depth of the exoskeleton system 100 within the water.

A method of determining actuation of exoskeleton system 100 based on water and/or depth data can include obtaining sensor data regarding the presence of water around the exoskeleton system 100 and/or data indicating a depth of water that the exoskeleton system 100 is operating in. Such data can comprise data obtained from sensors associated with one or more actuation units 110, an exoskeleton device 510, or another suitable device with such sensors including a suitable water presence sensor, a suitable water depth sensor, or the like. In some embodiments, the exoskeleton system 100 can operate in a first configuration when it is determined that the exoskeleton system 100 is not fully or partially submerged in a body of water (e.g., that the one or more actuation units 110 are fully or partially submerged in water) and can be configured to operate in a second configuration different from the first configuration when it is determined that the exoskeleton system 100 is not fully or partially submerged in a body of water. For example, operating one or more actuation units 110 in a body of water can result in greater resistance to movement and it can be desirable to increase power output by an actuator 130 to compensate for the increased resistance to provide for the same or substantially similar support and assistance while in water. Accordingly, in various embodiments, the first operating configuration for operation outside of water can provide for less power output by one or more actuator units 110 of an exoskeleton system 100, and the second operating configuration for operation within a body of water can provide for greater power output by the one or more actuator units 110 compared to the first operating configuration. In various examples, the exoskeleton system 100 can switch between the first and second operating configuration based on determinations of whether the exoskeleton system 100 is in a body of water or not in a body of water, which can be made at regular intervals or continuously.

In some embodiments, the parameters of the second operating configuration can be further based at least in part on a determined depth within the body of water. For example, resistance to movement of the actuation unit(s) 110 can increase as with depth within the body of water. Additionally, elements of the exoskeleton system 100 such as gas lines, actuators 130, operating gas, and the like, may be impacted by higher pressure at greater depths. For example, gas lines and the actuators 130 may be compressed at high depths and require additional pressure to achieve the same actuation force via the actuation unit(s) 110. Accordingly, a method can include obtaining water depth data, determining a suitable operating configuration based on the depth data, and configuring the exoskeleton system 100 accordingly based on the determined suitable operating configuration corresponding to the determined depth.

In another embodiment, the exoskeleton system 100 may have a GPS for generating location data. Using location data, the exoskeleton system 100 may in some examples determine the terrain the user may soon encounter and suggest or determine altering the strength output by the actuator(s) 130 and/or actuator unit(s) 110. For example, if the exoskeleton system 100 determines that the user is entering or will enter steep terrain, the exoskeleton system 100 may suggest or automatically increase the actuator power so that the user can move easier.

In some embodiments, a method of configuring an exoskeleton system 100 based on location can include obtaining location data (e.g., GPS data); determining a location based on the location data; obtaining location characteristic data associated with the determined location; and configuring operating parameters of the exoskeleton system 100 based at least in part on the location characteristic data. For example, such location characteristic data can include slope of terrain, type of terrain (e.g., road, forest, marsh, desert, body of water, snow, sand), and the like.

Additionally, some embodiments can configure an exoskeleton system 100 based at least in part on data such as velocity, direction of travel, and the like, which can be based on data such as GPS data over time, compass data, acceleration data, or planned course information (e.g., mission plan, ship heading, or the like). In such embodiments, a method can include obtaining such data; making a determination of one or more locations where the user 101 and exoskeleton system 100 will be at a given time in the future; obtaining location characteristics for the determined one or more locations; and configuring the exoskeleton system 100 based at least in part on the location characteristics for the determined one or more locations. For example, changes in type and/or slope of terrain can be anticipated in various embodiments and the exoskeleton system 100 can be configured based on the anticipated type and/or slope of terrain that the user 101 is anticipated to be encountering.

In a further embodiment, the exoskeleton system 100 may have weather sensors to detect the possibility of inclement weather. Methods that may be used for weather detection include, but are not limited to, barometers, anemometers, weather forecast information online, or the like. This can be desirable for embodiments where the exoskeleton system 100 or components thereof are not designed to withstand specific weather conditions. For example, a user may be walking with an actuator unit 110 without waterproof features and be unaware that a rainstorm is approaching. The exoskeleton system 100 can sense or determine an approaching storm, may warn the user of the storm and the user can take precautions such as covering the actuator unit 110 or going indoors. Various embodiments can use the options listed above or combinations and variants thereof, but are in no way limited to the explicitly stated combinations of methods and items.

Some example embodiments can include a method of operating an exoskeleton system 100 based at least in part on weather data, can comprise obtaining weather data (e.g., from sensors of the exoskeleton system 100, from a location of the exoskeleton system 100 such as a ship 850, from an external device 810, exoskeleton server 830, admin device 840, or the like). In some embodiments, the method can include obtaining location data (e.g., GPS data); determining a location of the exoskeleton system 100 based at least in part on the location data; and obtaining the weather data corresponding to the determined location of the exoskeleton system 100. Such a method can further include determining whether weather conditions are and/or are anticipated to be undesirable above or below a given threshold (e.g., temperature too high, temperature too low, rain, snow, or the like). If it is determined that the weather conditions are and/or are anticipated to be undesirable above or below the given threshold, a response determination can be made and implemented (e.g., operating the exoskeleton system 100 with different operating parameters or in a different configuration based on such weather conditions, shutting down the exoskeleton system 100, providing an alert to the user 101 regarding the conditions, and the like).

As discussed herein, another component of the exoskeleton system 100 can be a power pack or exoskeleton device 510 (see e.g., FIG. 6), which in some examples may be worn by the user in many ways such as a backpack 155, shoulder mount, torso mount, a saddle bag, and the like. While various embodiments of the power pack or exoskeleton device 510 are configured to provide electrical power to power the actuation unit(s) 110 and fluid inflating the actuator(s) 130, such a power pack or exoskeleton device 510 may provide many other functions as discussed herein.

In one embodiment, the power pack or exoskeleton device 510 includes an accumulator or reservoir capable of storing high-pressure fluid (e.g., that is part of a pneumatic system 520). This reservoir can take the form of a high-pressure compressed air tank in some embodiments. Such an air tank in some examples may provide breathable air for the user as well as pressurized air for the actuator(s) 130 of the exoskeleton system 100, in which case the pressurized air may be regulated by an additional pressure regulator system to provide air at a safe breathable pressure. In some embodiments, such a breathing function along with the previously mentioned waterproof features can make the exoskeleton system 100 usable deep underwater for an extended period of time. In such a scenario, the user may breathe underwater with the breathable air supply with assisted movement from the exoskeleton system 100 to move through water. In some embodiments, air can be provided by an external source (e.g., from a fluid line from a ship 850) in addition to or as an alternative to a local air source at the exoskeleton system 100. Such a breathing function can include a regulator, a diving helmet, a diving mask, and the like for providing air to the user 101.

The power pack or exoskeleton device 510 may be configured to provide RF interference protection (e.g., in the 0-500 Mhz Range). In some embodiments, data from the exoskeleton system 100 may be transmitted using RFID (e.g., communication device 514). In one embodiment, the power pack uses a device (e.g., communication device 514) to give off RF signals to cause interference in nearby readers. This will not only protect data from the exoskeleton system 100 that is transmitted by RF, but can also protect other items such as credit cards or key cards that may transmit RF data.

Figure 8:
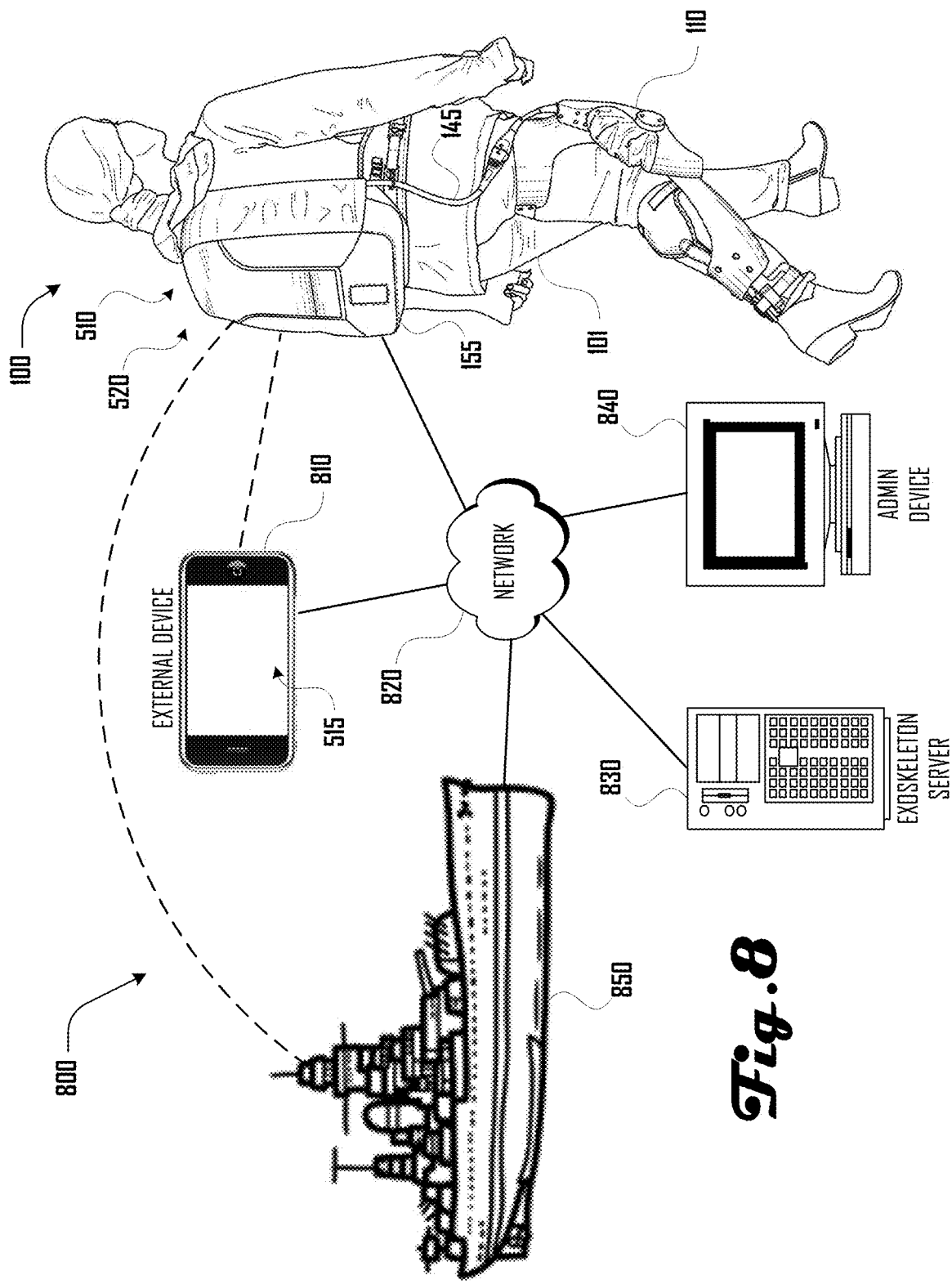
FIG. 8 illustrates an embodiment of an exoskeleton network that includes an exoskeleton system that is operably coupled to an external device and a ship via a direct connection and/or via a network.

Turning to FIG. 8, an embodiment of an exoskeleton network 800 is illustrated that includes an exoskeleton system 100 that is operably coupled to an external device 810 and a ship 850 via a direct connection and/or via a network 820. The exoskeleton system 100 can also be operably coupled to an exoskeleton server 830 and an admin device 840 as illustrated in the example of FIG. 8. For example, in some embodiments, some or all of the exoskeleton device 510 and/or pneumatic system 520 (see also FIG. 5) can be disposed within a backpack 155 configured to be worn by the user 101, and the exoskeleton device can be operably connected to an external device 810, ship 850 and/or network 820 via a communication unit 514 of the exoskeleton device 510 (see FIG. 5). Such one or more connections can be wireless and/or wired connections of various suitable types, such as Bluetooth, RFID, Wi-Fi, a cellular connection, a radio connection, a microwave connection, a satellite connection, or the like.

In some embodiments, the exoskeleton system 100 can be operably connected to the network (and the server 830, admin device 840 and/or ship 850) via the external device 810. For example, the exoskeleton device 510 may not have a direct operable connection to the network 820 and instead, can have a direct connection to the external device 810 and the external device 810 has an operable connection to the network 820, which allows the exoskeleton system 100 to communicate with the network (and the server 830, admin device 840 and/or ship 850) via the external device 810.

The network 820 can comprise any suitable wired and/or wireless network such as the Internet, a satellite network, a cellular network, a military network, a microwave network, a Wi-Fi network, a Large Area network (LAN), a Wide Area Network (WAN), or the like. Additionally, the example of FIG. 8 should not be construed as being limiting and any of the illustrated elements can be specifically absent or present in any suitable plurality in further embodiments. For example, in some embodiments, a plurality of exoskeleton systems 100 can be connected to the network 820, which can allow for communication between or among the plurality of exoskeleton systems 100.

The external device 810 in the example of FIG. 8 is shown as comprising a smartphone, but various other suitable external devices can be used in further embodiments, including a tablet computer, a headset device, a smartwatch, an embedded system, or the like. In various examples, the external device 810 can present a user interface 515 that allows input and/or feedback as discussed herein. However, it should be noted that the presence of a user interface 515 of an external device 810 does not mean that one or more additional user interfaces 515 is not present on or in the exoskeleton network 800 or exoskeleton system 100. For example, as discussed herein, one or more user interfaces 515 can be located in various suitable locations such as on, in or about a backpack 155, at one or more leg actuation units 110, at a pneumatic line 145, or the like. Additionally, while the example of a ship 850 is shown in FIG. 8, in further embodiments the exoskeleton system 100 can be operably connected to various vehicles or systems such as a boat, submarine, truck, car, oil rig, dock, building, airplane, jet, any vessel that travels in or on water, any wheeled vehicle, any tracked vehicle or the like.

The power pack or exoskeleton device 510 in some embodiments may be configured to be used off the body of the user 101. For example, when the user enters a building, car or ship 850, the exoskeleton system 100 or portion thereof may be configured to be stored or docked with such a vehicle or location. In one embodiment, a boat or ship 850 has a location where the power pack or exoskeleton device 510 may be plugged in for electrical power, fluidic power and/or data. In such an embodiment, the user can easily take off the power pack or exoskeleton device 510 when they enter the boat or ship 850 and connect the power pack or exoskeleton device 510 to power if needed or update data exchange.

For example, in some embodiments, a ship 850 can comprise a docking station for an exoskeleton device 510, which operably connects the exoskeleton device 510 to the ship 850 such as to a computing system of the ship 850, a fluid or air source of the ship 850, an electrical power source of the ship 850, and the like. In various embodiments, a connection to a computing system of the ship 850 can allow for the exoskeleton device 510 to obtain various types of data, obtain a network connection (e.g., to network 820, which may provide for communication with an exoskeleton server 830, admin device 840, or the like).

In various embodiments, a connection to a fluid or air source of the ship 850 can allow for the refilling of a local fluid or air source of the exoskeleton system 100 (e.g., a fluid source of pneumatic system 520); operation of the exoskeleton system 100 in addition to or as an alternative to local fluid or air source of the exoskeleton system 100; or operation of the exoskeleton system 100 in embodiments where a local fluid or air source is absent from exoskeleton system 100.

In various embodiments, a connection to an electrical power source of the ship 850 can allow for the recharging of a local power source of the exoskeleton system 100 (e.g., a battery of a power system 516); powering of the exoskeleton system 100 in addition to or as an alternative to local power source of the exoskeleton system 100; or operation of the exoskeleton system 100 in embodiments where a local power source is absent from exoskeleton system 100.

As mentioned above, the exoskeleton system 100 in some embodiments may be integrated with a boat or ship 850 to receive pneumatic power or electrical power or data. In one embodiment, the exoskeleton system 100 has a sensor system or communication system at the exoskeleton device 510 and/or the actuator unit(s) 110 to receive information related to a ship 850, occupants of the ship 850 and the water. Ship information may include, but is not limited to, the ship type, size, mechanics, capacity, occupant characteristics (e.g., weight, size, etc.) and the like. This can be useful in some examples for users working on a ship 850, who may need to perform maintenance on the engine or contact others. The data received from the ship 850 may alert the user to monitor the engine or give them contact information of someone to perform services.

For example, in some embodiments, the exoskeleton system 100 can have a direct operable connection with the ship 850 and/or via a network 820. Such an operable connection with a ship computing device of the ship 850 can allow the exoskeleton system 100 to communicate with the ship computing device of the ship 850. For example, the ship computing device can monitor conditions and status of the ship 850 or associated with the ship 850, such as condition and status of an engine, ship position, ship speed, ship heading, weather conditions, pitch or roll or yaw of the ship, ship course, flood status of ship compartments, fire status of ship compartments, alarm status of the ship 850, and the like. In various embodiments, such data associated with the ship 850 can be communicated to the exoskeleton system 100, and used by the exoskeleton system 100 to determine how to operate the exoskeleton system 100, to change a configuration of the exoskeleton system 100, to present an alert at the exoskeleton system 100 (e.g., via the user interface 515), and the like.

For example, where a ship alarm is sounded for fire, flood or man-overboard, such an alarm can be communicated to the exoskeleton system 100, which can provide a visual, haptic or auditory alert or can adapt operation or configuration of the exoskeleton system 100 based on such an alert.

In another example, operation or configuration of the exoskeleton system 100 can be changed based on data about the position of the ship 850 or conditions that may affect the ship 850 (e.g., ship position, ship speed, ship heading, weather conditions, pitch or roll or yaw of the ship, ship course, water conditions, and the like). For example, where rough seas are anticipated or being experienced, the exoskeleton system 100 can be configured to become more sensitive to and anticipate sudden movements of the ship 850 so that the exoskeleton system 100 can assist a user with handling such movement. Also, real-time data regarding the orientation and/or position of the ship 850 (pitch, roll or yaw of the ship 850) can be communicated to and used by the exoskeleton system 100 to assist a user with handling such movement. Such embodiments can be desirable to allow the exoskeleton system 100 to assist a user with maintaining balance and working in rough seas.

For example, a method of actuating and/or configuring an exoskeleton system 100 can comprise obtaining orientation and/or position data, which can include orientation and/or position data of the exoskeleton system 100 (e.g., from sensors of the exoskeleton system 100) and orientation and/or position data of a location of the exoskeleton system 100 (e.g., sensors from a vehicle such as a ship 850). The method can further include determining a current orientation and/or position of the user 101 and/or exoskeleton system 100 and/or determining an anticipated future orientation and/or position of the user 101 and/or exoskeleton system 100; determining how to support or assist the user based on the determined current orientation and/or position of the user 101 and/or exoskeleton system 100 and/or anticipated future orientation and/or position of the user 101 and/or exoskeleton system 100; and actuating actuation units 110 based at least in part on the determined support or assist. Such embodiments using data from the exoskeleton system 100 and a moving location of the exoskeleton system 100 (e.g., a ship 850, land vehicle, aircraft, or the like) can be desirable to assist a user 101 with handling movement of the location along with supporting their desired actions such as performing tasks in or on the moving location.

An exoskeleton system 100 in some examples may be an integrated part of a ship 850, in which the user only or primarily uses the exoskeleton system 100 when on the ship 850. Such an exoskeleton system 100 may also be used in addition to an exoskeleton system 100 or portion thereof used off the ship 850. In one embodiment the exoskeleton system 100 is or portion thereof is permanently mounted to the ship 850. In some examples of such an exoskeleton system 100, a user entering the ship 850 can strap themselves into the exoskeleton system 100 and move around the ship 850. In some embodiments such an exoskeleton system may be floor mounted, mounted to sides, mounted to a handle or roll bar, on a swivel, arm, a shank extended to floor/foot plate, and the like. In various embodiments, the exoskeleton system 100 may be mounted permanently, semi-permanently, or removably.

In one embodiment, the exoskeleton system 100 can be on a track and move on wheels through one or more room on the ship 850. For example, such a track can be an overhead track that allows for various elements to travel with the exoskeleton system 100 such as a safety tether to the track (e.g., that can catch the user if they are falling), a fluid or air source, an electrical power source, a communication cable, and the like. As discussed herein such elements may be in addition to elements such as a local fluid or air source of the exoskeleton system 100, a local battery of the exoskeleton system 100, a wireless communication connection to the ship 850, or the like. However, in some embodiments, one or more of such elements can be absent and the exoskeleton system 100 can rely on such elements from ship 850 to operate (e.g., would be fully or partially inoperable without such elements from the ship 850). In various examples, the user can easily strap themselves into the exoskeleton system 100 to go to a specific room and unstrapped themselves when they enter the room. Other methods may be used for a permanently or semi-permanently mounted exoskeleton system 100 in a ship 850, boat, building or another suitable environment.

In various embodiments, the exoskeleton system 100 can be water-resistant, waterproof, and/or corrosion resistant such that the exoskeleton system 100 is configured to operate near, on top of, or in a body of water (e.g., salt or fresh water such as an ocean, lake, river, or the like). In some embodiments, the exoskeleton system 100 can use a ship 850 as a base, which can include a safety tether between the ship 850 and exoskeleton system 100, a fluid or air source, an electrical power source, a communication cable, and the like. As discussed herein such elements may be in addition to elements such as a local fluid or air source of the exoskeleton system 100, a local battery of the exoskeleton system 100, a wireless communication connection to the ship 850, or the like. However, in some embodiments, one or more of such elements can be absent and the exoskeleton system 100 can rely on such elements from ship 850 to operate (e.g., would be fully or partially inoperable without such elements from the ship 850). In various examples, the user can easily strap themselves into the exoskeleton system 100 on the ship 850, enter and perform operations in the body of water or outside the ship (such as on the hull for example), and then return to the ship 850.

In some embodiments, the exoskeleton system 100 can be operably coupled to the ship via one or more of a fluidic line configured to provide fluid (e.g., air) to the exoskeleton system from a fluid source of the ship; a power line configured to provide electrical power to the exoskeleton system from an electrical power source of the ship; a communication line configured to provide for communication between the exoskeleton system and the ship; and a safety tether configured to provide a physical tethering between the exoskeleton system and the ship.

The exoskeleton system 100 in some embodiments may include safety features to protect the user during regular use in different environments. In some embodiments, the exoskeleton device 510 (e.g., disposed in a backpack 155) and/or actuator unit(s) 110 can have a quick doff feature which can allow the user to quickly remove a portion of or the entire exoskeleton system 100 in an effort to quickly evacuate the exoskeleton system 100. These quick doff features in some examples can allow easy disconnection between not only the exoskeleton device 510 and/or actuator unit(s) 110, but also between the user and exoskeleton device 510 and/or actuator unit(s) 110.

In one embodiment, the brace portion has a single lever, which when pulled disengages some or all the straps and connectors of the actuator unit(s) 110, the backpack 155, other unit in which an exoskeleton device 510 is disposed, or some combination thereof. The release can be made easier in some examples by using quick release buckles, magnetized buckles, ladder strap, and the like for the connectors. In other embodiments, the actuator unit 110 has a mechanism that quickly releases the actuator unit 110 from the user's leg. In other embodiments, the exoskeleton device 510 has a mechanism that quickly releases the exoskeleton device 510 from the user 101. One example embodiment is a cable driven buckle system, wherein pulling a single cable disengages multiple buckles.

The ease and quickness of disconnecting cable connectors, actuator unit(s) 110 and/or removing a backpack 155 having an exoskeleton device 510 can be desirable in various scenarios. For example, in some situations it may become important for the user to quickly doff the exoskeleton system 100 or portions thereof, in an effort to preserve their safety or for other suitable purpose. To accomplish this, some embodiments can introduce a quick-doff feature which can allow the user to quickly remove one or more portions of, or the entire exoskeleton system 100, in an effort to quickly evacuate the exoskeleton system 100 or portions thereof. One embodiment of this can include a quick-doff feature on an actuator unit 110 portion of the system that with a pull of a single lever (or other suitable mechanism), some or all the straps or connectors (e.g., couplers 150) to the leg can be disengaged and the actuator unit 110 can fall to the ground.

Figure 9:
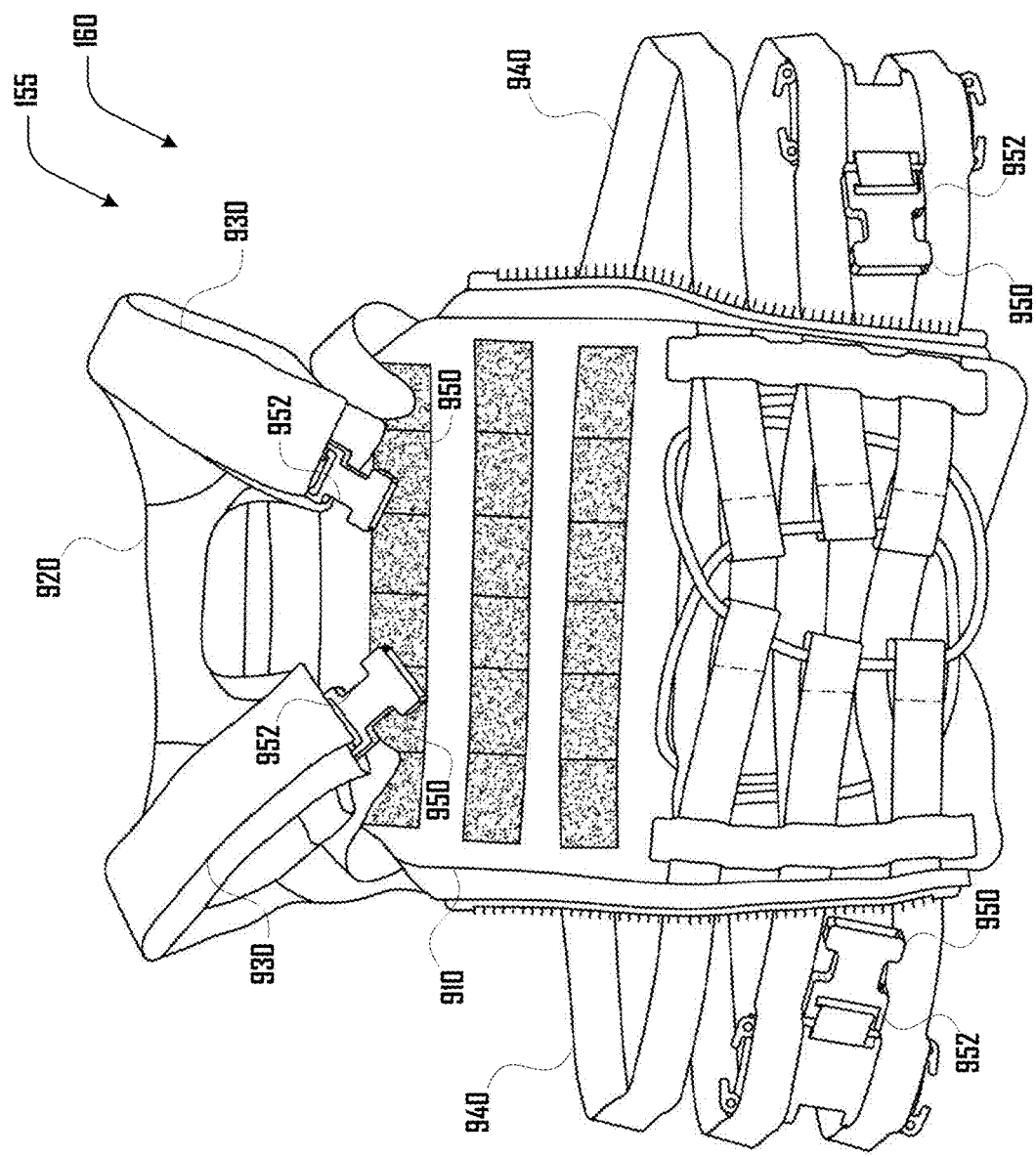
FIG. 9 illustrates a first portion of a backpack that comprises a back piece and a chest piece, which are coupled by shoulder straps and side straps, with a plurality of clips disposed at the straps.

Another embodiment can incorporate quick-doff features into a power pack portion of the exoskeleton system 100 with a single lever (or other suitable mechanism) that allows the user to drop a torso or back-mounted power pack and keep one or more actuator units 110 affixed to the body of the user 101. For example, FIGS. 9, 10, 11a, 11b and 12 illustrate example embodiments of a quick-doff mechanism for a back-mounted exoskeleton device 510 of a backpack 155 that comprises a first and second portion 160, 165. FIG. 9 illustrates the first portion 160 of the backpack 155 that comprises a back piece 910 and a chest piece 920, which are coupled by shoulder straps 930 and side straps 940. The first portion 160 comprises a plurality of clips 950 disposed at the straps 930, 940 with the first portion 160 of the backpack 155 having female clip portions 952.

Figure 10:
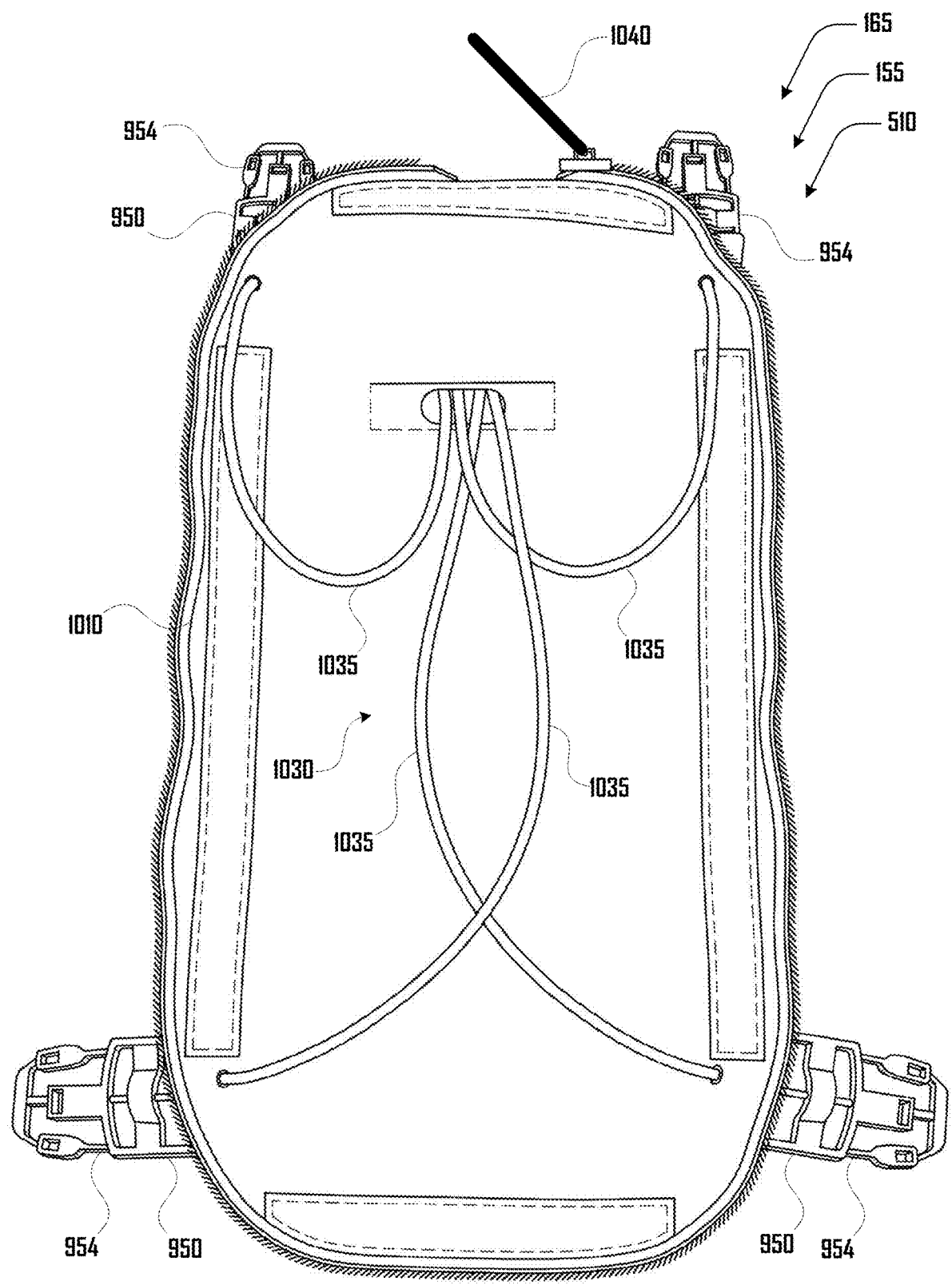
FIG. 10 illustrates a second portion of a backpack that comprises a quick-doff assembly that includes a plurality of actuation lines that extend to a plurality of respective clips.

FIG. 10 illustrates a second portion 165 of the backpack 155, which comprises an exoskeleton device 510 disposed in a pack body 1010. The second portion 165 further comprises a quick-doff assembly 1030, which includes a plurality of actuation lines 1035 that extend to a plurality of respective clips 950, which in this example are male clip portions 954. The respective clips 950 can be configured to be actuated in unison via the actuation lines 1035, which can be collectively actuated in unison by pulling a quick-doff release strap 1040 (e.g., via a junction or trigger that operably connects all of the actuation lines 1035 to the quick-doff release strap 1040).

For example, the actuation lines 1035 in various embodiments can comprise an internal cable surrounded by a sheath, with the internal cable being configured to move within the sheath. The internal cables can be coupled to a junction or trigger that operably connects all of the actuation lines 1035 to the quick-doff release strap 1040 and the respective internal cables can be operably coupled to the male clip portions 954 such that pulling the internal cables actuates the male clip portions 954 as discussed herein. In various embodiments, the actuation lines 1035 can be disposed within an internal cavity of the pack body 1010 with the quick-doff release strap 1040 extending through the pack body 1010 where it can be actuated by a user 101. The quick-doff release strap 1040 can be disposed in various suitable locations, such as on the top, side, bottom of the pack body 1010.

Some embodiments can consist of or consist essentially of only a single quick-doff release that disengages a plurality of clips 950 or other couplings, whereas some embodiments can include a plurality of quick-doff releases that disengage the plurality of clips 950 or other couplings. For example, in some embodiments a plurality of quick-doff release straps 1040 can extend from a junction or trigger of a quick doff assembly 1030.

Figure 11A:
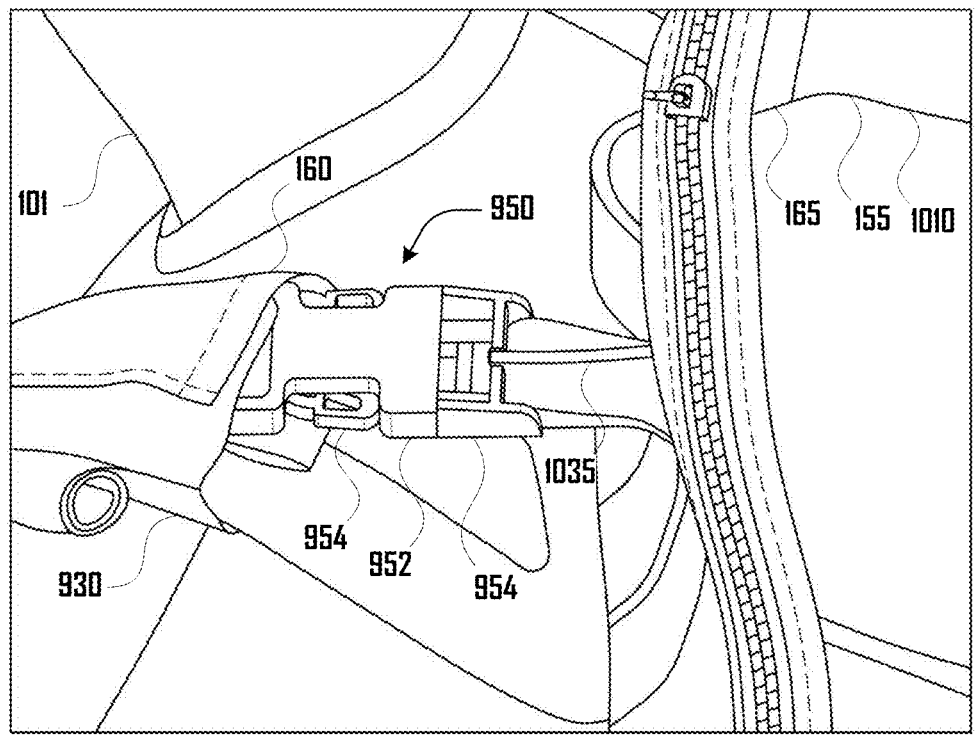
FIGS. 11a and 11b illustrate close-up views of clips on shoulder and side straps of a backpack with the female and male clip portions being coupled.
Figure 11B:
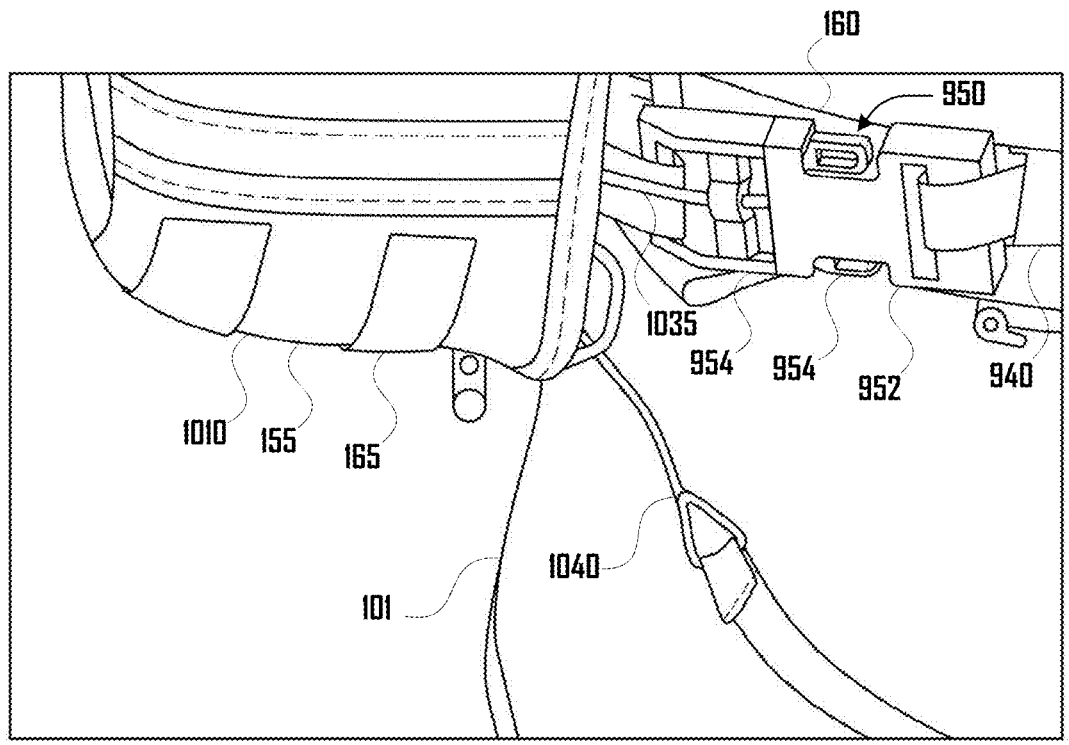

Turning to FIGS. 11a and 11b, close-up views of clips 950 on shoulder and side straps 930, 940 are shown with the female and male clip portions 952, 954 being coupled. In such an example, the first and second portions 160, 165 of the backpack 155 can be coupled together via the plurality of clips 950 by coupling respective female and male clip portions 952, 954 together. In various embodiments, the first and second portions 160, 165 of the backpack 155 can be separated (while being worn by the user 101 or not) by the user physically actuating wings of the male clip portions 954 by hand to disengage the mail clip portions 954 from the female clip portions 952.

Figure 12:
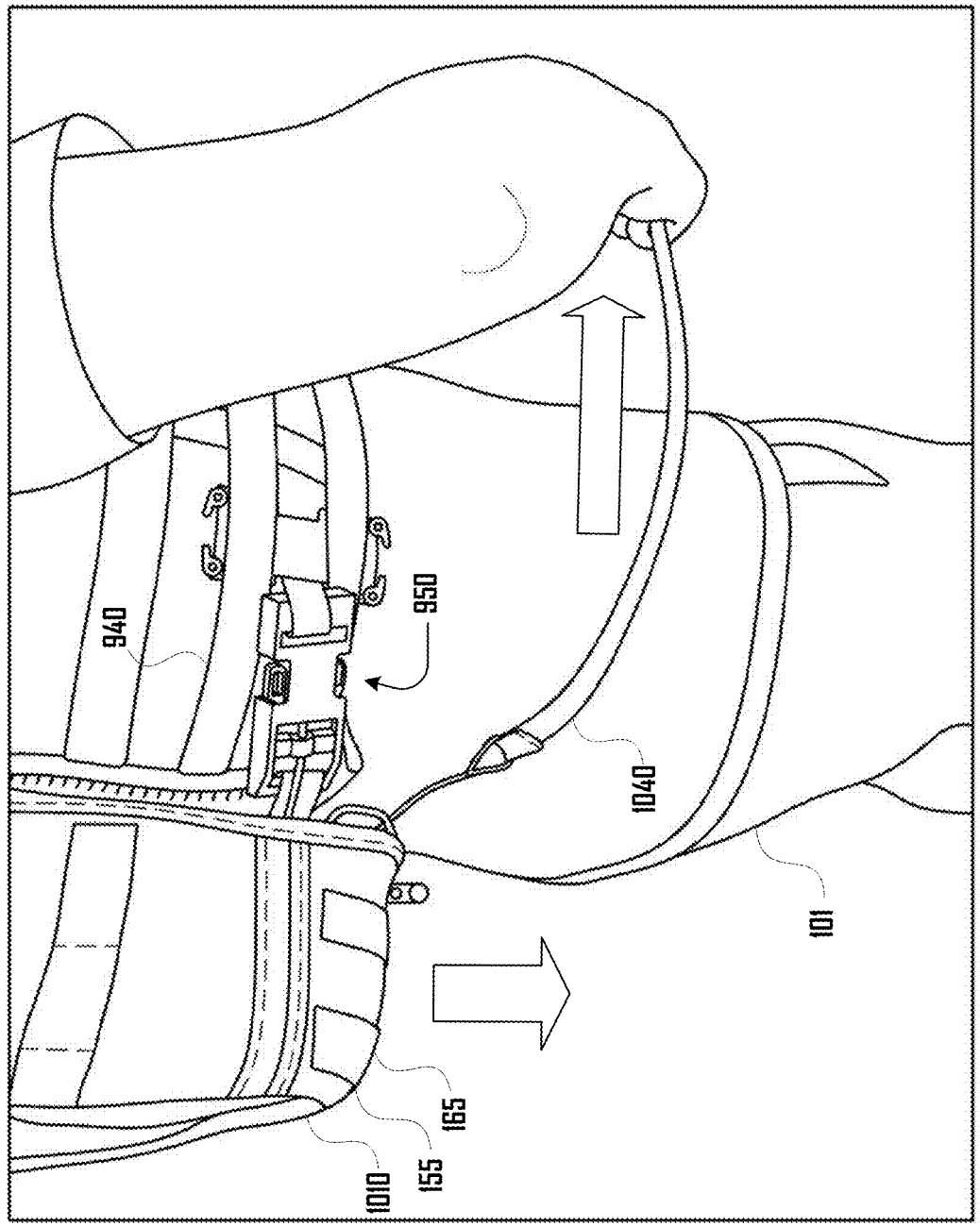
FIG. 12 illustrates a user disengaging a plurality of clips at once by pulling on a quick-doff release strap that actuates the male clip portions in unison via respective actuation lines.

Alternatively, or additionally, the user 101 can disengage the plurality of clips 950 at once by pulling on the quick-doff release strap 1040 as shown in FIG. 12, which actuates the male clip portions 954 in unison via the respective actuation lines 935 (e.g., by actuating wings of the male clip portions 954 similar to how a user would manually pinch such wings to disengage the clip 950). Such actuation of the male clip portions 954 in unison can cause all of the clips 950 to disengage in unison and/or simultaneously, which can allow the first portion 160 of the backpack 155 to disengage from the second portion 165 of the backpack 155. In various embodiments, weight of the first portion 160 can assist with the male clip portions 954 sliding out of the female clip portions 952 when the male clip portions 954 are actuated.

Additionally, where in user is wearing the backpack 155, pulling the quick-doff release strap 1040 can cause the first portion 160 of the backpack 155 to fall off the user 101 as shown in FIG. 12, which can be desirable for quick removal of the first portion of the 160 of the backpack 155, having the exoskeleton device 510, from the user 101. In various embodiments, the second portion 165 of the backpack 155 can remain coupled to the user when the first portion 160 disengages from the second portion 165.

As discussed herein, a backpack 155 comprising an exoskeleton device 510 can have one or more cables 145 extending therefrom, which can provide electrical power, fluid and/or communication to one or more actuation units 110 coupled to the user 101. Where the backpack 155 or portion thereof (e.g., first portion 160 comprising the exoskeleton device 510) are removed from the user 101 via a quick-doff mechanism, cable connectors 600 or other portions of the cables 145 can also be disengaged to allow the backpack 155 or portion thereof to be fully free from the user 101. For example, where a first portion 160 comprising the exoskeleton device 510 falls from the user 101 after actuation of a quick-doff mechanism, in various embodiments the first portion 160 would remain associated with the user 101 based on a connection between one or more cables 145 coupled to the first portion 160 extending to one or more respective actuation units 110 coupled to the user 101.

In some embodiments, cable connectors 600 can be configured to disengage under sufficient force (e.g., separation of a magnetic coupling as discussed herein). Accordingly, in some embodiments, one or more cable connectors 600 can be configured to disengage at least at a force corresponding to the first portion 160 falling from the user 101 or after falling to the ground. Such a configuration of the cable connectors 600 can allow for automatic full disconnection of the first portion 160 of the backpack 155 from the user after the first portion 160 of the backpack 155 is disengaged from the torso or back of the user 101 via a quick-doff mechanism.

Various embodiments can include the examples listed above or combinations thereof. A variety of systems and methods for quick doff mechanisms are within the scope and spirit of the present disclosure, so the examples herein should not be construed to be limiting. These can include but are not limited to a cable mechanism that is woven through straps that can be removed; a series of buckles that all engage on a single lever; a cable assembly that when pulled exerts force on the system in a variety of locations; an electrical button or switch that actuates a mechatronic or mechanical release; and the like. In various embodiments, such a quick doff mechanism can include actuation of clips 950 or other release elements associated with couplers 150 of one or more actuation units 110, which can allow for quick-doff of the one or more actuation units 110 individually, in unison with each other, in unison with a backpack 155 having an exoskeleton device, and the like.

In some embodiments where the exoskeleton system 100 is integrated into a ship 850, a quick release between the exoskeleton system 100 and the ship 850 can be useful to the user (e.g., a release from an overhead track and operable connections such as power, fluid, communications, and the like). In one embodiment, if the robot is permanently mounted to the ship 850, there can be an eject button or rip cord, which releases the user restraints allowing the user to easily walk away and leave the exoskeleton system 100 behind. Such a quick release button can serve as a one-touch emergency release system (e.g., via a unified quick release mechanism that releases the user from the leg actuation unit(s) 110 and exoskeleton device 510 simultaneously), which can be useful in scenarios in which the ship 850 is to be evacuated (e.g., due to damage, sinking, flooding or fire within the ship 850). In other embodiments, the exoskeleton device is integrated into a ship 850, where integration can be temporary or permanent. One example embodiment of a temporary integration is when the exoskeleton device 510 is carried in a backpack 155, and the backpack 155 is then not worn by the user but is attached to the ship in various suitable ways, which can include mechanical and magnetic attachment methods, such as hung from the back of a seat, strapped to a piece of the boat, attached by Velcro to the deck, etc. In another example embodiment, the exoskeleton device 510 is both worn by the user in a backpack 155 while the backpack 155 is attached to the ship 850. One example embodiment of a permanent integration is an exoskeleton device 510 enclosed in a housing where the housing is then permanently mounted to the ship.

In scenarios where the user 101 is or may be in a pool or body of water, the exoskeleton system 100, in some embodiments, may serve as a flotation device. In one embodiment, the exoskeleton device 510 (e.g., a backpack 155) and actuation unit(s) 110 can have chambers that may be filled with air to provide buoyancy. In some embodiments, such chambers can be inflatable bags, bellows, cavities, or the like. The amount of air filling the chambers in some examples can be controlled automatically by the exoskeleton system 100 and/or by the user 101 through an interface (e.g., via an external device 810, user interface 515, or the like).

This control option in some examples can allow the exoskeleton system 100 and/or user to configure the buoyancy of each component (e.g., the exoskeleton device 510, backpack 155, actuator unit(s) 110, and the like), which can control the posture of the user 101 wearing the exoskeleton system 100 in the water. For example, the user 101 can float more vertically in the water, similar to standing, by increasing the buoyancy in the exoskeleton device 510 or backpack 155 worn around their back and not adding buoyancy or removing buoyancy from actuator unit(s) 110 worn on their leg(s). The option to fill such chambers can allow the user 101 and/or exoskeleton system 100 to selectively reduce buoyancy and go under water in some examples. As discussed herein, an air supply in some examples may serve as a breathing supply for the user 101 and the user 101 may use such an air supply for underwater movement.

In some embodiments, such chambers of the actuator unit(s) 110 can be selectively inflated and/or deflated to generate movement or assist with movement of the user 101, which may be in addition to or as an alternative to inflation of the actuator(s) 130. For example, inflating a buoyancy chamber in an actuator unit 110 can assist with or cause the leg of a user 101 to rise as part of a walking motion. In another example, inflating or deflating such buoyancy chambers can be used to offset air being introduced or removed from the actuator(s) 130. For example, it may be desirable to keep a neutral or constant buoyancy of the actuator unit(s) 110 during operation underwater. Introduction of air into an actuator 130 can increase buoyancy of the actuator unit(s) 110, and to counteract this increase in buoyancy, air can be released from a buoyancy chamber of the actuator unit 110 so that net buoyancy of the actuator unit 110 remains neutral or constant, even as air is introduced to and removed from the inflatable actuator 130. In some embodiments, the same amount of air can be removed from the buoyancy chamber as is introduced to the actuator 130.

In various embodiments, an amount of air introduced to or removed from a buoyancy chamber and/or actuator 130 can be based on depth within a body of water and depth data (e.g., obtained from a depth sensor) can be used to determine or change the amount of air introduced to or removed from a buoyancy chamber and/or actuator 130. Accordingly, in various embodiments, water and pressure sensors may be included in the exoskeleton system 100 and can allow the exoskeleton system 100 to determine the user is in water and their depth. When the exoskeleton system 100 determines the user 101 is in deep water, in some examples the exoskeleton system 100 may send a signal to increase the buoyancy of the exoskeleton device 510, backpack 155 or actuator unit(s) 110 to protect the user. Various other suitable methods, not mentioned above, for creating buoyancy in the exoskeleton system 100 can be used.

The various functions, actions, interactions and procedures taken by the exoskeleton system 100 can be provided by specific software stored in the memory 512 executed by the processor 511. The specific software for a given exoskeleton system 100 can be chosen in some examples based on the expected use of the exoskeleton system 100 by the user 101 and the types of hardware designs of the exoskeleton system 100 mentioned above.

The software used by the exoskeleton system 100 can be programmed to control and assist with the different maneuvers expected to be done by the user 101 wearing the exoskeleton system 100. In one embodiment, the software allows for tunable shock absorption. In such an embodiment, the user 101 can vary the power generated by the actuator(s) 130 to reduce or increase the amount of help received when jumping or landing from a fall. This can be useful for conserving power and/or for when a user 101 may be weaker at the end of the day and need more assistance in handling shocks. For example, in some embodiments, sensors (e.g., pressure sensors, inertia sensors, or the like) can be used to determine that both user's feet are off the ground, that the user is in free fall, or the like.

In another embodiment, the exoskeleton system 100 can provide shock absorption, assistance, or some combination thereof in response to impacts such as those received when riding in any vehicle. In one embodiment, the exoskeleton system 100 can support a user 101 when riding in a boat or other watercraft 850, to mitigate the shocks experienced by a user 101 when traversing across the water, from turbulence on the water, from the watercraft 850 being impacted by any waves, from an environmental disturbance such as a storm or high winds, the watercraft 850 colliding with an object such as another watercraft, a sand bar, coral reef, shipwreck, or running aground, or any combination thereof that causes the watercraft 850 to move relative to the user 101. This relative movement between the watercraft 850 and the user 101 may cause the user to experience an impact, such as to the leg 102, especially at the knee 103, or any other body part such as but not limited to the lower back, spine, neck, and head. One example of impact is the acceleration experienced at any part of the body where the acceleration of a point on the body relative to the watercraft exceeds that of Earth's gravity, regardless of direction. In many embodiments, the exoskeleton system 100 can provide shock absorption, assistance, or some combination thereof to protect the user 101 from these watercraft 850 impacts. In some such embodiments, the support of the user 101 during impact can be provided by regulating the fluid pressure within the actuation unit 110. In some example embodiments, this fluid pressure is commanded by the exoskeleton device 510 to remain constant, variable, or any combination thereof. In further embodiments, command of fluid pressure is related to the joint angle.

In one embodiment, the exoskeleton system 100 enters a configuration where the exoskeleton device 510 commands a constant fluid pressure within the actuation unit 110, wherein maintaining the fluid pressure regardless of the knee angle provides assistive torque at the knee 103 of the user 101 during impacts where in response to an impact the user 101 may bend at the knee 103 suddenly in predominantly knee flexion. In one embodiment, the exoskeleton system 100 enters a configuration where the exoskeleton device 510 commands a variable fluid pressure within the actuation unit 110. In one example configuration, this variable fluid pressure is commanded to be lower when the leg 102 is closer to full extension than at knee flexion. In another example configuration, this variable fluid pressure is commanded to be at one state and then commanded to be at a different state once a threshold is passed. In one example embodiment of this threshold, the threshold is defined by a leg 102 configuration, such as that defined by a user's 100 knee angle. In one example embodiment, the exoskeleton system 100 provides a progressive level of support to the leg 102, such that the fluid pressure commanded in the actuation unit 110 is initially close to atmospheric, then ramps up in a predetermined manner such as linearly, proportionally, exponentially, or any combination thereof, to a target pressure at a target threshold, such as that determined by a specific or range of knee joint angles, at which point the fluid pressure is commanded to be constant, variable, or some combination thereof, where the fluid pressure commanded may or may not be related to other parameters, such as the knee joint angle.

Maneuvers that may be done by the user 101 include, but are not limited to, squats, sitting posture, hanging, pulling and the like. For example, the exoskeleton system of various embodiments can be configured to help with getting up, help with holding, allow a user to hold a pose or put them in a pose, to accept impacts, to have better back posture, to reduce fatigue, assist in loading/unloading of a vehicle, assist in hanging onto vehicle (e.g., elbow, glove exoskeleton) either in or out of the vehicle, assist in pulling a person or the user into a vehicle, or the like.

In one embodiment, where one or more actuation units 110 is around the user's knees, the software can be programmed to assist the user 101 in squatting, by powering the actuator 130 when the user 101 is lowering themselves with their knees to a squatting position, holding the one or more actuation units 110 in a squatting position and powering the actuator 130 when the user 101 is pushing off from the squatting position to a standing position. In such an embodiment, the one or more actuation units 110 may have sensors to sense the user's leg motion to move to a squatting position and automatically assist the user to a squatting position. Alternatively, in some examples the user 101 may select a squatting function using an external device 810 or user interface 515 to notify the exoskeleton system 100 to assist in moving to a squatting position. In another embodiment, where the one or more actuation units 110 is worn around the elbow, the software can be programmed to assist the user in pulling or lifting, by powering and actuator 130 to contract the elbow, holding the contracted position and extending the elbow to release the pull or lift. As mentioned above, this function may be done automatically by the one or more actuation units 110 and/or initiated by the user 101 through an external device 810, user interface 515, button, or the like.

For example, a method of operating an exoskeleton system 100 can include the exoskeleton system 100 determining to assist a user 101 with a user action (e.g., pulling, lifting, squatting). For example, determining to assist the user 101 with the user action can be based at least in part on sensor data from the exoskeleton system 100, intent recognition based on the sensor data from the exoskeleton system 100 and indication by the user for a specific action or intent to perform an action (e.g., provided by the external device 810, user interface 515, button, or the like). The exoskeleton system 100 can then actuate the actuator unit(s) 110 to assist the user in the determined action.

The software may be programmed to assist during spontaneous actions. For example, the user 101 may jump or fall resulting in a period of free fall, in which both feet are off the ground. In one embodiment, when one or more actuation units 110 are on the user's legs, sensors on the exoskeleton system 100 can detect whether or not the user's feet are on the ground, and if a free-fall scenario is detected, the exoskeleton system 100 can respond by adjusting the assistance level of the actuator(s) 130 to prepare for landing on the user's legs. In another embodiment, when one or more actuation units 110 are on the user's arms, sensors of the exoskeleton system 100 can detect a sudden change in momentum and/or elevation, and the exoskeleton system 100 can respond by adjusting the actuator(s) 130 on the arms to prepare the user to break their fall with their arms.

For example, a method of operating an exoskeleton system 100 can include the exoskeleton system 100 determining that the exoskeleton system 100 is in free fall or in a jump and determining to assist the user with a landing associated with the free fall or jump. For example, determining to assist the user 101 with the user action can be based at least in part on sensor data from the exoskeleton system 100, intent recognition based on the sensor data from the exoskeleton system 100 and indication by the user for a specific action or intent to perform an action (e.g., provided by the external device 810, user interface 515, button, or the like). The exoskeleton system 100 can then actuate the actuator unit(s) 110 to assist the user with landing the free fall or jump.

As mentioned above, in some embodiments the mobile robot system may be integrated with an air, land or water-based vehicle (e.g., a ship 850 as shown in FIG. 8) and receive or send data. The exoskeleton system 100, when near another exoskeleton system 100, may exchange data with the other nearby exoskeleton system 100 in various examples. The data received from the vehicle can include, but is not limited to, mechanical, electrical or inertial information. In one embodiment, the exoskeleton system 100 receives information from the vehicle and prepares and adjusts the actuator(s) 130 of the leg actuator unit(s) 110 to help the user 101 move through the vehicle. Various embodiments can use the options listed above or combinations and variants thereof, but are in no way limited to the explicitly stated combinations of methods and items.

The exoskeleton system 100 may be used as a monitor in some embodiments to track different metrics in real time. This may be done with the sensors 513 of the exoskeleton device 510 or other sensors discussed above such as inertial sensors (e.g., accelerometer, gyro, etc.) or other sensors (e.g., pressure, strain, anemometer, etc.), which may be at another portion of the exoskeleton system 100 or external to the exoskeleton system 100. In one embodiment, the exoskeleton system 100 has a pedometer and a pressure sensor, which measure the number of steps a person takes in the exoskeleton system 100 and the pressure caused by each step. The pressure from each impact can be affected by the speed and acceleration of the vehicle and outside forces on a vehicle such as waves on a boat or turbulence on a plane or bumps in terrain. In such an embodiment, the exoskeleton system 100 can use the information from such sensors to calculate the total force experienced by the user, determine the main sources of impact and make suggestions for relief. The sensors can also be located on different parts of the user's body, so that the exoskeleton system 100 can determine the specific body parts of the user, such as the head, neck, spine, etc., that are experiencing impact or strain. The sensors may also be used to calculate metrics of the vehicle, such as the speed or impact force from outside, to calculate the impact on the user. In various embodiments, such sensors can be used to determine a direction of impacts experienced by the user 101 (e.g., side impact to body from side of a boat, ship 850, etc.).

For example, a method of actuating and/or configuring an exoskeleton system 100 can comprise obtaining orientation and/or position data, which can include orientation and/or position data of the exoskeleton system 100 (e.g., from sensors of the exoskeleton system 100) and orientation and/or position data of a location of the exoskeleton system 100 (e.g., sensors from a vehicle such as a ship 850). The method can further include determining a current orientation and/or position of the user 101 and/or exoskeleton system 100 and/or determining an anticipated future orientation and/or position of the user 101 and/or exoskeleton system 100; determining how to support or assist the user based on the determined current orientation and/or position of the user 101 and/or exoskeleton system 100 and/or anticipated future orientation and/or position of the user 101 and/or exoskeleton system 100; and actuating actuation units 110 based at least in part on the determined support or assist. Such embodiments using data from the exoskeleton system 100 and a moving location of the exoskeleton system 100 (e.g., a ship 850, land vehicle, aircraft, or the like) can be desirable to assist a user 101 with handling movement of the location along with supporting their desired actions such as performing tasks in or on the moving location.

In another embodiment, the user 101 and sensors can be on a ship 850 and the exoskeleton system 100 can be used to calculate the likelihood of the user 101 falling overboard the ship 850. In such an embodiment, the sensors can determine where the user 101 is on the ship 850, as well as the speed of the boat, size of waves impacting the boat, the current stance and posture of the user 101, and the exoskeleton system 100 can determine if the user 101 is likely to fall overboard. If it is determined the user may fall overboard, precautions and/or warnings can be presented to the user 101 and other people in the vicinity of the user 101, and the actuator unit(s) 110 being worn by the user 101 can be controlled to prevent falling. Various embodiments can use the options listed above or combinations and variants thereof, but are in no way limited to the explicitly stated combinations of methods and items.

For example, a method of operating an exoskeleton system 100 to prevent a user 101 from or assist a user falling overboard can include obtaining data from the exoskeleton system 100 and/or another device (e.g., a ship 850, external device 810, exoskeleton server 830, admin device 840, or the like). For example, such data can include position and/or orientation data of the exoskeleton system 100 and/or a moving location where the exoskeleton system 100 is located (e.g., a ship 850, water vehicle, land vehicle, aircraft, or the like). The method can further include determining whether or not the user 101 is in danger of, is about to or is in the process of, falling overboard from a location where the exoskeleton system 100 is located (e.g., a ship 850, boat, truck, or the like). Where a determination is made that the user 101 is in danger of, is about to or is in the process of, falling overboard from a location where the exoskeleton system 100 is located, a determination can be made (e.g., by the exoskeleton system 100, a computing device of a ship 850, an external device 810, an exoskeleton server 830, an admin device 840, or the like) regarding how to remediate the determined state of the user 101; and such a remediation can be performed by the exoskeleton system 100 and/or other systems such as a ship 850, an external device 810, an exoskeleton server 830, an admin device 840, or the like).

For example, such remediation can include generating an alert by the exoskeleton system 100 (e.g., audio, visual or haptic) for the user 101 or other persons or devices around the user 101; generating an alert at the location where the exoskeleton system 100 is present; actuating the exoskeleton system 100 to prevent falling overboard; actuating the exoskeleton system 100 to prepare for falling into water or on the ground; actuating the exoskeleton system 100 to assist the user 101 during falling into water or landing on the ground; actuating the exoskeleton system 100 to assist the user 101 after falling into water or landing on the ground; inflating one or more buoyancy cavities of the exoskeleton system 100; alerting by the exoskeleton system 100 (e.g., audio, visual or haptic) so the user can be found by others after falling into water or landing on the ground; sending an alert to emergency services, and the like.

Additionally, forces, orientation, position, velocity, acceleration and the like measured by a ship 850 and shared with the exoskeleton system 100 and/or network 800 may be used by the exoskeleton system 100 and/or network 800 in some examples, in addition to sensor data from the exoskeleton system 100, to infer that the user 101 may have exited or fallen from the ship 850. For example, a method of inferring that a user has exited a ship 850 can comprise obtaining sensor data from the ship 850 and obtaining sensor data from the exoskeleton system 100, with such sensor data corresponding to respective forces, orientation, position, velocity, acceleration, and the like, of the ship 850 and exoskeleton system 100.

The method can further include determining a correspondence between the sensor data of the ship 850 and exoskeleton system 100, and if a sufficient correspondence at a threshold level is determined, then a determination can be made that the user 101 and exoskeleton system 100 are present on the ship 850. However, if there is not sufficient correspondence at a threshold level, then a determination can be made that the user 101 and exoskeleton system 100 are not present on the ship 850 and/or that the user has exited or fallen from the ship 850.

For example, a user 101 wearing an exoskeleton system 100 can be walking towards an approaching ship 850 and a determination can be made that the user is not riding on the ship 850 based on the different forces, orientation, position, velocity, acceleration being experienced by the exoskeleton system 100 and ship 850. The user 101 can enter the ship 850, which can start traveling to a destination and a determination can be made that the user 101 is present on the ship 850 based on similarity or correspondence of forces, orientation, position, velocity, acceleration being experienced by the exoskeleton system 100 and ship 850. If the user 101 wearing the exoskeleton system 100 falls off the ship 850 during transit, a determination can be made that the user 101 is no longer on the ship 850 based on the different forces, orientation, position, velocity, acceleration being experienced by the exoskeleton system 100 and ship 850.

There are many different types of feedback the exoskeleton system 100 may use when it determines any issues or problems using various sensors. In one embodiment, there can be preset limits to the amount of impact or fatigue that is allowed for the user 101 or for the exoskeleton system 100 and when the calculated impact or fatigue exceeds this limit, the user 101 can be notified on an external device 810, user interface 515, or the like. In another embodiment, when such a preset limit is reached, the exoskeleton system 100 can provide auditory, visual or haptic feedback (e.g., begins to vibrate). The vibration level can be set from low to high. The high level can be used to wake up a sleeping or unconscious user 101, which can be desirable in scenarios in which the user 101 has fallen overboard or similar scenarios. Such impact or fatigue limits may be adjusted or set based on the body part; for example, the user's head or neck may have a lower tolerance for impacts than their knees.

For example, a method of generating an impact or fatigue alert can comprise obtaining data regarding the operation of an exoskeleton system 100 including a single operation event (e.g., a single fall, impact, or the like) or operation over a period of time (e.g., number of steps taken, time active during a given operation session, number of impacts on a given joint or body part of the user 101 during a given operation session, total force experienced by a given joint or body part of the user 101 during a given operation session, height of one or more falls, range of motion experienced by the user 101 and or exoskeleton system 100 that may indicate injury to the user, and the like. The method can include determining whether such data meets criteria for impact or fatigue being above a threshold amount for the user 101 and/or exoskeleton system 100 generally and/or for specific joints or body parts of the user 101 and/or exoskeleton system 100. Where a determination is made that such data meets criteria for impact or fatigue being above a threshold amount, a determination can be made (e.g., by the exoskeleton system 100, a computing device of a ship 850, an external device 810, an exoskeleton server 830, an admin device 840, or the like) for remediation of such impact or fatigue.

Such remediation can include providing an alert by or to the exoskeleton system 100, a computing device of a ship 850, an external device 810, an exoskeleton server 830, an admin device 840, emergency services or the like. For example, such an alert can include a suggestion to the user 101 to take a break or to cease operation of the exoskeleton system 100; an alert to the user 101 of potential damage, injury or fatigue of the user 101; an alert to other parties that the user 101 may be injured or fatigued; an indication of an amount of time that the user 101 may still safely operate the exoskeleton system 100; an indication of an additional amount of impact that the user 101 can safely endure before being required to take a break or to cease operation of the exoskeleton system 100; and the like. Such remediation can also include providing additional support or assistance to the user 101 generally or to one or more specific joints of the user 101; shutting down or partially shutting down or disabling a portion of the exoskeleton system 100; stiffening one or more joints of the exoskeleton system 100 to act as a splint for a potentially injured joint of the user 101, and the like.

The exoskeleton system 100 in some embodiments may also have a feedback feature that is manually turned on by the user. In one embodiment, this feedback may be lights, noise or haptics that are turned on by a button. This type of feedback can be useful if the user 101 is lost at sea or in the wilderness and this can help searchers locate them. In another embodiment, this feedback may be activated by another person remotely (e.g., by a device such as a phone). This can be useful for a search party searching for the user 101 when the user 101 is unconscious or unable to activate the feedback themselves. In some embodiments the system may have a dark feature that quickly turns off all lights and noise on the exoskeleton system 100 so that other parties cannot easily locate the user 101 or if the user does not want to disturb others nearby. For example, such a feature can be desirable for tactical operations. Various embodiments can use the options listed above or combinations and variants thereof, but are in no way limited to the explicitly stated combinations of methods and items.

Figure 13A:
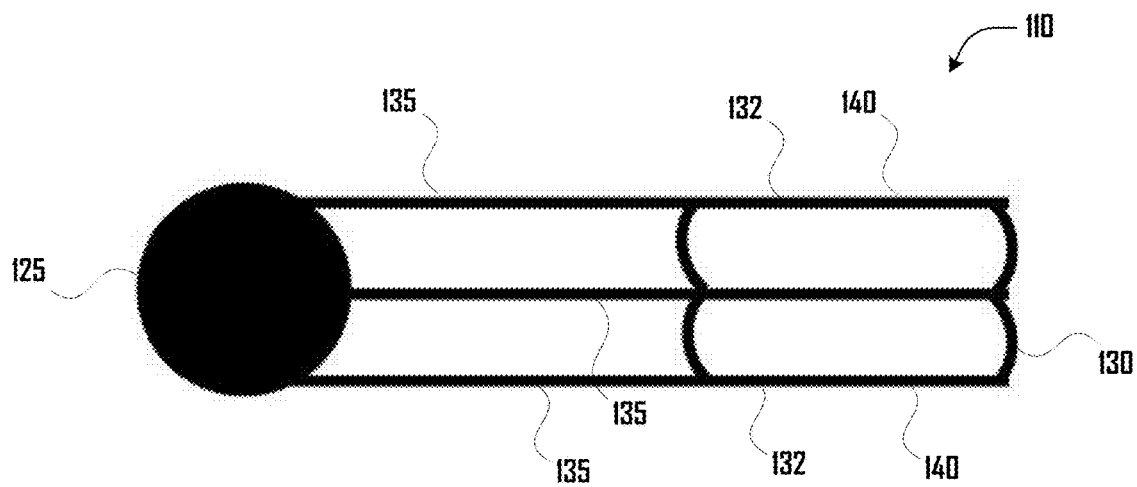
FIG. 13a illustrates a side view of a pneumatic actuator in a compressed configuration in accordance with one embodiment.
Figure 13B:
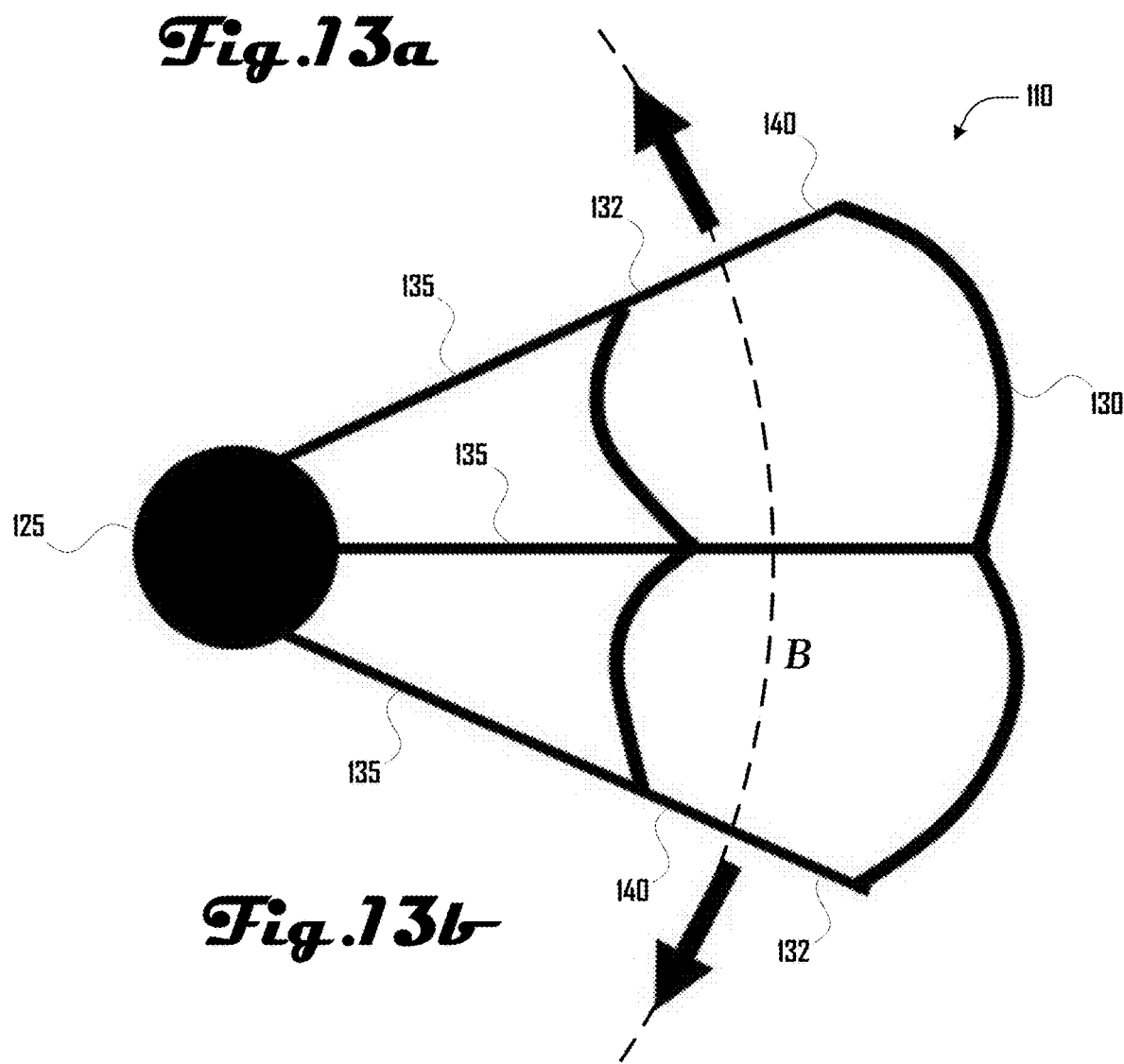
FIG. 13b illustrates a side view of the pneumatic actuator of FIG. 13a in an expanded configuration.
Figure 14A:
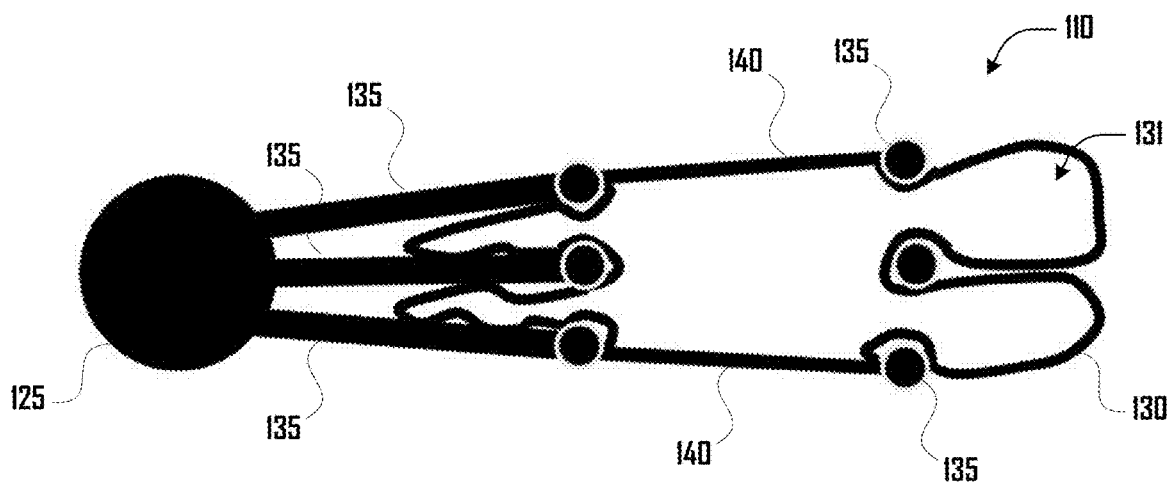
FIG. 14a illustrates a cross-sectional side view of a pneumatic actuator in a compressed configuration in accordance with another embodiment.
Figure 14B:
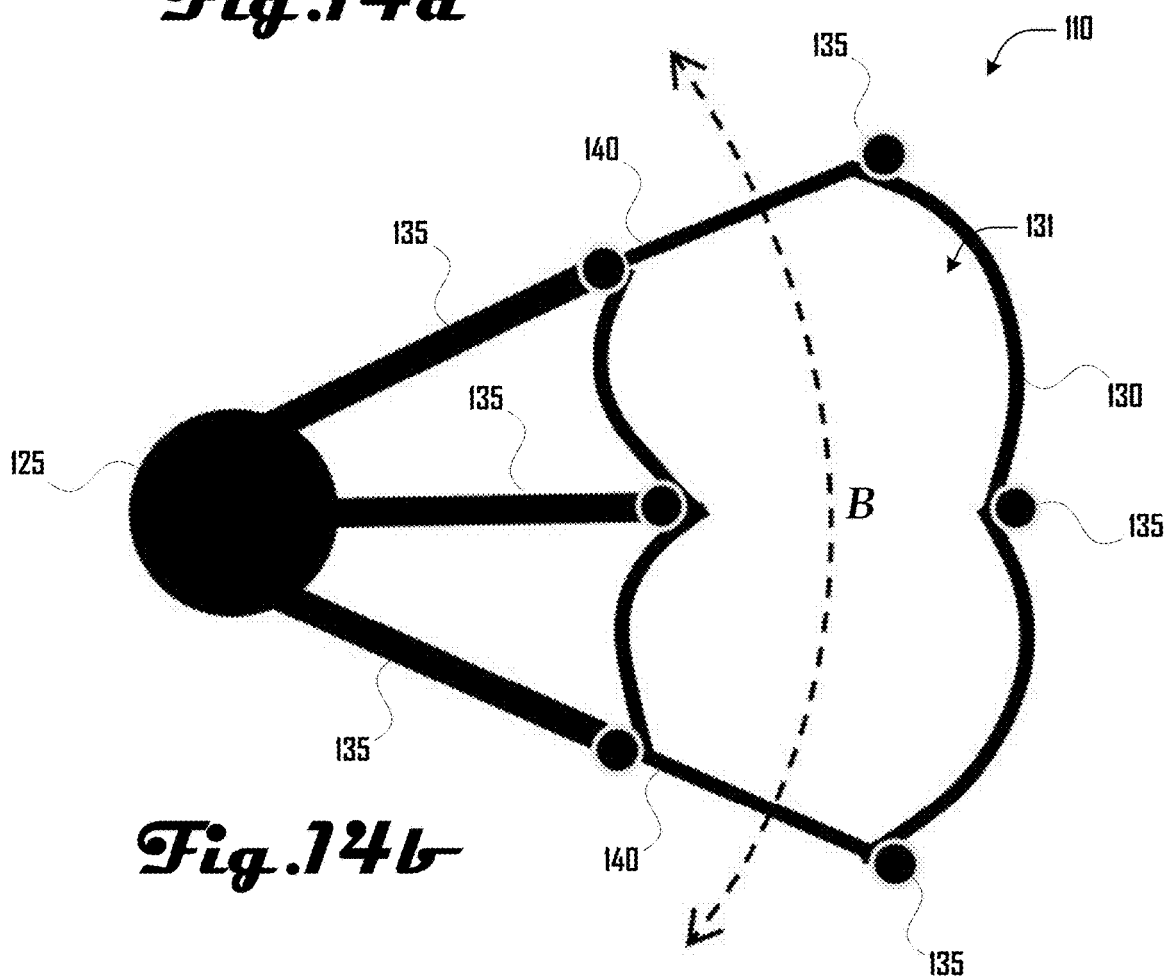
FIG. 14b illustrates a cross-sectional side view of the pneumatic actuator of FIG. 14a in an expanded configuration.

Turning to FIGS. 13*a*, 13*b*, 14*a* and 14*b*, examples of a leg actuator unit 110 can include the joint 125, bellows actuator 130, constraint ribs 135, and base plates 140. More specifically, FIG. 13*a* illustrates a side view of a leg actuator unit 110 in a compressed configuration and FIG. 13*b* illustrates a side view of the leg actuator unit 110 of FIG. 13*a* in an expanded configuration. FIG. 14*a* illustrates a cross-sectional side view of a leg actuator unit 110 in a compressed configuration and FIG. 14*b* illustrates a cross-sectional side view of the leg actuator unit 110 of FIG. 14*a* in an expanded configuration.

As shown in FIGS. 13*a*, 13*b*, 14*a* and 14*b*, the joint 125 can have a plurality of constraint ribs 135 extending from and coupled to the joint 125, which surround or abut a portion of the bellows actuator 130. For example, in some embodiments, constraint ribs 135 can abut the ends 132 of the bellows actuator 130 and can define some or all of the base plates 140 that the ends 132 of the bellows actuator 130 can push against. However, in some examples, the base plates 140 can be separate and/or different elements than the constraint ribs 135 (e.g., as shown in FIG. 1). Additionally, one or more constraint ribs 135 can be disposed between ends 132 of the bellows actuator 130. For example, FIGS.

13*a*, 13*b*, 14*a* and 14*b* illustrate one constraint rib 135 disposed between ends 132 of the bellows actuator 130; however, further embodiments can include any suitable number of constraint ribs 135 disposed between ends of the bellows actuator 130, including 1, 2, 3, 4, 5, 6, 7, 8, 9, 10, 15, 20, 25, 30, 50, 100 and the like. In some embodiments, constraint ribs can be absent.

As shown in cross sections of FIGS. 14*a* and 14*b*, the bellows actuator 130 can define a cavity 131 that can be filled with fluid (e.g., air), to expand the bellows actuator 130, which can cause the bellows to elongate along axis B as shown in FIGS. 13*b* and 14*b*. For example, increasing a pressure and/or volume of fluid in the bellows actuator 130 shown in FIG. 13*a* can cause the bellows actuator 130 to expand to the configuration shown in FIG. 13*b*. Similarly, increasing a pressure and/or volume of fluid in the bellows actuator 130 shown in FIG. 14*a* can cause the bellows actuator 130 to expand to the configuration shown in FIG. 14*b*. For clarity, the use of the term "bellows" is to describe a component in the described actuator unit 110 and is not intended to limit the geometry of the component. The bellows actuator 130 can be constructed with a variety of geometries including but not limited to a constant cylindrical tube, a cylinder of varying cross-sectional area, a 3-D woven geometry that inflates to a defined arc shape, and the like. The term 'bellows' should not be construed to necessarily include a structure having convolutions.

Alternatively, decreasing a pressure and/or volume of fluid in the bellows actuator 130 shown in FIG. 13*b* can cause the bellows actuator 130 to contract to the configuration shown in FIG. 13*a*. Similarly, decreasing a pressure and/or volume of fluid in the bellows actuator 130 shown in FIG. 14*b* can cause the bellows actuator 130 to contract to the configuration shown in FIG. 14*a*. Such increasing or decreasing of a pressure or volume of fluid in the bellows actuator 130 can be performed by pneumatic system 520 and cables 145 of the exoskeleton system 100, which can be controlled by the exoskeleton device 510 (see FIG. 5).

In one preferred embodiment, the bellows actuator 130 can be inflated with air; however, in further embodiments, any suitable fluid can be used to inflate the bellows actuator 130. For example, gasses including oxygen, helium, nitrogen, and/or argon, or the like can be used to inflate and/or deflate the bellows actuator 130. In further embodiments, a liquid such as water, an oil, or the like can be used to inflate the bellows actuator 130. Additionally, while some examples discussed herein relate to introducing and removing fluid from a bellows actuator 130 to change the pressure within the bellows actuator 130, further examples can include heating and/or cooling a fluid to modify a pressure within the bellows actuator 130.

As shown in FIGS. 13*a*, 13*b*, 14*a* and 14*b*, the constraint ribs 135 can support and constrain the bellows actuator 130. For example, inflating the bellows actuator 130 causes the bellows actuator 130 to expand along a length of the bellows actuator 130 and also causes the bellows actuator 130 to expand radially. The constraint ribs 135 can constrain radial expansion of a portion of the bellows actuator 130. Additionally, as discussed herein, the bellows actuator 130 can comprise a material that is flexible in one or more directions and the constraint ribs 135 can control the direction of linear expansion of the bellows actuator 130. For example, in some embodiments, without constraint ribs 135 or other constraint structures the bellows actuator 130 would herniate or bend out of axis uncontrollably such that suitable force would not be applied to the base plates 140 such that the arms 115, 120 would not be suitably or controllably actuated. Accordingly, in various embodiments, the constraint ribs 135 can be desirable to generate a consistent and controllable axis of expansion B for the bellows actuator 130 as they are inflated and/or deflated.

In some examples, the bellows actuator 130 in a deflated configuration can substantially extend past a radial edge of the constraint ribs 135 and can retract during inflation to extend less past the radial edge of the constraint ribs 135, to extend to the radial edge of the constraint ribs 135, or not to extend less past the radial edge of the constraint ribs 135. For example, FIG. 14*a* illustrates a compressed configuration of the bellows actuator 130 where the bellows actuator 130 substantially extends past a radial edge of the constraint ribs 135, and FIG. 14*b* illustrates the bellows actuator 130 retracting during inflation to extend less past the radial edge of the constraint ribs 135 in an inflated configuration of the bellows actuator 130.

Figure 15A:
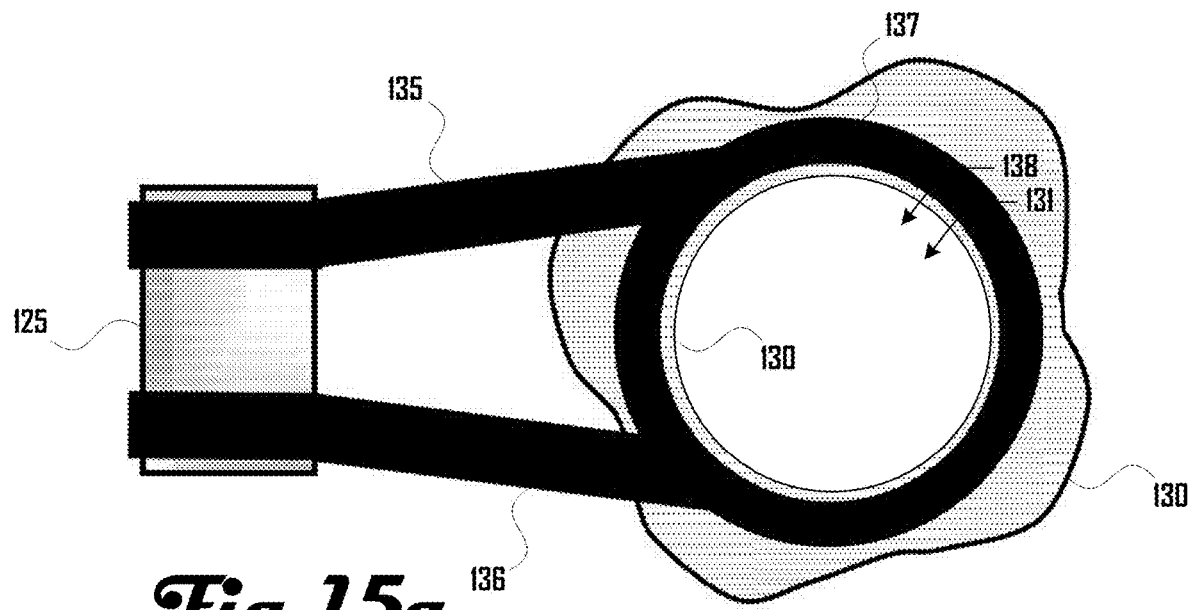
FIG. 15a illustrates a top view of a pneumatic actuator in a compressed configuration in accordance with another embodiment.
Figure 15B:
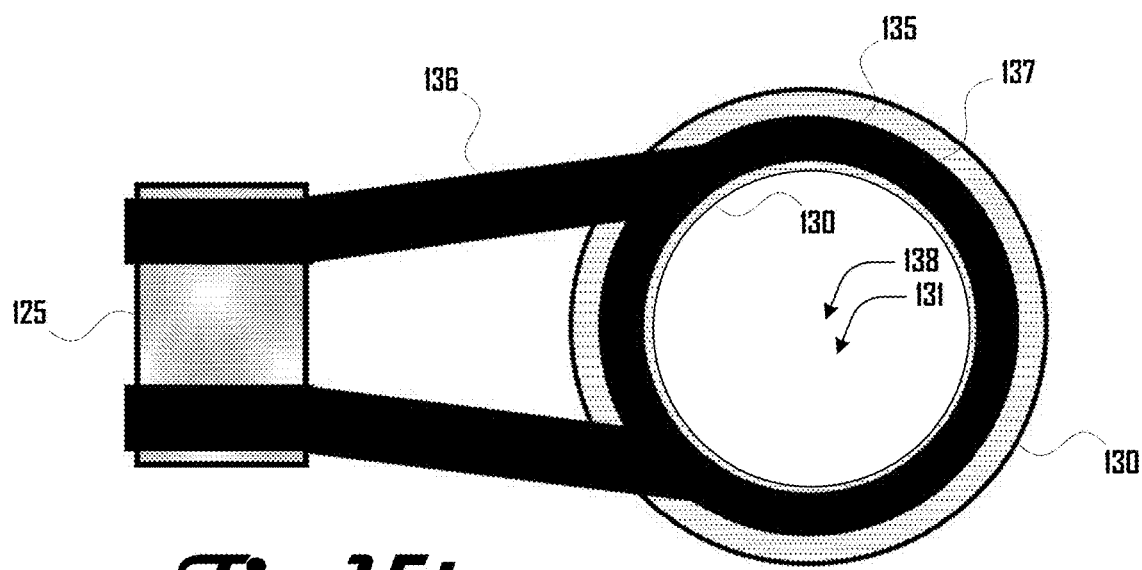
FIG. 15b illustrates a top view of the pneumatic actuator of FIG. 15a in an expanded configuration.

Similarly, FIG. 15*a* illustrates a top view of a compressed configuration of bellows actuator 130 where the bellows actuator 130 substantially extends past a radial edge of constraint ribs 135, and FIG. 15*b* illustrates a top view where the bellows actuator 130 retracts during inflation to extend less past the radial edge of the constraint ribs 135 in an inflated configuration of the bellows actuator 130.

Figure 16:
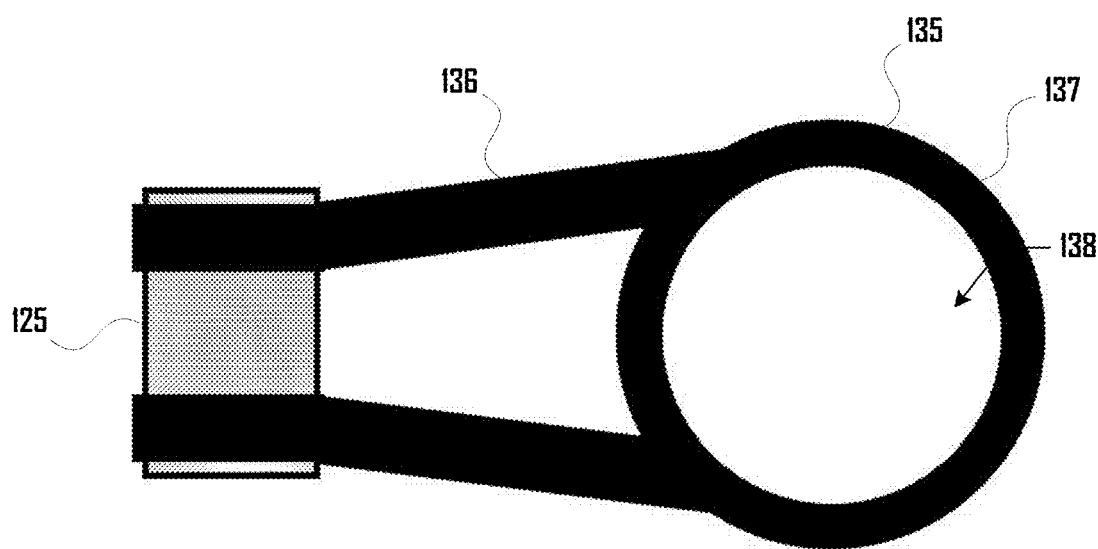
FIG. 16 illustrates a top view of a pneumatic actuator constraint rib in accordance with an embodiment.

Constraint ribs 135 can be configured in various suitable ways. For example, FIGS. 15*a*, 15*b* and 16 illustrate a top view of an example embodiment of a constraint rib 135 having a pair of rib arms 136 that extend from the joint structure 125 and couple with a circular rib ring 137 that defines a rib cavity 138 through which a portion of the bellows actuator 130 can extend (e.g., as shown in FIGS. 14*a*, 14*b*, 15*a* and 15*b*). In various examples, the one or more constraint ribs 135 can be a substantially planar element with the rib arms 136 and rib ring 137 being disposed within a common plane.

In further embodiments, the one or more constraint ribs 135 can have any other suitable configuration. For example, some embodiments can have any suitable number of rib arms 136, including one, two, three, four, five, or the like. Additionally, the rib ring 137 can have various suitable shapes and need not be circular, including one or both of an inner edge that defines the rib cavity 138 or an outer edge of the rib ring 137.

In various embodiments, the constraining ribs 135 can be configured to direct the motion of the bellows actuator 130 through a swept path about some instantaneous center (which may or may not be fixed in space) and/or to prevent motion of the bellows actuator 130 in undesired directions, such as out-of-plane buckling. As a result, the number of constraining ribs 135 included in some embodiments can vary depending on the specific geometry and loading of the leg actuator unit 110. Examples can range from one constraining rib 135 up to any suitable number of constraining ribs 135; accordingly, the number of constraining ribs 135 should not be taken to limit the applicability of the invention. Additionally, constraining ribs 135 can be absent in some embodiments.

The one or more constraining ribs 135 can be constructed in a variety of ways. For example, the one or more constraining ribs 135 can vary in construction on a given leg actuator unit 110, and/or may or may not require attachment to the joint structure 125. In various embodiments, the constraining ribs 135 can be constructed as an integral component of a central rotary joint structure 125. An example embodiment of such a structure can include a mechanical rotary pin joint, where the constraining ribs 135 are connected to and can pivot about the joint 125 at one end of the joint structure 125, and are attached to an inextensible outer layer of the bellows actuator 130 at the other end. In another set of embodiments, the constraining ribs 135 can be constructed in the form of a single flexural structure that directs the motion of the bellows actuator 130 throughout the range of motion for the leg actuator unit 110. Another example embodiment uses a flexural constraining rib 135 that is not connected integrally to the joint structure 125 but is instead attached externally to a previously assembled joint structure 125. Another example embodiment can comprise the constraint ribs 135 being composed of pieces of fabric wrapped around the bellows actuator 130 and attached to the joint structure 125, acting like a hammock to restrict and/or guide the motion of the bellows actuator 130. There are additional methods available for constructing the constraining ribs 135 that can be used in additional embodiments that include but are not limited to a linkage, a rotational flexure connected around the joint structure 125, and the like.

In some examples, a design consideration for constraining ribs 135 can be how the one or more constraining ribs 135 interact with the bellows actuator 130 to guide the path of the bellows actuator 130. In various embodiments, the constraining ribs 135 can be fixed to the bellows actuator 130 at predefined locations along the length of the bellows actuator 130. One or more constraining ribs 135 can be coupled to the bellows actuator 130 in various suitable ways, including but not limited to sewing, mechanical clamps, geometric interference, direct integration, and the like. In other embodiments, the constraining ribs 135 can be configured such that the constraining ribs 135 float along the length of the bellows actuator 130 and are not fixed to the bellows actuator 130 at predetermined connection points. In some embodiments, the constraining ribs 135 can be configured to restrict a cross sectional area of the bellows actuator 130. An example embodiment can include a tubular bellows actuator 130 attached to a constraining rib 135 that has an oval cross section, which in some examples can be a configuration to reduce the width of the bellows actuator 130 at that location when the bellows actuator 130 is inflated.

The bellows actuator 130 can have various functions in some embodiments, including containing operating fluid of the leg actuator unit 110, resisting forces associated with operating pressure of the leg actuator unit 110, and the like. In various examples, the leg actuator unit 110 can operate at a fluid pressure above, below or at about ambient pressure. In various embodiments, the bellows actuator 130 can comprise one or more flexible yet inextensible or practically inextensible materials in order to resist expansion (e.g., beyond what is desired in directions other than an intended direction of force application or motion) of the bellows actuator 130 beyond what is desired when pressurized above ambient pressure. Additionally, the bellows actuator 130 can comprise an impermeable or semi-impermeable material in order to contain the actuator fluid.

Figure 18:
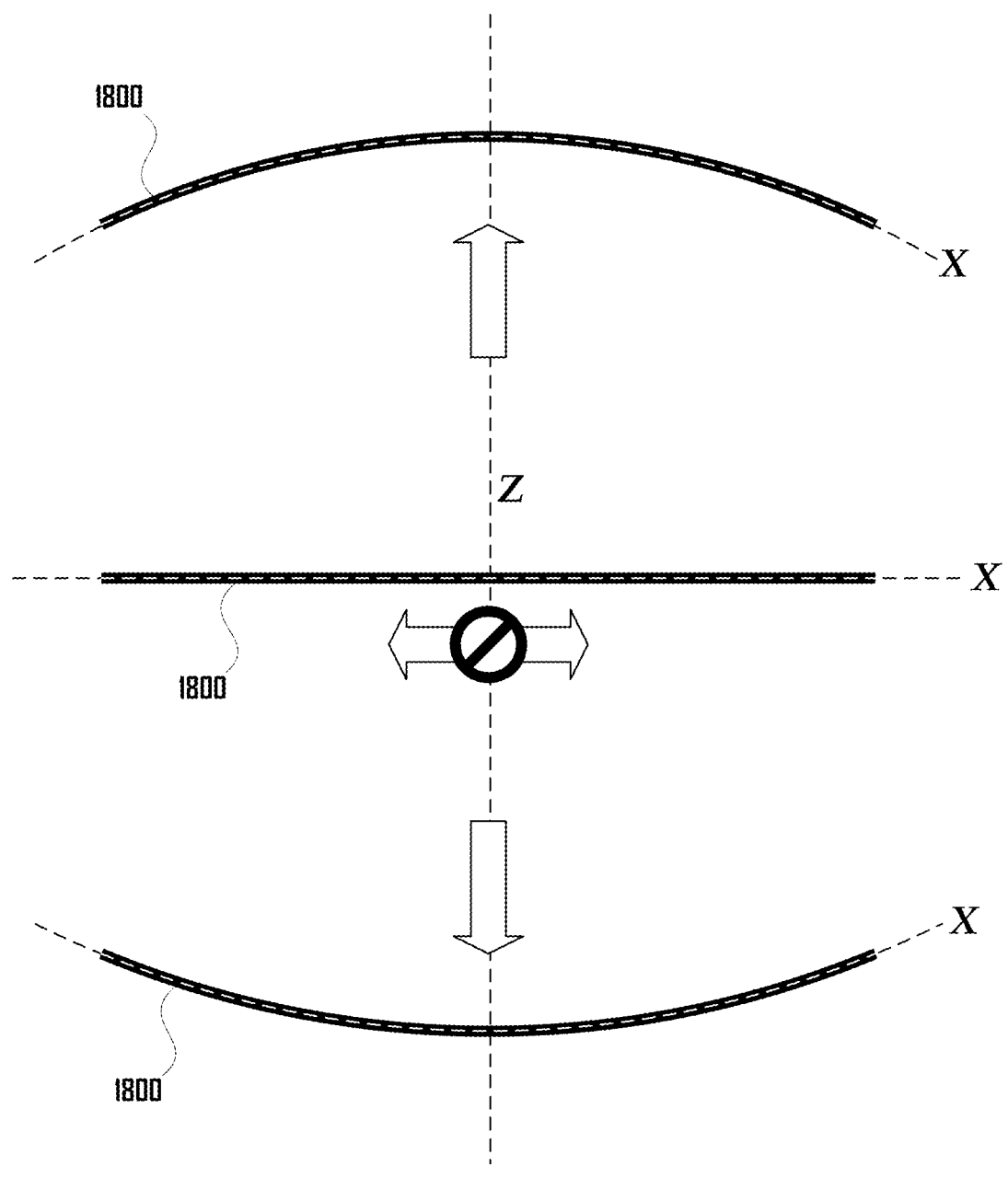
FIG. 18 illustrates an example planar material that is substantially inextensible along one or more plane axes of the planar material while being flexible in other directions.

For example, in some embodiments, the bellows actuator 130 can comprise a flexible sheet material such as woven nylon, rubber, polychloroprene, a plastic, latex, a fabric, or the like. Accordingly, in some embodiments, the bellows actuator 130 can be made of a planar material that is substantially inextensible along one or more plane axes of the planar material while being flexible in other directions. For example, FIG. 18 illustrates a side view of a planar material 1800 (e.g., a fabric) that is substantially inextensible along axis X that is coincident with the plane of the material 1800, yet flexible in other directions, including axis Z. In the example of FIG. 18, the material 1800 is shown flexing upward and downward along axis Z while being inextensible along axis X. In various embodiments, the material 1800 can also be inextensible along an axis Y (not shown) that is also coincident with the plane of the material 1800 like axis X and perpendicular to axis X.

In some embodiments, the bellows actuator 130 can be made of a non-planar woven material that is inextensible along one or more axes of the material. For example, in one embodiment the bellows actuator 130 can comprise a woven fabric tube. Woven fabric material can provide inextensibility along the length of the bellows actuator 130 and in the circumferential direction. Such embodiments can still be able to be configured along the body of the user 101 to align with the axis of a desired joint on the body 101 (e.g., the knee 103).

In various embodiments, the bellows actuator 130 can develop its resulting force by using a constrained internal surface length and/or external surface length that are a constrained distance away from each other (e.g., due to an inextensible material as discussed above). In some examples, such a design can allow the bellows actuator 130 to contract, but when pressurized to a certain threshold, the bellows actuator 130 can direct the forces axially by pressing on the plates 140 of the leg actuator unit 110 because there is no ability for the bellows actuator 130 to expand further in volume otherwise due to being unable to extend its length past a maximum length defined by the body of the bellows actuator 130.

In other words, the bellows actuator 130 can comprise a substantially inextensible textile envelope that defines a chamber that is made fluid-impermeable by a fluid-impermeable bladder contained in the substantially inextensible textile envelope and/or a fluid-impermeable structure incorporated into the substantially inextensible textile envelope. The substantially inextensible textile envelope can have a predetermined geometry and a non-linear equilibrium state at a displacement that provides a mechanical stop upon pressurization of the chamber to prevent excessive displacement of the substantially inextensible textile actuator.

In some embodiments, the bellows actuator 130 can include an envelope that consists or consists essentially of inextensible textiles (e.g., inextensible knits, woven, non-woven, etc.) that can prescribe various suitable movements as discussed herein. Inextensible textile bellows actuator 130 can be designed with specific equilibrium states (e.g., end states or shapes where they are stable despite increasing pressure), pressure/stiffness ratios, and motion paths. Inextensible textile bellows actuator 130 in some examples can be configured accurately delivering high forces because inextensible materials can allow greater control over directionality of the forces.

Accordingly, some embodiments of inextensible textile bellows actuator 130 can have a pre-determined geometry that produces displacement mostly via a change in the geometry between the uninflated shape and the pre-determined geometry of its equilibrium state (e.g., fully inflated shape) due to displacement of the textile envelope rather than via stretching of the textile envelope during a relative increase in pressure inside the chamber; in various embodiments, this can be achieved by using inextensible materials in the construction of the envelope of the bellows actuator 130. As discussed herein, in some examples "inextensible" or "substantially inextensible" can be defined as expansion by no more than 10%, no more than 5%, or no more than 1% in one or more direction.

Figure 17A:
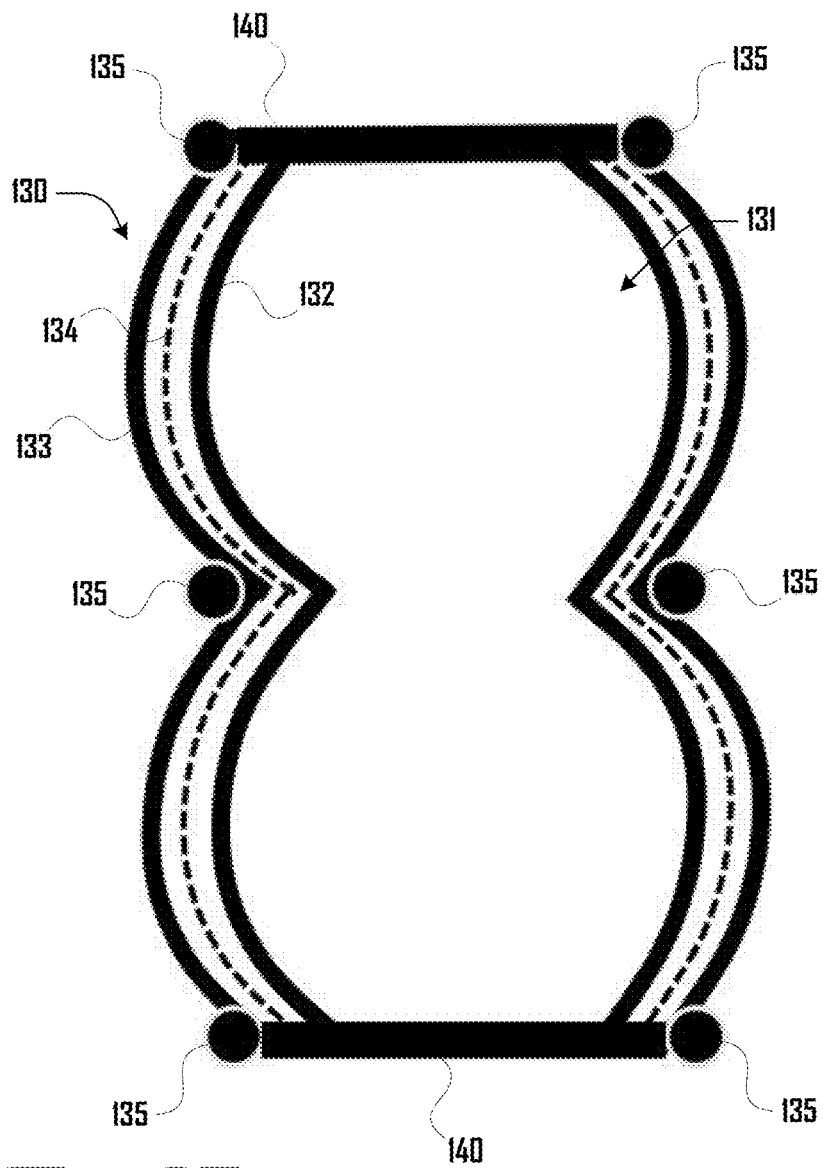
FIG. 17a illustrates a cross-sectional view of a pneumatic actuator bellows in accordance with another embodiment.
Figure 17B:
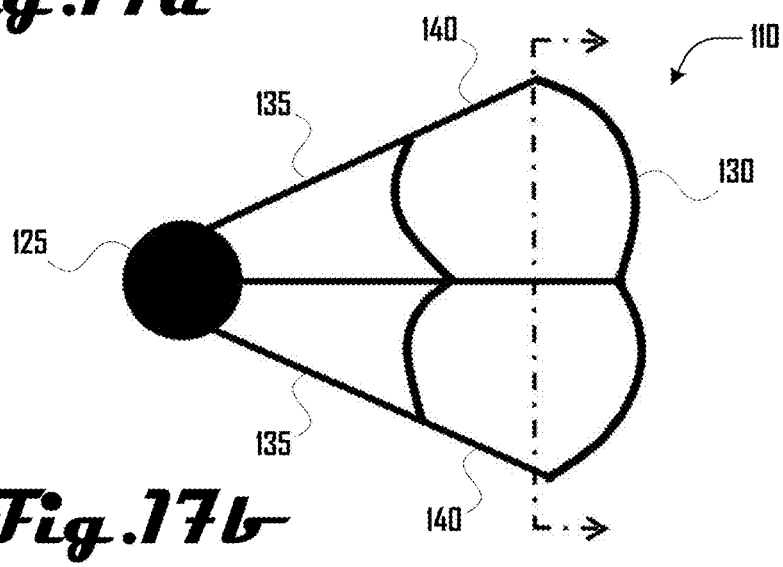

FIG. 17a illustrates a cross-sectional view of a pneumatic actuator unit 110 including bellows actuator 130 in accordance with another embodiment and FIG. 17b illustrates a side view of the pneumatic actuator unit 110 of FIG. 17*a* in an expanded configuration showing the cross section of FIG. 17*a*. As shown in FIG. 17*a*, the bellows actuator 130 can comprise an internal first layer 132 that defines the bellows cavity 131 and can comprise an outer second layer 133 with a third layer 134 disposed between the first and second layers 132, 133. Throughout this description, the use of the term "layer" to describe the construction of the bellows actuator 130 should not be viewed as limiting to the design. The use of 'layer' can refer to a variety of designs including a planar material sheet, a wet film, a dry film, a rubberized coating, a co-molded structure, and the like.

In some examples, the internal first layer 132 can comprise a material that is impermeable or semi-permeable to the actuator fluid (e.g., air) and the external second layer 133 can comprise an inextensible material as discussed herein. For example, as discussed herein, an impermeable layer can refer to an impermeable or semi-permeable layer and an inextensible layer can refer to an inextensible or a practically inextensible layer.

In some embodiments comprising two or more layers, the internal layer 132 can be slightly oversized compared to an inextensible outer second layer 133 such that the internal forces can be transferred to the high-strength inextensible outer second layer 133. One embodiment comprises a bellows actuator 130 with an impermeable polyurethane polymer film inner first layer 132 and a woven nylon braid as the outer second layer 133.

The bellows actuator 130 can be constructed in various suitable ways in further embodiments, which can include a single-layer design that is constructed of a material that provides both fluid impermeability and that is sufficiently inextensible. Other examples can include a complex bellows assembly that comprises multiple laminated layers that are fixed together into a single structure. In some examples, it can be necessary to limit the deflated stack height of the bellows actuator 130 to maximize the range of motion of the leg actuator unit 110. In such an example, it can be desirable to select a low-thickness fabric that meets the other performance needs of the bellows actuator 130.

In yet another embodiment, it can be desirable to reduce friction between the various layers of the bellows actuator 130. In one embodiment, this can include the integration of a third layer 134 that acts as an anti-abrasive and/or low friction intermediate layer between the first and second layers 132, 133. Other embodiments can reduce the friction between the first and second layers 132, 133 in alternative or additional ways, including but not limited to the use of a wet lubricant, a dry lubricant, or multiple layers of low friction material. Accordingly, while the example of FIG. 15*a* illustrates an example of a bellows actuator 130 comprising three layers 132, 133, 134, further embodiments can include a bellows actuator 130 having any suitable number of layers, including one, two, three, four, five, ten, fifteen, twenty-five, and the like. Such one or more layers can be coupled along adjoining faces in part or in whole, with some examples defining one or more cavities between layers. In such examples, material such as lubricants or other suitable fluids can be disposed in such cavities, or such cavities can be effectively empty. Additionally, as described herein, one or more layers (e.g., the third layer 134) need not be a sheet or planar material layer as shown in some examples and can instead comprise a layer defined by a fluid. For example, in some embodiments, the third layer 134 can be defined by a wet lubricant, a dry lubricant, or the like.

The inflated shape of the bellows actuator 130 can be important to the operation of the bellows actuator 130 and/or leg actuator unit 110 in some embodiments. For example, the inflated shape of the bellows actuator 130 can be affected through the design of both an impermeable and inextensible portion of the bellows actuator 130 (e.g., the first and second layer 132, 133). In various embodiments, it can be desirable to construct one or more of the layers 132, 133, 134 of the bellows actuator 130 out of various two-dimensional panels that may not be intuitive in a deflated configuration.

In some embodiments, one or more impermeable layers can be disposed within the bellows cavity 131 and/or the bellows actuator 130 can comprise a material that is capable of holding a desired fluid (e.g., a fluid impermeable first internal layer 132 as discussed herein). The bellows actuator 130 can comprise a flexible, elastic, or deformable material that is operable to expand and contract when the bellows actuators 130 are inflated or deflated as described herein. In some embodiments, the bellows actuator 130 can be biased toward a deflated configuration such that the bellows actuator 130 is elastic and tends to return to the deflated configuration when not inflated. Additionally, although bellows actuator 130 shown herein are configured to expand and/or extend when inflated with fluid, in some embodiments, the bellows actuator 130 can be configured to shorten and/or retract when inflated with fluid in some examples. Also, the term "bellows" as used herein should not be construed to be limiting in any way. For example, the term "bellows" as used herein should not be construed to require elements such as convolutions or other such features (although convoluted bellows actuator 130 can be present in some embodiments). As discussed herein, bellows actuator 130 can take on various suitable shapes, sizes, proportions and the like.

The bellows actuator 130 can vary significantly across various embodiments, so the present examples should not be construed to be limiting. One preferred embodiment of a bellows actuator 130 includes fabric-based pneumatic actuator configured such that it provides knee extension torque as discussed herein. Variants of this embodiment can exist to tailor the actuator to provide the desired performance characteristics of the actuators such as a fabric actuator that is not of a uniform cross-section. Other embodiments can use an electro-mechanical actuator configured to provide flexion and extension torques at the knee instead of or in addition to a fluidic bellows actuator 130. Various embodiments can include but are not limited to designs that incorporate combinations of electromechanical, hydraulic, pneumatic, electro-magnetic, or electro-static for positive power or negative power assistance of extension or flexion of a lower extremity joint.

The bellows actuator 130 can also be located in a variety of locations as required by the specific design. One embodiment places the bellows actuator 130 of a powered knee brace component located in line with the axis of the knee joint and positioned parallel to the joint itself. Various embodiments include but are not limited to, actuators configured in series with the joint, actuators configured anterior to the joint, and actuators configured to rest around the joint.

Various embodiments of the bellows actuator 130 can include secondary features that augment the operation of the actuation. One such embodiment is the inclusion of user-adjustable mechanical hard end stops to limit the allowable range of motion to the bellows actuator 130. Various embodiments can include but are not limited to the following extension features: the inclusion of flexible end stops, the inclusion of an electromechanical brake, the inclusion of an electro-magnetic brake, the inclusion of a magnetic brake, the inclusion of a mechanical disengage switch to mechanically decouple the joint from the actuator, or the inclusion of a quick release to allow for quick changing of actuator components.

In various embodiments, the bellows actuator 130 can comprise a bellows and/or bellows system as described in related U.S. patent application Ser. No. 14/064,071 filed Oct. 25, 2013, which issued as U.S. Pat. No. 9,821,475; as described in U.S. patent application Ser. No. 14/064,072 filed Oct. 25, 2013; as described in U.S. patent application Ser. No. 15/823,523 filed Nov. 27, 2017; or as described in U.S. patent application Ser. No. 15/472,740 filed Mar. 29, 2017.

In some applications, the design of the fluidic actuator unit 110 can be adjusted to expand its capabilities. One example of such a modification can be made to tailor the torque profile of a rotary configuration of the fluidic actuator unit 110 such that the torque changes as a function of the angle of the joint structure 125. To accomplish this in some examples, the cross-section of the bellows actuator 130 can be manipulated to enforce a desired torque profile of the overall fluidic actuator unit 110. In one embodiment, the diameter of the bellows actuator 130 can be reduced at a longitudinal center of the bellows actuator 130 to reduce the overall force capabilities at the full extension of the bellows actuator 130. In yet another embodiment, the cross-sectional areas of the bellows actuator 130 can be modified to induce a desired buckling behavior such that the bellows actuator 130 does not get into an undesirable configuration. In an example embodiment, the end configurations of the bellows actuator 130 of a rotary configuration can have the area of the ends reduced slightly from the nominal diameter to provide for the end portions of the bellows actuator 130 to buckle under loading until the actuator unit 110 extends beyond a predetermined joint angle, at which point the smaller diameter end portion of the bellows actuator 130 would begin to inflate.

In other embodiments, this same capability can be developed by modifying the behavior of the constraining ribs 135. As an example, using the same example bellows actuator 130 as discussed in the previous embodiment, two constraining ribs 135 can fixed to such bellows actuator 130 at evenly distributed locations along the length of the bellows actuator 130. In some examples, a goal of resisting a partially inflated buckling can be combated by allowing the bellows actuator 130 to close in a controlled manner as the actuator unit 110 closes. The constraining ribs 135 can be allowed to get closer to the joint structure 125 but not closer to each other until they have bottomed out against the joint structure 125. This can allow the center portion of the bellows actuator 130 to remain in a fully inflated state which can be the strongest configuration of the bellows actuator 130 in some examples.

In further embodiments, it can be desirable to optimize the fiber angle of the individual braid or weave of the bellows actuator 130 in order to tailor specific performance characteristics of the bellows actuator 130 (e.g., in an example where a bellows actuator 130 includes inextensibility provided by a braided or woven fabric). In other embodiments, the geometry of the bellows actuator 130 of the actuator unit 110 can be manipulated to allow the robotic exoskeleton system 100 to operate with different characteristics. Example methods for such modification can include but are not limited to the following: the use of smart materials on the bellows actuator 130 to manipulate the mechanical behavior of the bellows actuator 130 on command; or the mechanical modification of the geometry of the bellows actuator 130 through means such as shortening the operating length and/or reducing the cross-sectional area of the bellows actuator 130.

In further examples, a fluidic actuator unit 110 can comprise a single bellows actuator 130 or a combination of multiple bellows actuator 130, each with its own composition, structure, and geometry. For example, some embodiments can include multiple bellows actuator 130 disposed in parallel or concentrically on the same joint assembly 125 that can be engaged as needed. In one example embodiment, a joint assembly 125 can be configured to have two bellows actuator 130 disposed in parallel directly next to each other. The exoskeleton system 100 can selectively choose to engage each bellows actuator 130 as needed to allow for various amounts of force to be output by the same fluidic actuator unit 110 in a desirable mechanical configuration.

In further embodiments, a fluidic actuator unit 110 can include various suitable sensors to measure mechanical properties of the bellows actuator 130 or other portions of the fluidic actuator unit 110 that can be used to directly or indirectly estimate pressure, force, or strain in the bellows actuator 130 or other portions of the fluidic actuator unit 110. In some examples, sensors located at the fluidic actuator unit 110 can be desirable due to the difficulty in some embodiments associated with the integration of certain sensors into a desirable mechanical configuration while others may be more suitable. Such sensors at the fluidic actuator unit 110 can be operably connected to the exoskeleton device 510 (see FIG. 5) and the exoskeleton device 510 can use data from such sensors at the fluidic actuator unit 110 to control the exoskeleton system 100.

As discussed herein, various suitable exoskeleton systems 100 can be used in various suitable ways and for various suitable applications. However, such examples should not be construed to be limiting on the wide variety of exoskeleton systems 100 or portions thereof that are within the scope and spirit of the present disclosure. Accordingly, exoskeleton systems 100 that are more or less complex than the examples of FIGS. 1-5 are within the scope of the present disclosure.

Additionally, while various examples relate to an exoskeleton system 100 associated with the legs or lower body of a user, further examples can be related to any suitable portion of a user body including the torso, arms, head, legs, or the like. Also, while various examples relate to exoskeletons, it should be clear that the present disclosure can be applied to other similar types of technology, including prosthetics, body implants, robots, or the like. Further, while some examples can relate to human users, other examples can relate to animal users, robot users, various forms of machinery, or the like.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives. Additionally, elements of a given embodiment should not be construed to be applicable to only that example embodiment and therefore elements of one example embodiment can be applicable to other embodiments. Additionally, elements that are specifically shown in example embodiments should be construed to cover embodiments that comprise, consist essentially of, or consist of such elements, or such elements can be explicitly absent from further embodiments. Accordingly, the recitation of an element being present in one example should be construed to support some embodiments where such an element is explicitly absent.

What is claimed is:

1. A water and corrosion resistant exoskeleton system configured to operate in a ship on a body of water, the exoskeleton system comprising:
   a water and corrosion resistant left and right leg actuator unit configured to be respectively coupled to a left and right leg of a user, the left and right leg actuator units each including:
      an upper arm and a lower arm that are rotatably coupled via a joint, the joint positioned at a knee of the user with the upper arm coupled about an upper leg portion of the user above the knee and with the lower arm coupled about a lower leg portion of the user below the knee,
      a fluidic bellows actuator that extends between the upper arm and lower arm, and
   a water and corrosion resistant exoskeleton device configured to operate in a ship on a body of water that includes:
      a fluidic system, and
      a processor and memory, the memory storing instructions, that when executed by the processor, are configured to control the fluidic system to:
         introduce fluid to the fluidic bellows actuators of the left and right leg actuator units to cause actuation of the fluidic bellows actuators of the left and right leg actuator units,
         operate in a first configuration when a determination is made by the exoskeleton device that the exoskeleton system is experiencing an impact, the determination based at least in part on accelerometer and joint encoder data and a determination that a joint angle of the left actuator unit is above a threshold value, where a largest joint angle value corresponds to a maximum extension of the joint; and
         operate in a second configuration that is different from the first configuration when the joint angle of the left leg actuator unit is below the threshold value, the second configuration causing generation of constant force by the fluidic bellows actuators of the left and right leg actuator units to provide knee torque support to the user as the knee reaches a higher degree of flexion.

2. The exoskeleton system of claim 1, wherein the exoskeleton device is worn on the torso of the user.

3. The exoskeleton system of claim 1, wherein the exoskeleton device is coupled to the ship in the body of water through a mechanical element.

4. The exoskeleton system of claim 1, wherein the exoskeleton system is operably coupled to a ship in the body of water, the exoskeleton system operably coupled to the ship via:
   a fluidic line configured to provide the fluid to the exoskeleton system from a fluid source of the ship; and
   a power line configured to provide electrical power to the exoskeleton system from an electrical power source of the ship.

5. The exoskeleton system of claim 1, further comprising a quick release system configured to quickly release the user from the exoskeleton device via a mechanism.

6. The exoskeleton system of claim 1, further comprising a quick release system configured to quickly release the user from the left leg actuator unit via a mechanism.

7. The exoskeleton system of claim 1, wherein the first configuration of the exoskeleton system controls a rate of introducing the fluid to the fluidic bellows actuator of the left leg actuation unit such that a fluid pressure within the fluidic bellows actuator of the left leg actuation unit increases as the joint angle decreases from the joint being in flexion.

8. An exoskeleton system configured to operate on a boat in a body of water, the exoskeleton system comprising:
   one or more leg actuator units including:
      a fluidic bellows actuator,
      a plurality of sensors; and
   an exoskeleton device configured to operate on the boat in the body of water that includes:
      a fluidic system, and
      a processor and memory, the memory storing instructions, that when executed by the processor, are configured to control the exoskeleton system to:
         introduce fluid to the fluidic bellows actuator of the one or more leg actuator units to cause actuation of the fluidic bellows actuator of the one or more leg actuator units.

9. The exoskeleton system of claim 8, wherein the instructions, that when executed by the processor, are further configured to control the exoskeleton system to:
   operate in a first configuration when a joint angle of a joint of at least one of the leg actuator units is above a threshold value, where a largest joint angle value corresponds to a maximum extension of the joint; and
   operate in a second configuration that is different from the first configuration when the joint angle of the at least one of the leg actuator units is below the threshold value, the second configuration causing generation of constant force by the fluidic bellows actuators of the leg actuator units to provide knee torque support to a knee of a user wearing the one or more actuator units as the knee of the user reaches a higher degree of flexion.

10. The exoskeleton system of claim 9, wherein the instructions, that when executed by the processor, are further configured to control the exoskeleton system to:
    tune operating parameters of the first configuration based at least in part of data from a left knee joint encoder of the exoskeleton system indicating proximity of the joint angle to the threshold value.

11. The exoskeleton system of claim 8, wherein exoskeleton device is worn on the torso of a user.

12. The exoskeleton system of claim 8, wherein the exoskeleton device is coupled to a vehicle in the body of water.

13. The exoskeleton system of claim 8, wherein the exoskeleton system is coupled to a vehicle in the body of water, the exoskeleton system coupled to the vehicle via one or more of:
    a fluidic line configured to provide fluid to the exoskeleton system from a fluid source of the vehicle;
    a power line configured to provide electrical power to the exoskeleton system from an electrical power source of the vehicle; or
    a communication line configured to provide for communication between the exoskeleton system and the vehicle.

14. The exoskeleton system of claim 13, further comprising a quick release system configured to quickly release the exoskeleton system from the vehicle.

15. The exoskeleton system of claim 8, further comprising a quick release system configured to quickly release a user from the exoskeleton device.

16. An exoskeleton system, the exoskeleton system comprising:
- one or more actuator units, the one or more actuator units including:
  - a fluidic actuator,
- one or more sensors; and
- an exoskeleton device that includes:
  - a fluidic system, and
  - a processor and memory, the memory storing instructions, that when executed by the processor, are configured to control the exoskeleton system to:
    - introduce fluid to the fluidic actuator of the one or more actuator units to cause actuation of the fluidic actuator of the one or more actuator units.

17. The exoskeleton system of claim 16, wherein the exoskeleton system is configured to operate in a maritime environment.

18. The exoskeleton system of claim 16, wherein the instructions, that when executed by the processor, are further configured to control the exoskeleton system to:
- operate in a second configuration that is different from a first configuration when a determination is made that a joint angle of at least one of the one or more actuation units has passed a threshold value.

19. The exoskeleton system of claim 18, wherein the instructions, that when executed by the processor, are further configured to control the exoskeleton system to:
- tune operating parameters of a first configuration based at least in part of data from a joint encoder indicating a change in the joint angle.

20. The exoskeleton system of claim 16, wherein the exoskeleton system is coupled to a vehicle in a body of liquid, the exoskeleton system coupled to the vehicle via one or more of:
- a fluidic line configured to provide fluid to the exoskeleton system from a fluid source of the vehicle;
- a power line configured to provide power to the exoskeleton system from a power source of the vehicle; or
- a communication line configured to provide for communication between the exoskeleton system and the vehicle.

* * * * *